United States Patent [19]
Ohno et al.

[11] Patent Number: 6,004,646
[45] Date of Patent: Dec. 21, 1999

[54] OPTICAL INFORMATION RECORDING MEDIUM

[75] Inventors: Takashi Ohno, Yokohama, Japan;
Masao Komatsu, Jurong, Singapore;
Masae Kubo, Yokohama, Japan;
Masaaki Mizuno, Yokohama, Japan;
Natsuko Nobukuni, Yokohama, Japan;
Michikazu Horie, Yokohama, Japan;
Haruo Kunitomo, Kurashiki, Japan

[73] Assignee: Mitsubishi Chemical Corporation, Tokyo, Japan

[21] Appl. No.: 09/048,042

[22] Filed: Mar. 26, 1998

[30] Foreign Application Priority Data

Mar. 27, 1997 [JP] Japan ..................... 9-075531

[51] Int. Cl.⁶ ................................ B32B 3/00
[52] U.S. Cl. ............... 428/64.1; 428/64.2; 428/64.5; 428/457; 428/913; 430/270.13; 430/495.1; 430/945; 369/283; 369/288
[58] Field of Search ................. 428/64.1, 64.2, 428/64.4, 64.5, 64.7, 457, 698, 913; 430/270.13, 495.1, 945; 369/275.1, 283, 288

[56] References Cited

U.S. PATENT DOCUMENTS

| | | | |
|---|---|---|---|
| 5,171,618 | 12/1992 | Suzuki | 428/64.1 |
| 5,523,140 | 6/1996 | Tominaga | 428/64.1 |
| 5,637,372 | 6/1997 | Tominaga | 428/64.1 |
| 5,709,978 | 1/1998 | Hirotsune | 430/270.1 |
| 5,719,006 | 2/1998 | Ohkubo | 430/270.13 |
| 5,776,574 | 7/1998 | Honguh | 428/64.1 |
| 5,785,828 | 7/1998 | Yamada | 204/298.13 |
| 5,789,055 | 8/1998 | Yoon | 428/64.1 |

FOREIGN PATENT DOCUMENTS

| | | |
|---|---|---|
| 5-81719 | 4/1993 | Japan . |
| 7-57301 | 3/1995 | Japan . |

*Primary Examiner*—Elizabeth Evans
*Attorney, Agent, or Firm*—Oblon, Spivak, McClelland, Maier & Neustadt, P.C.

[57] ABSTRACT

An optical information recording medium for recording, retrieving and erasing mark length-modulated amorphous marks, which comprises a substrate, and a lower protective layer, a phase-change recording layer, an upper protective layer and a reflective layer having a thickness of from 40 to 300 nm and a volume resistivity of from 20 to 150 nΩ·m, formed in this sequence on the substrate.

42 Claims, 44 Drawing Sheets

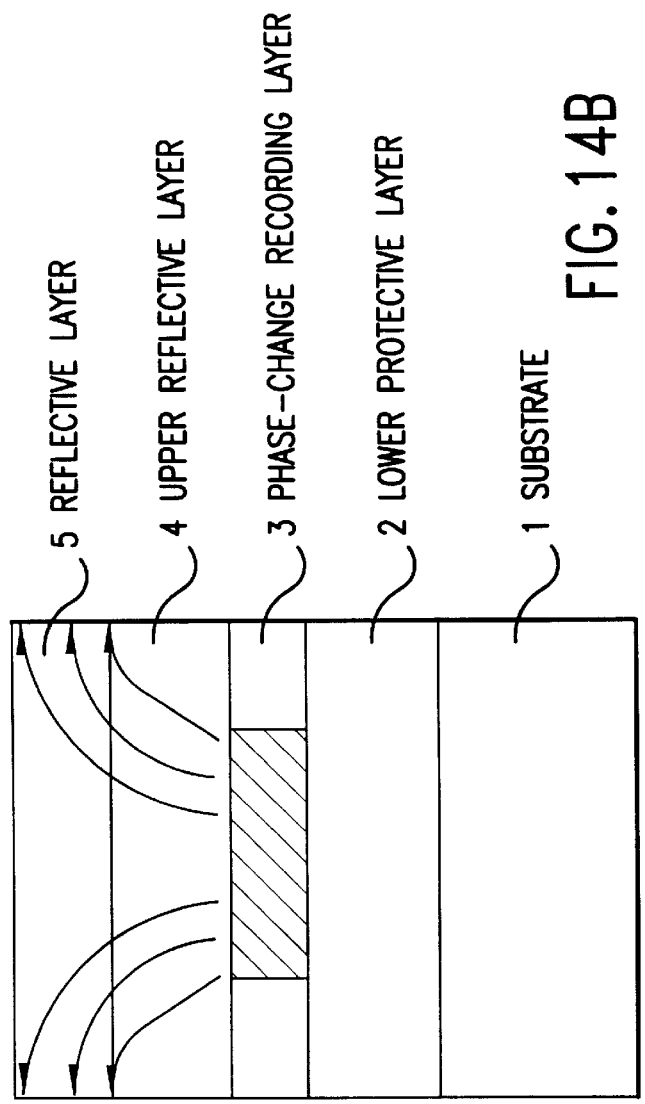
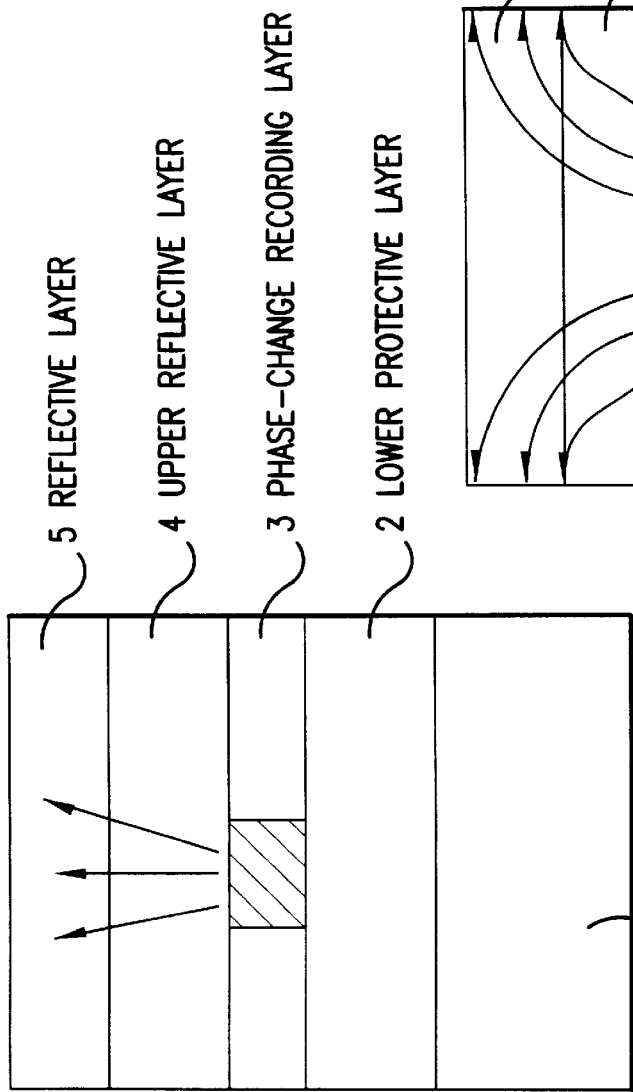
FIG. 14A
FIG. 14B

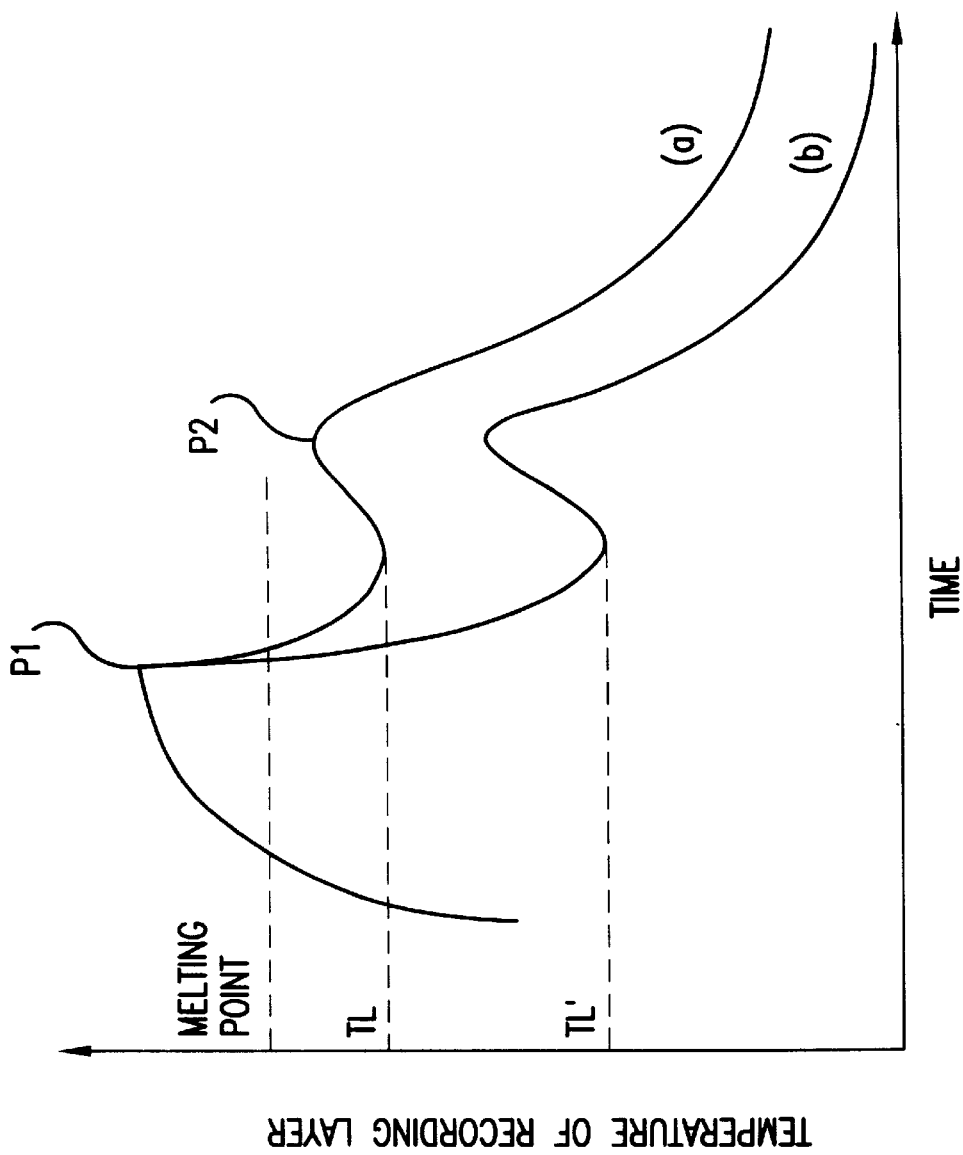

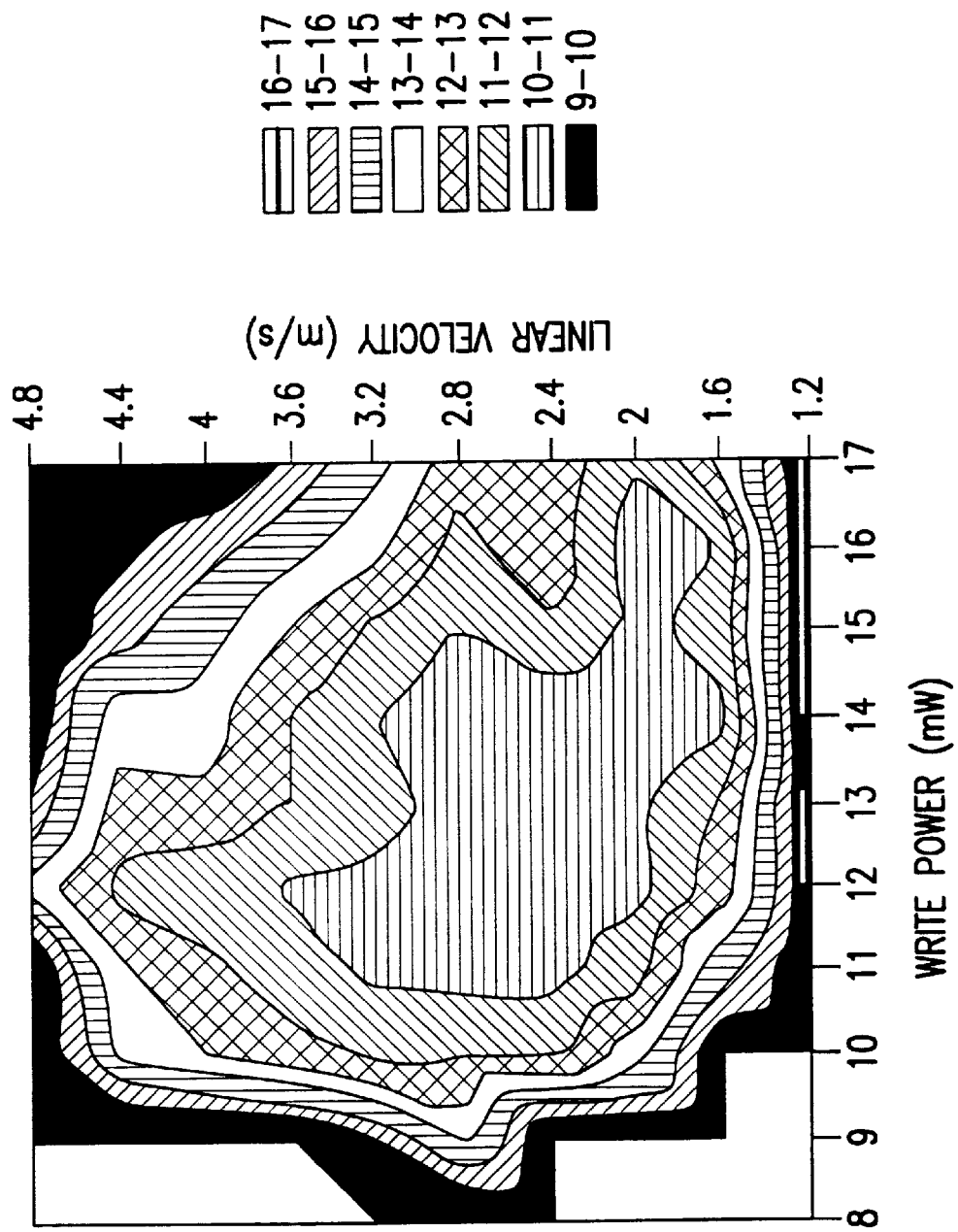

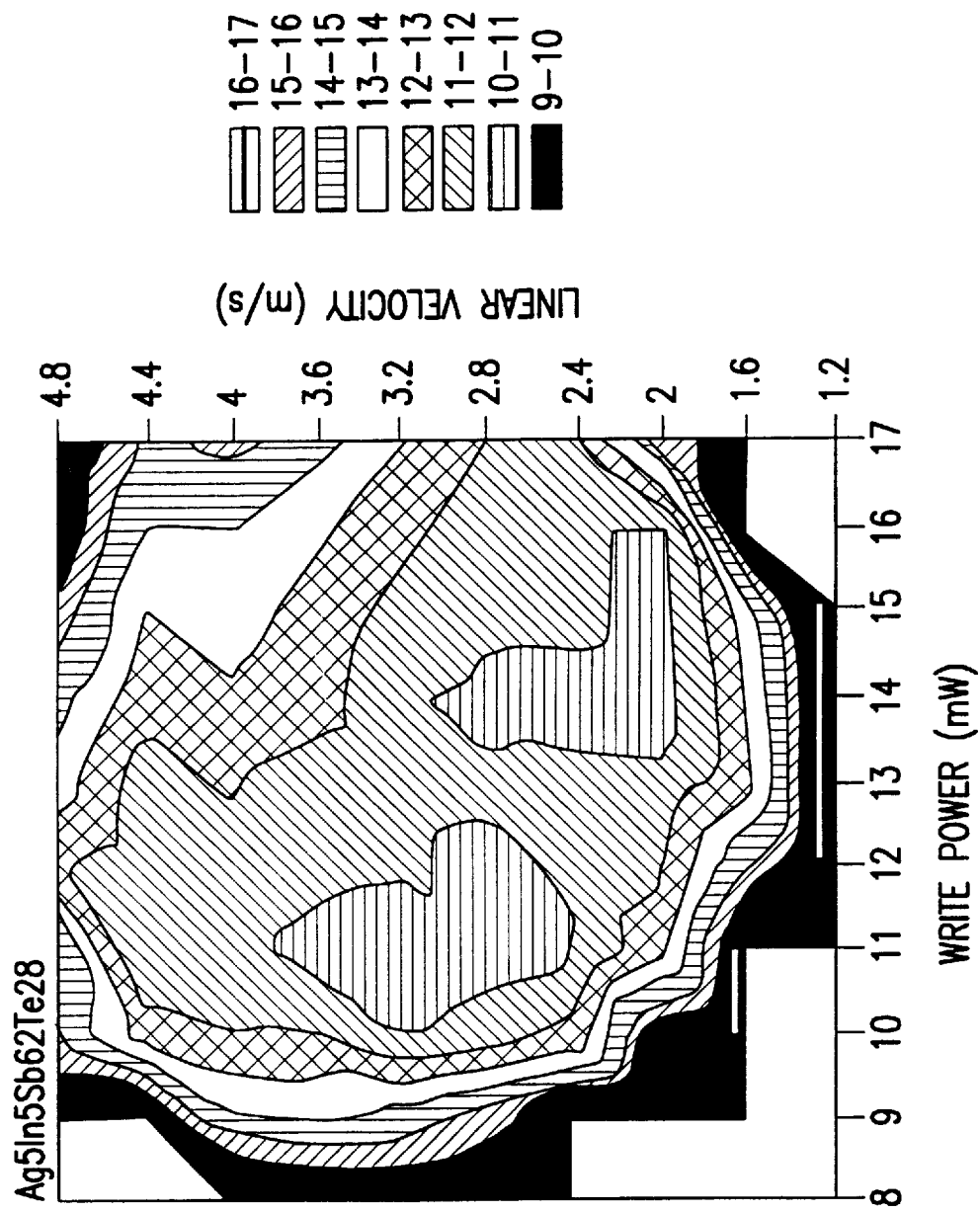

OPTICAL INFORMATION RECORDING MEDIUM

OPTICAL INFORMATION RECORDING MEDIUM

The present invention relates to a rewritable phase-change medium. Particularly, it relates to a phase-change medium which has compatibility with a compact disc, a high density compact disc or a digital video disc.

Along with an increasing amount of information in recent years, a recording medium capable of recording and retrieving a large amount of data at a high density and at a high speed has been demanded, and an optical disk is expected to be just suitable for such an application. As a rewritable-type optical disk, a magneto-optical medium utilizing a magneto-optical effect, or a phase-change medium utilizing the change in reflectance due to the reversible change in the crystal and/or amorphous state, is available.

The phase-change medium has a merit that it is capable of recording/erasing simply by modulating the power of a laser beam without requiring an external magnetic field, and the size of a recording and retrieving device can be made small and simple. Further, it has a merit that a high density recording can be attained by a shorter wavelength light source without any particular alteration of the material of e.g. the recording layer.

As the material for the recording layer of such a phase-change medium, a thin film of a chalcogenide alloy is often used. For example, an alloy of GeSbTe type, InSbTe type, GeSnTe type or AgInSbTe type may be mentioned.

In a rewritable phase-change type recording medium which is practically employed at present, a crystal state is an unrecorded or erased state, and recording is carried out by forming an amorphous mark. The amorphous mark is formed by heating the recording layer to a temperature higher than the melting point, followed by quenching. To prevent evaporation or deformation of the recording layer by such heat treatment, it is common to sandwich the recording layer with heat resistant and chemically stable dielectric protective layers. In the recording step, these protective layers facilitate heat dissipation from the recording layer to realize overcooled state, and thus contribute to formation of the amorphous mark.

Further, it is common that a metal reflective layer is formed on the above described sandwich structure to obtain a quadri-layer structure, whereby the heat dissipation is further facilitated so that the amorphous mark will be formed under a stabilized condition.

Erasing (crystallization) is carried out by heating the recording layer to a temperature higher than the crystallization temperature and lower than the melting point of the recording layer. In this case, the above-mentioned dielectric protective layers serve as heat accumulating layers for keeping the recording layer at a temperature sufficiently high for solid phase crystallization.

In recent years, rewritable compact disks (CD-Rewritable, CD-RW) have been proposed. CD-RW has retrieving compatibility with CD or CD-ROM, although the reflectance is low. Further, a rewritable model of DVD (Digital Video Disc or Digital Versatile Disc) which is highly densified CD, has also been proposed.

CD-RW is provided with a wobbling groove, in which recording is carried out. The wobbling frequency is one having a carrier frequency of 22.05 kHz freqency-modulated (FM) by address information. This is called ATIP signal.

By using ATIP signal, it becomes possible to control the rotational speed of an unrecorded disc, and recording can be carried out at a linear velocity of 1, 2 or as high as 4 or 6 times of the CD linear velocity (from 1.2 to 1.4 m/s).

In such a case, in order to use an inexpensive semiconductor laser, the recording power has to be at most about 15 mW, and even if the linear velocity during recording is different, a desired mark length must be recorded simply be changing the reference clock frequency T in inverse proportion to the linear velocity.

However, with a phase-change medium, a change in the linear velocity during recording is influential over the process for forming amorphous marks and over the erasing process by recrystallization, and if the ratio of the maximum linear velocity to the minimum linear velocity exceeds about 2, it becomes impossible to carry out normal recording at either linear velocity, in many cases.

Usually, a recordable disc requires a slightly higher irradiation power to heat the recording layer to the same temperature if the linear velocity becomes high.

However, even if the temperature of the recording layer is brought to the same level by adjusting the irradiation power, if the linear velocity is different, the same heat history may not necessarily be accomplished.

Formation of amorphous marks is carried out by quenching the recording layer which has once been melted by a recording power, at a speed of at least the critical cooling rate. This cooling rate depends on the linear velocity when the same layer structure is employed. Namely, at a high linear velocity, the cooling rate is high, and at a low linear velocity, the cooling rate is low.

On the other hand, to erase the amorphous marks, it is necessary to maintain the recording layer at a temperature higher than the crystallization temperature and lower than the melting point or its vicinity for a certain period. This temperature maintaining time tends to be short at a high linear velocity and long at a low linear velocity.

Accordingly, if irradiation with a laser beam is carried out under a relatively high linear velocity recording condition, the heat distribution at the irradiated portion of the recording layer becomes relatively rapid timewise and spatially, whereby there will be a problem that at the time of erasing, a non-erased portion may remain. To cope with such a recording condition, a compound with a composition having a relatively high crystallization speed may be used for the recording layer, or a layered structure whereby heat is hardly dissipated, may be employed for the recording layer, so that crystallization i.e. erasing can be carried out in a relatively short period of time.

On the contrary, under a relatively low linear velocity recording condition, the cooling rate tends to be low as described above, whereby recrystallization during recording is feared.

As a method for preventing recrystallization during formation of record marks, a compound with a composition having a relatively slow crystallization speed may be employed, or a layer structure whereby heat is readily dissipated, may be employed for the recording layer.

However, with e.g. CD-RW, it is not preferred that separate discs have to be prepared for recording at 2- and 4-times velocities of CD.

There have been some reports including one by the present inventors with respect to a method for obtaining good overwriting characteristics within a linear velocity range of from 1- or 2-times velocity of CD to about 10 m/s by changing the pulse strategy (a system for controlling by dividing the irradiation beam into pulses to obtain a good pit shape) depending upon the linear velocity. However, generally, to make the pulse strategy changeable makes the pulse forming circuit, etc. complicated, thus leading to an increase of the cost for producing the drive. Accordingly, it is desirable that a wide range of the linear velocity can be covered simply by changing the standard clock period with the same pulse strategy i.e. without changing the pulse strategy.

It is an object of the present invention to provide a phase-change medium whereby the margins for the recording linear velocity and the writing power are improved to a large extent.

The present invention provides an optical information recording medium for recording, retrieving and erasing mark length-modulated amorphous marks, which comprises a substrate, and a lower protective layer, a phase-change recording layer, an upper protective layer and a reflective layer having a thickness of from 40 to 300 nm and a volume resistivity of from 20 to 150 nΩ·m, formed in this sequence on the substrate.

In the accompanying drawings:

FIG. 14 is a view illustrating the state of thermal diffusion in the recording layer of the optical information recording medium of the present invention.

FIG. 16 is a view illustrating the temperature profile of the recording layer.

FIG. 18 is a view showing the contour of 3T mark jitter in Example 1.

Now, the present invention will be described in detail with reference to the preferred embodiments.

Figure 1:
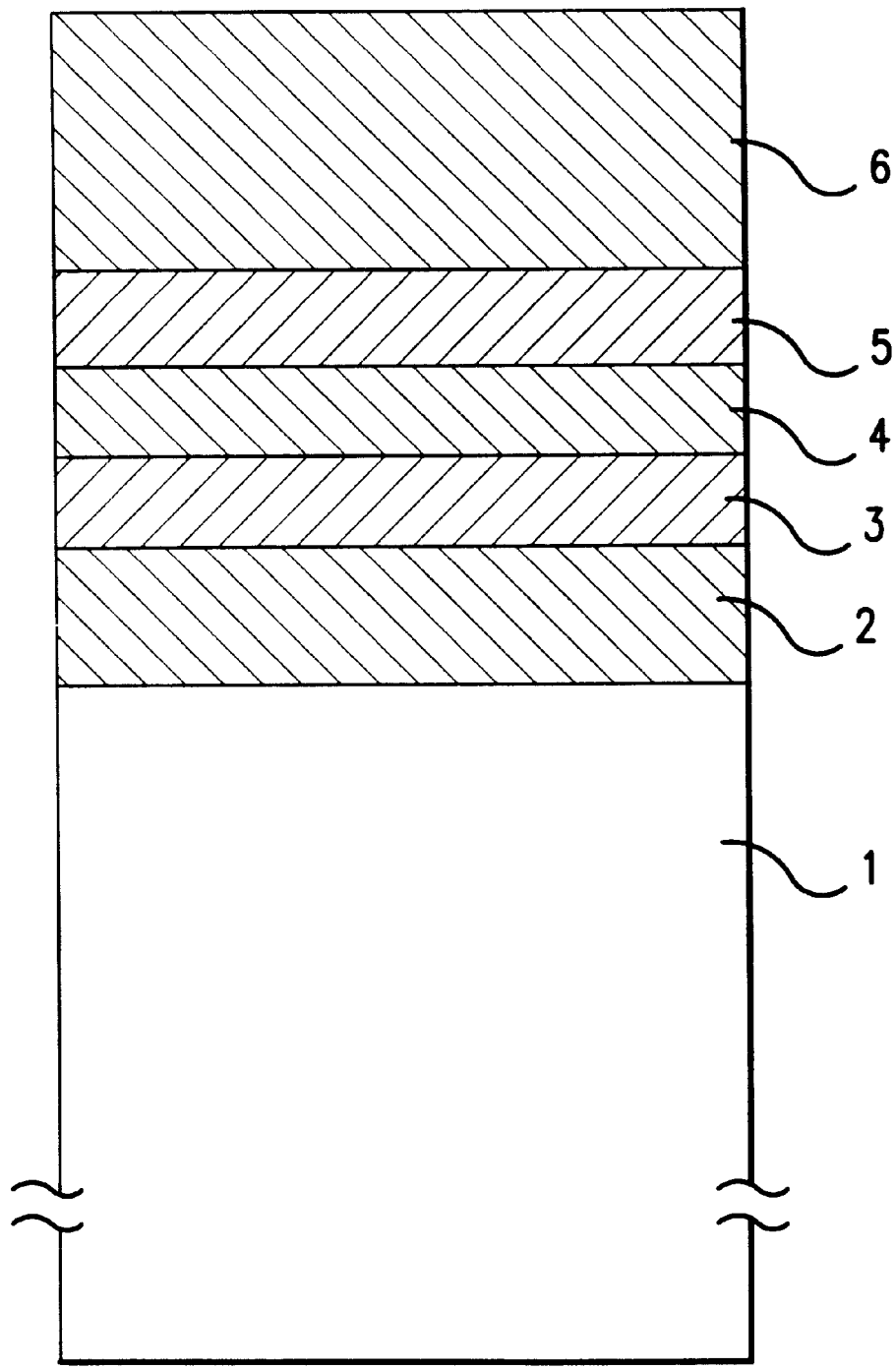
FIG. 1 is a schematic view illustrating the layer structure of the optical information recording medium of the present invention.

As schematically shown in FIG. 1, the layer structure of the disc in the present invention comprises at least a lower protective layer 2, a phase-change recording layer 3, an upper protective layer 4 and a reflective layer 5 formed on a substrate 1. The protective layers 2 and 4, the recording layer 3 and the reflective layer 5 may be formed by e.g. a sputtering method. It is preferred to carry out layer formation in an in-line apparatus wherein a target for the recording layer, a target for the protective layers and if necessary, a target for the reflective layer, are disposed in the same vacuum chamber or in the connected vacuum chambers, from the viewpoint of preventing oxidation or contamination of the respective layers. Further, such a method is preferred also from the viewpoint of productivity.

It is preferred to provide a protective coating layer 6 made of a ultraviolet curable or thermosetting resin on the reflective layer 5 from the viewpoint of prevention of scratches, prevention of deformation and improvement of corrosion resistance. The protective coating layer is usually formed by a spin coating method preferably in a thickness of from 1 to 10 mm.

As the substrate 1 of the recording medium in the present invention, a glass, a plastic or one having a photocurable resin formed on glass may be employed. From the viewpoint of the productivity and costs, a plastic is preferred, and a polycarbonate resin is particularly preferred.

To prevent deformation due to a high temperature during recording, a lower protective layer 2 is formed on the substrate surface, and an upper protective layer 4 is formed on the recording layer 3.

The materials for the protective layers 2 and 4 are determined taking into consideration the refractive indices, the thermal conductivities, the chemical stability, the mechanical strength, the adhesion, etc. Usually, an oxide, sulfide, carbide or nitride of a metal or semiconductor, or a fluoride of e.g. Ca, Mg or Li, having high transparency and high melting point, can be used. Such an oxide, sulfide, nitride, carbide or fluoride may not necessarily take a stoichiometrical composition, and it is effective to control the composition to adjust the refractive index or the like or to use them in admixture.

From the viewpoint of the repetitive overwriting characteristic, a dielectric mixture is preferred. More specifically, a mixture of ZnS or a rare earth sulfide with a heat resistant compound such as an oxide, nitride or carbide, may be mentioned.

The film density of such a protective layer is preferably at least 80% of the bulk state from the viewpoint of mechanical strength. In a case where a thin film of a dielectric mixture is employed, a theoretical density of the following formula is used as the bulk density:

$$\rho = \Sigma m_i \rho_i \quad (1)$$

$m_i$: mol concentration of each component i
$\rho_i$: bulk density of each component The thickness of the lower protective layer 2 is preferably thick in order to prevent deformation of the substrate due to a thermal damage during repetitive overwriting and thereby increase the repetitive overwriting durability. If the lower protective layer thickness is thin, jitter is likely to deteriorate at the initial stage of repetitive overwriting. According to an observation by an atomic force microscope (AFM) by the present inventors, it has been found that this deterioration at the initial stage is due to a dent deformation of from 2 to 3 nm of the substrate surface. To suppress the deformation of the substrate, the thickness of the protective layer is preferably such that it provides a heat insulating effect not to conduct the heat generated by the recording layer and it mechanically suppresses the deformation. For example, the thickness is preferably at least 70 nm, more preferably at least 80 nm, in order to accomplish, for example, 1,000 times of repetitive overwriting in CD-RW.

The upper protective layer 4 prevents mutual diffusion of the recording layer 3 and the reflective layer 5.

The recording layer 3 of the medium of the present invention is a phase-change recording layer, and its thickness is preferably within a range of from 10 to 30 nm. If the thickness of the recording layer 3 is thinner than 10 nm, no adequate contrast tends to be obtained. Further, if it is less than 15 nm, the crystallization speed tends to be low, and especially when it is less than 10 nm, it tends to be difficult to erase the record in a short period of time. On the other hand, if it exceeds 30 nm, no adequate optical contrast tends to be obtained, and the heat capacity increases, whereby the recording sensitivity tends to be poor, such being undesirable. Furthermore, the volume change of the recording layer due to the phase change increases as the recording layer becomes thick, and microscopic deformations are likely to be accumulated in the protective layers and the substrate surface during the repetitive overwriting, thus leading to an increase of noise.

Further, if the thickness exceeds 30 nm, deterioration due to repetitive overwriting tends to be remarkable, such being undesirable. Especially from the viewpoint of the repetitive overwriting durability, the thickness is preferably at most 25 nm.

In the present invention, the recording layer 3 is preferably a thin film of an alloy of MSbTe, where M is at least one member selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and rare earth elements, which is stable in both crystal and amorphous states and at the same time, capable of phase transition at a high speed between the two states and which contains a SbTe alloy in the vicinity of the $Sb_{70}Te_{30}$ eutectic point as the main component.

As mentioned above, the linear velocity dependency of the medium of the present invention is primarily based on the $Sb_{70}Te_{30}$ eutectic point composition and influenced by the Sb/Te ratio.

Accordingly, as the composition for the recording layer, a thin film of an alloy of $Mw(Sb_zTe_{1-z})_{1-w}$, where $0 \leq w \leq 0.2$, $0.5 \leq z \leq 0.9$, and M is at least one member selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and rare earth elements, is preferably employed.

To meet the high linear velocity, the amount of Sb may be increased. However, if it is increased too much, the stability of amorphous marks tends to be impaired.

Therefore, the amount of Sb is preferably $0.5 \leq z \leq 0.9$, more preferably $0.6 \leq z \leq 0.8$. Bi is incorporated to finely adjust the crystallization speed and the crystallization temperature by substituting it for part of Sb.

In, Ga, Ge, Sn, Si and Pb have an effect of increasing the archival stability by increasing the crystallization temperature. Further, In and Ga form a boundary between amorphous marks and the crystal region and serve to reduce noise in mark length recording, i.e. mark edge detection.

Ag, Zn, Cu, Au, Ag, Pd, Pt, Cr, Co, Zr, Ti, Mn, Mo, Rh and rare earth elements themselves or their compounds with Sb or Te, have high melting points, and thus precipitate as finely dispersed clusters to form crystal nuclei and thus contribute to high speed crystallization. However, if they are too much, they tend to impair the stability of amorphous marks. O, S, Se and Te are in the same family, and they are effective for finely adjusting the crystallization temperature, refractive index and viscosity of the $Sb_{70}Te_{30}$ eutectic alloy by entering into a chain network of Te.

If any one of the additive elements exceeds 20 atomic %, it is likely to bring about segregation or phase separation. Especially, segregation is likely to result by repetitive overwriting, whereby recording can not be carried out under a stabilized condition, such being undesirable.

From the viewpoint of repetitive overwriting durability, each atom is preferably at most 10 atomic %. Especially if O, S, N or Se exceeds 5 atomic %, the crystallization speed tends to be slow, and such an element should better be at most 5 atomic %.

As a specific preferred example, a recording layer made of $Ma_\alpha In_\beta Sb_\gamma Te_\eta$, where Ma is Ag or Zn, $0.03 \leq \alpha \leq 0.1$, $0.03 \leq \beta \leq 0.08$, $0.55 \leq \gamma \leq 0.65$, $0.25 \leq \eta \leq 0.35$, $0.06 \leq \alpha + \beta 0.13$ and $\alpha + \beta + \gamma + \eta = 1$, may be mentioned.

In is effective to increase the archival stability by increasing the crystallization temperature, and in order to secure the storage stability at room temperature, it is required to be at least 3 atomic %. Further, it is capable of forming a smooth boundary between an amorphous mark and a crystal region and capable of reducing noise in mark length recording i.e. mark edge detection. If it is contained more than 8 atomic %, phase separation is likely to result, and segregation is likely to take place by overwriting, such being undesirable. More preferably, the amount of In is from 5 to 8 atomic %.

Ag or Zn is used to facilitate the initialization of an amorphous film immediately after the film formation. It provides sufficient effectiveness when incorporated in an amount of at most 10 atomic %, although the amount may depend upon the initialization method. If it is too much, the archival stability tends to be impaired, or jitter during the above mark end detection tends to deteriorate, such being undesirable.

If Ag or a total of Zn and In exceeds 13 atomic % segregation tends to result during repetitive overwriting, such being undesirable.

As another preferred example of the recording layer, an alloy having a composition of $Mb_vMc_y(Sb_xTe_{1-x})_{1-y-v}$, where Mb is at least one member selected from the group consisting of Ag and Zn, Mc is Ge or Sn, $0.6 \leq x \leq 0.08$, $0.01 \leq y \leq 0.15$, $0.01 \leq v \leq 0.15$, and $0.02 \leq v+v \leq 0.2$, may be mentioned.

By using Ge instead of In, it is possible to improve likelihood of precipitation of low melting point metal In and In compound in the case of the above MaInSbTe alloy On the other hand, by the addition of Ge or Sn, it tends to require time for initialization (crystallization of the as-deposited film).

To overcome likelihood of precipitation of In and difficulty in initialization due to Ge, a five component recording layer having a composition of $Md_aIn_bGe_cSb_dTe_e$, where Md is at least one member selected from the group consisting of Ag and Zn, $0.01 \leq a \leq 0.1$, $0.001 \leq b \leq 0.1$, $0.01 \leq c \leq 0.1$, $0.5 \leq d \leq 0.7$, $0.25 \leq e \leq 0.4$, $0.03 \leq b+c \leq 0.15$, and $a+b+c+d+e=1.0$, may be employed.

The thicknesses of the recording layer and the protective layers are selected so that the absorption efficiency of the laser beam will be good, and the amplitude of the record signal i.e. the contrast between the recorded state and the unrecorded state, will be large taking into consideration not only the above-mentioned limitation from the viewpoint of the mechanical strength and reliability, but also the optical interference effect due to the multilayer structure.

The gist of the present invention resides in employing a reflective layer 5 having a particularly low volume resistivity to improve the linear velocity margin or the writing power margin.

Especially when the upper protective layer 4 is made relatively thick at a level of at least 30 nm, a remarkable effect can be obtained.

It used to be considered that if the upper protective layer is too thick, the time until the heat of the recording layer 3 reaches the reflective layer 5, tends to be long, and the heat dissipation effect by the reflective layer 5 does not effectively work.

Although there has been some cases wherein the upper protective layer 4 is made thick, specific practical applications used to be restricted to a pit position recording method, and the main aim used to be to suppress the heat diffusion to the reflective layer and to increase the sensitivity in recording at a high linear velocity of at least 10 m/s (U.S. Pat. Nos. 5,665,520 and 5,674,649).

However, according to the study by the present inventors, in an application to mark length recording, if the upper protective layer is simply made thick, the cooling rate of the recording layer melted at the time of recording, tends to be too small, whereby there will be a problem that formation of a good amorphous mark will be hindered, and jitter tends to deteriorate. Namely, recrystallization is accelerated during resolidification, whereby a coarse grain zone will be formed along the periphery of an amorphous mark, whereby jitter tends to remarkably deteriorate in mark length recording for detecting the mark edge, as opposed to detecting the position of the mark.

Further, there will be a problem that plastic deformation is accumulated in the interior of the upper protective layer 4 due to a heat cycle of repetitive overwriting, and deterioration is likely to proceed along with the number of overwriting. This problem becomes more distinct in a case of mark length recording where long marks will be involved, than a case of mark position recording constituted solely by short length marks.

The above-mentioned problems become distinct when the linear velocity during recording is low at a level of at most 10 m/s, especially at most 5 m/s. This is attributable to the fact that the cooling rate of the recording layer depends on the relative moving speed between the recording medium and the focused laser beam used for recording, and the cooling rate lowers as the linear velocity lowers. The lowering of the cooling rate further deepens the above-mentioned problems such as hindrance against formation of amorphous marks and an increase of thermal damages during recording.

In the above-mentioned prior art, it is intended to improve the recording sensitivity at a linear velocity of at least 5 m/s, particularly at least 10 m/s, and no mention is made on the problems at such a low linear velocity.

According to the present invention, in recording/retrieving at a low linear velocity, a phase difference $\delta$ due to the phase change can advantageously be utilized by combining a reflective layer 5 having a particularly low volume resistivity to the upper protective layer 4 formed to be thick, and it is also possible to obtain an effect that the recording sensitivity and the linear velocity dependency can be improved over the conventional rapid cooling structure having a thin upper protective layer.

Accordingly, the thickness of the upper protective layer is preferably from 30 to 60 nm, more preferably from 40 to 60 nm.

Even when the effect of the phase difference $\delta$ is not positively utilized, here is a merit of employing a relatively thick upper protective layer and a reflective layer 5 having a particularly low volume resistivity.

This may be explained as follows with reference to FIG. 14.

For recording, it is firstly necessary to raise the temperature of the recording layer to a level of at least the melting point. However, thermal conduction requires a limited time, and in the temperature raising process (not more than an initial few tens nano seconds), thermal conduction in the plane direction is not distinct, and the temperature distribution is determined substantially solely by thermal conduction in the thickness direction (FIG. 14a). Accordingly, when the forward end portion of a record mark is to be heated to a predetermined temperature, this heat conduction in the thickness direction is effective.

On the other hand, after a few tens nano seconds from the initiation of the heating, the change in the plane direction of the temperature distribution due to thermal conduction in a transverse direction becomes important as shown in FIG. 14(b), because in the thickness direction, the effective range of thermal diffusion is in a distance of at most 0.1 $\mu$m, whereas in the plane direction the effective range of thermal diffusion is of 1 $\mu$m order.

Especially, the cooling rate of the recording layer governing the process for conversion to amorphous state, depends on this plane distribution, and the above-mentioned linear velocity dependency of the cooling rate is governed by this plane distribution.

At a low linear velocity, the scanning speed of a laser beam is slow, whereby within the same irradiation time, heating extends to the peripheral portion during the scanning, whereby the influence of thermal conduction in the plane direction is substantial.

Further, the influence of thermal conduction in the plane direction is substantial also at the rear end portion of a long mark which is irradiated with a recording laser beam continuously for a relatively long period of time.

Accordingly, in order to carry out mark length recording properly within a wide linear velocity range such that the ratio of the maximum linear velocity to the minimum linear velocity during recording becomes at least twice, it is necessary to precisely control not only the time change or the temperature distribution in the thickness direction but also the time change and the temperature distribution in the plane direction.

In FIG. 14(b), if the upper protective layer is made to have a low thermal conductivity and a proper thickness, a certain delay effect may be brought about against thermal diffusion to the reflective layer, whereby it becomes easy to control the temperature distribution in the plane direction.

The conventional so-called "rapid cooling structure" was effective for forming amorphous marks free from coarse grains by recrystallization, but it brought about deterioration in the recording sensitivity, since the thickness of the upper protective layer was at most 30 nm, and no adequate attention was paid to this effect of delaying thermal conduction.

The thermal conductivity of the reflective layer highlighted in the present invention is the thermal conductivity in the state of a thin film actually formed on the upper protective layer. The thermal conductivity of a thin film is usually substantially different from and usually smaller than the thermal conductivity of bulk. Especially when the thickness is less than 40 nm, it may happen that the thermal conductivity decreases by at least 1 order of magnitude due to an influence of the island structure at the initial stage of growth of the film, such being undesirable.

Further, the crystallizability or the amount of impurities is likely to be different depending upon the film-forming condition, whereby the thermal conductivity may be different even with the same composition.

In the present invention, the thermal conductivity of the reflective layer can directly be measured in order to define the reflective layer 5 showing good characteristics. However, the degree of the thermal conductivity can be estimated by means of the electrical resistance, since the thermal conductivity and the electrical conductivity are in a good proportional relationship with a material wherein mainly electrons govern the heat or electrical conductivity, like a metal film.

The electrical resistance of a thin layer can be represented by a resistivity stipulated by its thickness or area of the measured region. The volume resistivity and the sheet resistivity can be measured by a common four prove method, and they are prescribed in JIS K7194.

By such a resistivity, data can be obtained far more simply and with far better reproducibility than the actual measurement of the thermal conductivity itself.

In the present invention, a preferred reflective layer has a volume resistivity of from 20 to 150 nΩ·m, preferably from 20 to 100 nΩ·m. A material having a volume resistivity of less than 20 nΩ·m can hardly be obtained in a thin film state. Even when the volume resistivity is larger than 150 nΩ·m, the sheet resistivity may be made low if the film thickness is made, for example, at least 300 nm. However, according to the study by the present inventor, no adequate heat dissipation effect has been obtained even when the sheet resistivity is lowered with such a material having a high volume resistivity. It is considered that with a thick film, the thermal capacity per unit area increases, whereby heat dissipation of the reflective layer itself tends to be slow. Further, with such a thick film, it takes time for film forming, and the cost of material increases. Thus, such is not desirable from the viewpoint of the production cost.

Accordingly, it is especially preferred to employ a material having a low volume resistivity so that with a film thickness of at most 300 nm, a sheet resistivity of from 0.2 to 0.9 Ω/□ can be obtained.

To obtaining such a low volume resistivity, a substantially pure Al (inclusive of pure Al) film having an impurity content of not more than 2 atomic % or a substantially pure Au or Ag (inclusive of pure Au or Ag) film having an impurity content of not more than 5 atomic % is preferred.

Specifically, an Al metal material suitable for the present invention is preferably an Al—Mg—Si type alloy containing from 0.3 to 0.8 wt % of Si and from 0.3 to 1.2 wt % of Mg.

Further, it is known that with an Al alloy containing from 0.2 to 2 atomic % of Ta, Ti, Co, Cr, Si, Sc, Hf, Pd, Pt, Mg, Zr, Mo or Mn in Al, the volume resistivity increases, and the hillock resistance is improved, in proportion to the concentration of the added element, and such an alloy may be used in consideration of the durability, the volume resistivity and the film-forming speed.

With the Al alloy, if the amount of the additive component is less than 0.2 atomic %, the hillock resistance tends to be inadequate in many cases, although such may depend upon the film-forming conditions. Further, if it exceeds 2 atomic %, the above-mentioned low resistivity can not be obtained.

When the archival stability is of importance, the additive component is preferably Ta.

On the other hand, when the above reflective layer is a thin film of an Ag alloy, one containing from 0.2 to 5 atomic % of Ti, V, Ta, Nb, W, Co, Cr, Si, Ge, Sn, Sc, Hf, Pd, Rh, Au, Pt, Mg, Zr, Mo or Mn, is preferred. When the archival stability is of importance, the additive component is preferably Ti or Mg.

The present inventors have confirmed that with the additive element to Al or the additive element to Ag, the volume resistivity increases in proportion to the concentration of the additive element.

Usually it is considered that addition of an impurity tends to reduce the crystal particle size and to increase electron scattering at the grain boundary to lower the thermal conductivity. It is necessary to adjust the amount of the added impurity in order to obtain the high thermal conductivity of the material itself by increasing the crystal particle size.

In order to obtain a high thermal conductivity, it is preferred to reduce the amount of the impurity, as mentioned above. On the other hand, pure metal of Al or Ag tends to be inferior in corrosion resistance or hillock resistance. Accordingly, the optimum composition is determined taking into the balance of both aspects into consideration.

Further, the reflective layer is usually formed by a sputtering method or a vacuum deposition method, whereby the total amount of impurities is reduced including the amounts of impurities in the target or the vapor deposition material itself and the moisture and the oxygen amount entered during the film-forming operation. To reduce the amount of the impurity to be less than 2 atomic %, the background pressure of the process chamber is preferably at most $1\times10^{-3}$ Pa.

When the film-forming is carried out under the background pressure of at least $1\times10^{-4}$ Pa, the film-forming rate is preferably adjusted to be at least 1 nm/sec, preferably at least 10 nm/sec, thereby to prevent inclusion of unexpected impurities.

Otherwise, when the additional element is intentionally contained in an amount of more than 1 atomic %, it is advisable to adjust the film-forming rate at a level of at least 10 nm/sec thereby to minimize inclusion of unexpected impurities.

The crystallizability or the impurity composition in the layer depends also on the method for preparation of the alloy target used for sputtering and the sputtering gas (Ar, Ne, Xe or the like).

As mentioned above, the volume resistivity in the state of a thin film can not be determined simply by the metal material and the composition. Accordingly, even if there is the prior art specifying an Al alloy reflective layer material (JP-A-3-1338, JP-A-1-169571, JP-A-1-208744 and JP-A-2-128332), such prior art does not teach the layer structure of the present invention.

Further, as mentioned above, according to the present invention, a high thermal conductivity of the reflective layer is secured by the volume resistivity, which can easily and accurately be measured, to ensure the heat dissipation effect of the reflective layer, paying a particular attention to the thermal conductivity in the state of a thin film actually formed on a disc. As compared with the prior art wherein reference is made simply to the alloy composition or the thermal conductivity of bulk, the industrial merits of the present invention are substantial. Further, the thermal conductivity in the state of a thin film is substantially different from the thermal conductivity of bulk and depends not only on the composition but also on the film-forming condition. Therefore, it is apparent that the present invention is not a mere substitution of parameters within the optimum range of the thermal conductivity.

It is also effective to form the reflective layer in a multilayer structure in order to obtain a still higher thermal conductivity and higher reliability.

The multilayer structure of the reflective layer is effective also to obtain a desired sheet resistivity with a desired layer thickness by combining a material having a high volume resistivity and a material having a low volume resistivity.

It is preferred that the reflective layer is made to be a multilayer reflective layer comprising a plurality of metal films, so that the total thickness is from 40 to 300 nm, and at least 50% of the thickness of the multilayer reflective layer is constituted by a thin metal layer (which may have a multilayered structure) having a volume resistivity of from 20 to 150 nΩ·m.

In the present invention, the material for the upper protective layer 4 is preferably one having a low thermal conductivity, so that the effect for delaying thermal conduction by the slightly thick upper protective layer of from 30 to 60 nm, can be adequately obtained.

Specifically, the material is preferably a composite dielectric made of a heat resistant compound which contains from 20 to 90 mol % of one or more of ZnS, ZnO, $TaS_2$ and a rare earth sulfide and which has a melting point of decomposition point of at least 1,000° C.

More specifically, it is preferably a composite dielectric containing from 50 to 90 mol % of a sulfide of a rare earth such as La, Ce, Nd or Y.

Or, the range of the composition of ZnS, ZnO or a rare earth sulfide is preferably from 70 to 90 mol %.

The heat resistant compound material to be mixed therewith and having a melting point or decomposition point of at least 1,000° C., may, for example, be an oxide, nitride or carbide of e.g. Mg, Ca, Sr, Y, La, Ce, Ho, Er, Yb, Ti, Zr, Hf, V, Nb, Ta, Zn, Al, Si, Ge or Pb, or a fluoride of e.g. Ca, Mg or Li.

Especially, the material to be mixed with ZnO, is preferably a sulfide of a rare earth such as Y, La, Ce or Nd, or a mixture of such a sulfide and oxide.

Among conventional materials for the protective layers, thin films made essentially of $SiO_2$, $Ta_2O_5$, $Al_2O_3$, AlN or SiN have high thermal conductivities by themselves, such being undesirable.

It is disclosed that the thickness of the upper protective layer made of $ZnS:SiO_2$ is set to be from 30 to 60 nm, and an Al alloy containing from 0.5 to 5 atomic % of an impurity, is used for the reflective layer (JP-A-7-262613). However, this prior art is intended to increase the sensitivity by limiting the heat dissipation to the reflective layer, for example, by disclosing that the thickness of the reflective layer is preferably at most 100 nm to increase the sensitivity. Thus, it discloses nothing about the concept of the present invention such that the thermal conductivity of the reflective layer in the state of a thin film is limited to the particularly high thermal conductivity in order to maintain the cooling rate at a high level. Thus, even if the prior art mentions about a case showing a similar composition for the reflective layer, such prior art teaches nothing about the reflective layer having a low volume resistivity.

According to the present invention, it is at least possible to remarkably improve the characteristic in high density mark recording in that it ensures an improvement of the recording sensitivity and formation of good amorphous marks (prevention of recrystallization) in the mark length recording, in a low linear velocity region of not higher than 10 m/s, for which the prior art was inadequate. Further, for this purpose, an attention has been paid to the importance of the thermal conductivity in the state of an actual thin film, and an attention has been paid to the volume resistivity which can be simply and accurately be measured. This is important to facilitate the production control and to ensure the effect of the present invention in a mass production process. Furthermore, the above-mentioned prior art discloses nothing about the phase difference and groove geometry designed in consideration of compatibility with an optical recording medium for exclusive use for retrieving which utilizes pits.

Now, a preferred design embodiment of the present invention will be described. Namely, a stable tracking servo characteristic is obtained while taking the contrast at a high level by optimizing the optical design. It is particularly intended to provide a medium which is readily compatible with CD or DVD whereby the contrast and the tracking servo signal are obtained by utilizing the phase difference in pits.

In the present invention, this contrast is defined by modulation.

Modulation (hereinafter referred to simply as Mod) is defined by the ratio of the amplitude of an envelope retrieving signal to the upper end level thereof, when a random pattern containing all mark lengths is recorded in mark length modulation recording, and the retrieving signal is observed in a DC coupling state:

Mod=(amplitude of envelope retrieving signal)/(upper end level of the envelope)   (2)

To accomplish a high SN (signal to noise) ratio, this modulation is required to be set high.

As a more specific example, in order to secure compatibility with CD-RW, DVD or CD as rewritable DVD, the modulation stipulated in the CD or DVD standards must be taken at a high level.

Figure 2:
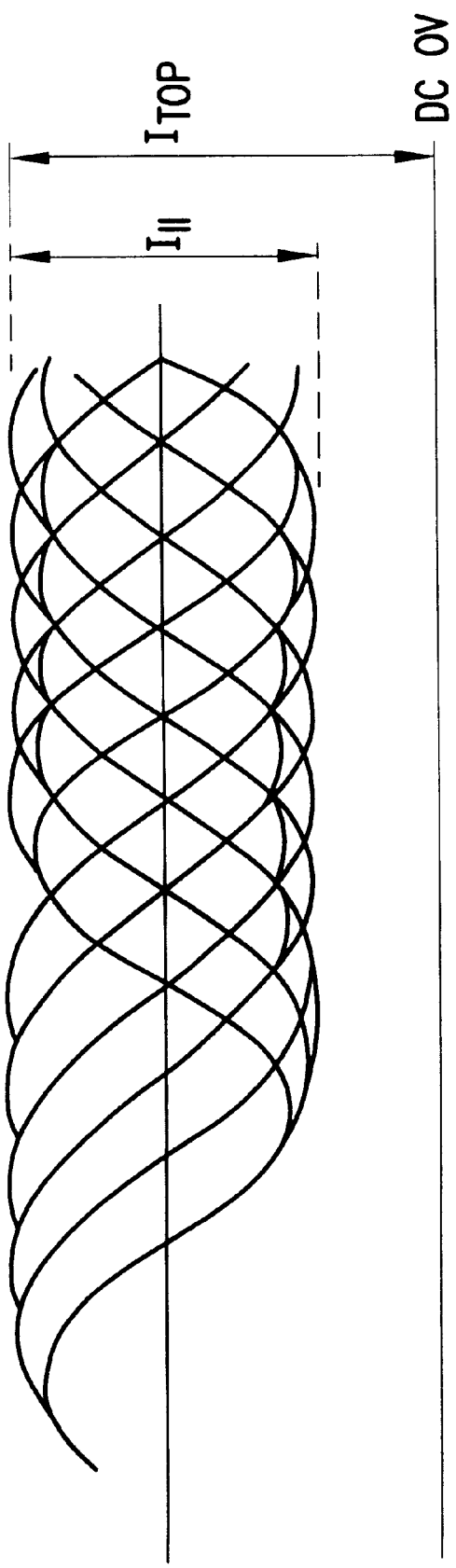
FIG. 2 is a view illustrating the modulation of a signal.

The modulation in CD or DVD is defined by a ratio of $I_{11}/I_{top}$ (or $I_{14}/I_{top}$), where $I_{top}$ is the top signal intensity of the longest mark (11T in CD and 14T in DVD), and $I_{11}$ (or $I_{14}$) is the signal amplitude in the DC retrieving signal (the retrieving signal containing a direct current component) when a random signal is recorded as shown in FIG. 2.

The signal amplitude $I_{11}$ (or $I_{14}$) corresponds to the amplitude of the envelope retrieving signal in the above definition, and $I_{top}$ corresponds to the upper end level thereof. The stipulation relating to the modulation in rewritable CD or DVD is somewhat relaxed as compared with the stipulation for exclusive use for retrieving, and it is usually desired that Mod>0.5.

$I_{top}$, in fact, corresponds to the reflectance in the groove at an inter-mark portion (crystal state).

On the other hand, in a case where the amorphous mark recorded in a groove narrower than a width of 1 μm, is read out by a focused laser beam having a diameter of the same level, interference of a plane wave must be taken into consideration.

The retrieving signal amplitude $I_{11}$ depends on both the intensity difference $I_{ref}$ of reflected lights from the crystal portion and the amorphous portion of the phase-change medium and the reflectance difference $I_{phase}$ due to the phase difference.

Namely, it is necessary to take into consideration the phase difference δ between the reflected lights from the amorphous mark and the crystal state, because the phase difference between the amorphous mark and the crystal state brings about the same effect as the presence of a pit having a different depth.

The signal amplitude in such a case may be represented approximately by the following formula (3) as a sum of the amplitude $I_{ref}$ due to the reflectance difference and the amplitude $I_{phase}$ due to the phase difference:

$$I_{11}=I_{ref}+I_{phase} \quad (3)$$

Figure 3:
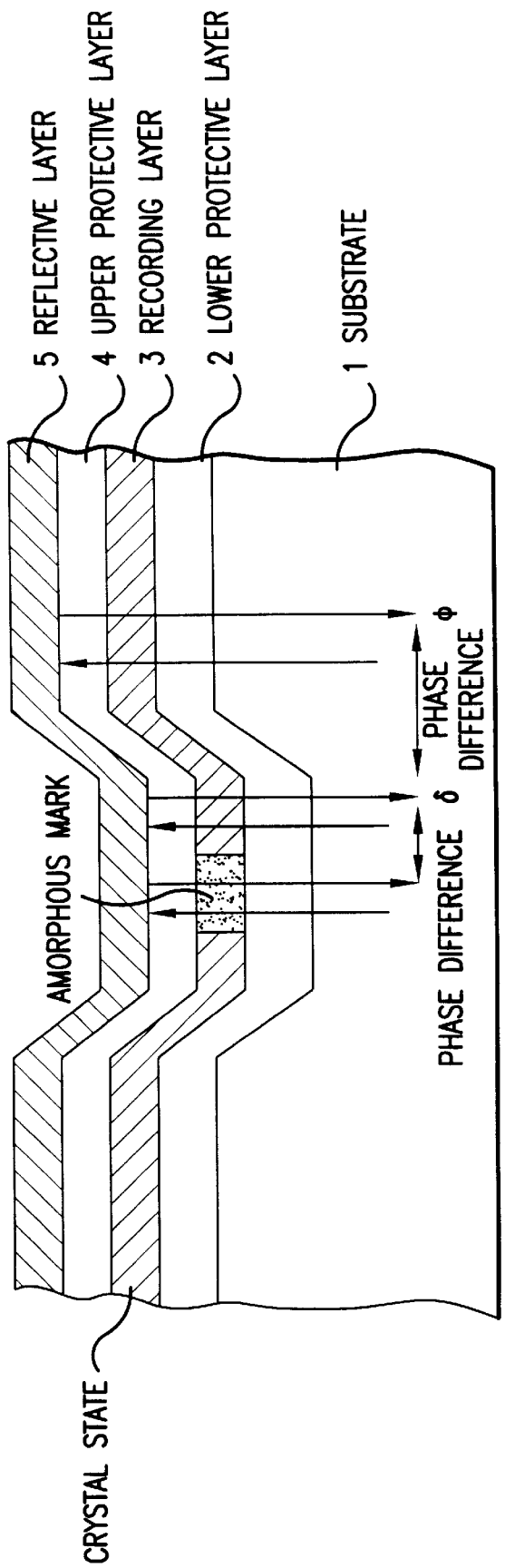
FIG. 3 is a view illustrating the phase difference of reflected lights.

As shown in FIG. 3, the phase difference δ is defined by the following formula (4) in a case where a recording medium having the above-described multilayer structure is irradiated by a retrieving laser beam from the rear side of the substrate to read out the reflected light:

δ=(Phase of reflected wave passed through crystal region)−(phase of reflected wave passed through amorphous region) (4)

δ being negative provides such an effect as if the groove depth became deeper at the amorphous mark portion, and δ being positive provides such an effect as if the groove depth became shallower at the amorphous mark portion. However, the phase can be reduced to a period of $2\pi$. Accordingly, in a case where −π<phase difference<0, the phase difference may be replaced by a value within a range of π<phase difference<2π (vice versa).

On the other hand, when recording is carried out in a groove, a phase difference due to the groove depth represented by the following formula, will be present.

Φ=(Phase of reflected wave from land)−(Phase of reflected wave from groove) (5)

Here, when the refractive index of the substrate is n, and d is the groove depth, the phase difference is specifically represented by the following formula:

$$\Phi=-4\pi nd/\lambda \quad (6)$$

According to this definition, Φ<0, since the groove is located nearer from the beam incident to the substrate surface. Usually, d is selected so that |Φ|. Namely, −π<Φ<0. As mentioned above, the same result is obtainable even if 2π is added, and accordingly, the formula may be rewritten as π<Φ<2π.

For local interference of plane waves in a laser beam, it is necessary to take into consideration a sum of the phase difference Φ due to this groove depth and the phase difference δ due to the phase change represented by the following formula:

$$\Delta=\delta+\Phi=\delta-4\pi nd/\lambda \quad (7)$$

Accordingly, a locally formed amorphous mark is as if a pit having a phase difference δ is present in the groove, and a contrast greater than a mere difference in the reflectance between the crystal state and the amorphous state, may sometimes be obtained. Namely, it may contribute to a direction such that $I_{phase}$ increases $I_{11}$.

The condition for this i.e. in order to satisfy $I_{phase}>0$ in recording in the groove, Δ is preferably in the vicinity of ±π. This corresponds to the condition under which the maximum modulation can be taken with a compact disc utilizing only the phase difference of pits.

From the formula (7), in order for Δ to be close to −π, the phase difference δ should preferably change as if the groove would become deeper at the amorphous portion. Namely, it is preferred that the phase difference δ satisfies the following formula:

$$-\pi<\delta<0 \quad (8)$$

In order for a rewritable disc of a phase-change system to be played back by a CD or DVD player for exclusive use for retrieving or by a ROM drive, it is necessary to pay an attention not only to the quality of the recording signal but also to the servo signal.

Namely, such an apparatus for exclusive use for retrieving utilizes servo signals generated from pits for tracking servo or for seeking a particular track, and there is a case where such an apparatus can not necessarily efficiently detect push-pull signals generated from the groove and utilizes mainly the phase difference δ of a recorded mark. Therefore, it is necessary to optimize the phase difference δ by a phase-change, taking the servo signals into consideration.

Here, the servo signals in question may be push-pull signals and radial contrast.

Here, the radial contrast RC is defined as follows:

$$RC=2\{(I_L-I_G)/(I_L+I_G)\} \quad (9)$$

Here, $I_L$ and $I_G$ are the intensities of the reflected lights from the land portion and the groove portion, respectively.

The radial contrast is employed in precise control for precisely moving on a predetermined number of tracks in the vicinity of an objective track.

Figure 4:
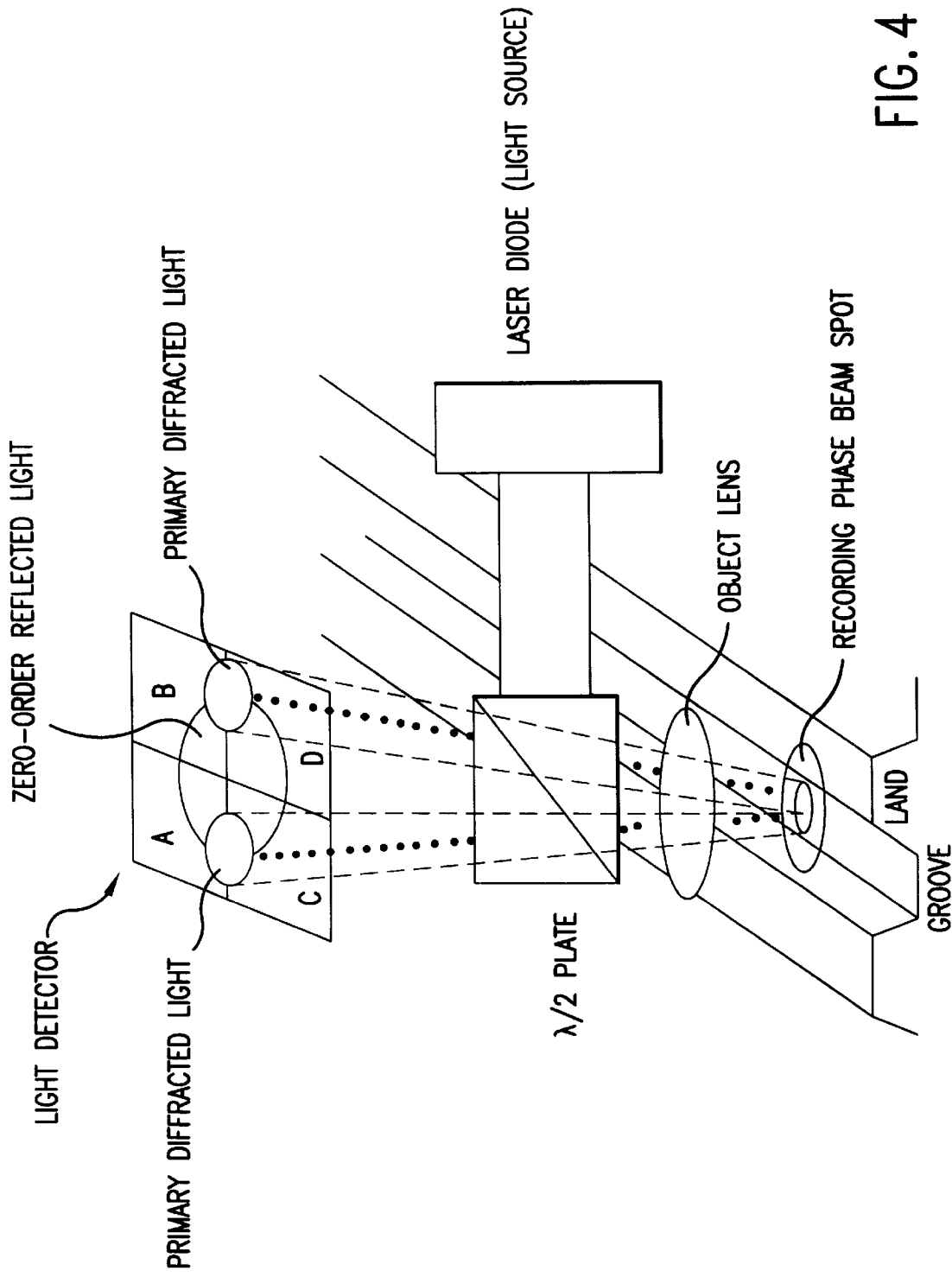
FIG. 4 is a view illustrating a light detecting system.

As shown in FIG. 4, the reflected light intensity is a sum signal $I_1+I_2=(A+C)+(B+D)$ of light detectors divided into four and disposed on both sides of the track center. Here, $I_1=A+C$, and $I_2=B+D$.

Practically, the intensities at the groove portion and the land portion of the track-cross signal obtained under a focus servo alone, are measured.

The radical contrast is defined before and after recording. The radial contrast after recording is calculated by using intensities $I_{La}$ and $I_{Ga}$ obtained by averaging the signal intensities of the recorded reflection-reduced portions by a low pass filter.

A push-pull signal PPb by a groove before recording is defined by:

$$PPb=|I_1-I_2| \quad (10)$$

A push-pull signal PPa after recording is likewise defined by using an average value of difference signals (a value after passing through a low frequency filter). Each of these is a common definition.

However, in the CD standards, PPb is normalized by $I_G$, and PPa is normalized by $I_{top}$. In some cases, instead of $I_{top}$, an average reflectance of a groove after recording $I_{Ga}$ or $(I_{Ga}+I_{La})/2$ may be used for normalization.

Further, as a practical servo circuit called DPP (divided push-pull), there is one devised to minimize fluctuation of servo signals due to recording, by adding a division circuit which divides push-pull signals by such reflectance values.

In the present invention, the amplitude of a push-pull signals itself is represented by PPa or PPb.

Further, in CD, a $|I_1-I_2|$ value which is off set by 0.1 μm from the track center, is employed. Whereas, in the present invention, the precision of the absolute value of PPa itself is not considered, and no such distinction is made on this point.

Figure 5:
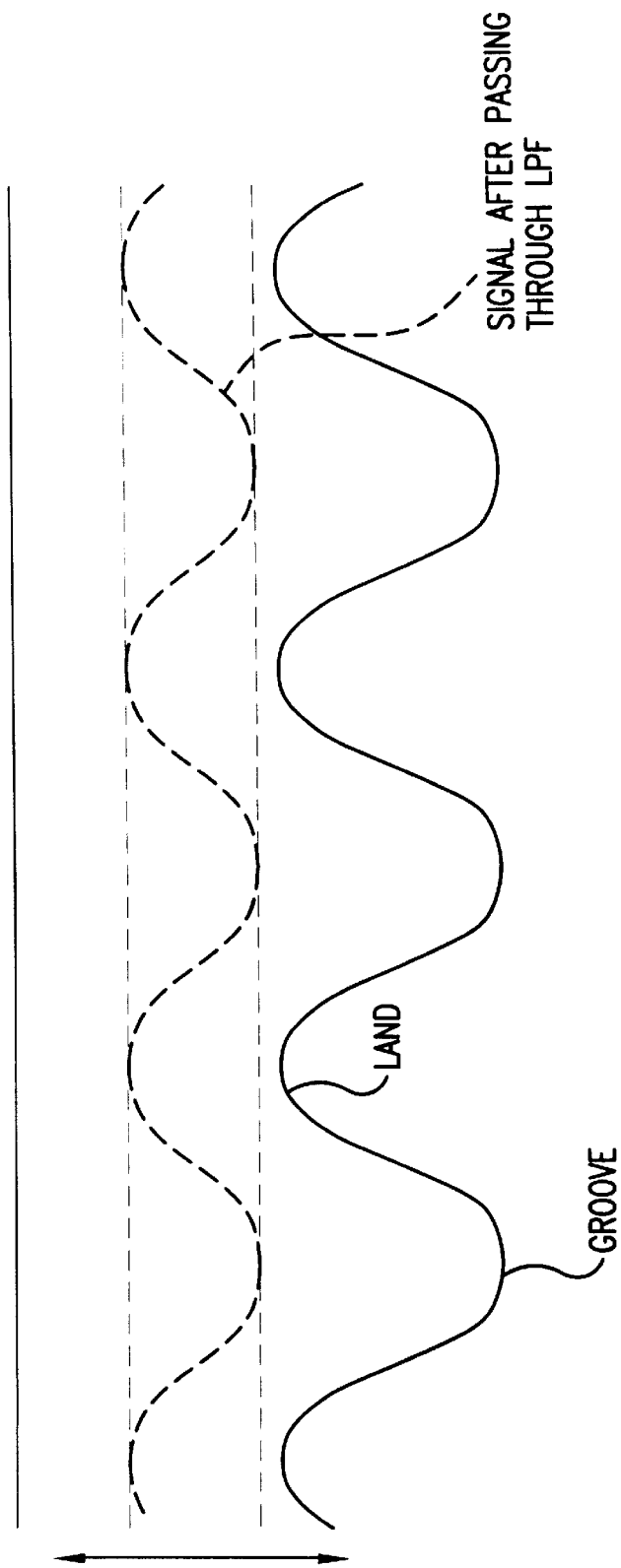
FIG. 5 is a view for illustrating a retrieving signal.

FIG. 5 shows a schematic view of signals which are generated when a pick up in FIG. 4 crosses a plurality of grooves.

Namely, this represents an output obtained from the light detector when the focus servo is on and the tracking servo is off. In FIG. 5, the $|I_1-I_2|$a signal is a signal after $I_1$ and $I_2$ signals after recording have passed through a low pass filter (LPF), i.e. an average value.

$I_1$ and $I_2$ have slow fluctuations during crossing the tracks, and in addition, to the signal of each channel, a fluctuation as shown in the Figure due to the recording signal as a high frequency component will be superposed after recording. Further, although the absolute value is different, the sum signal $I=I_1+I_2$ becomes a signal of a similar pattern, and approximately, the modulation of high frequency component of $I_1$ and $I_2$ may be regarded as being the same as the modulation of a RF signal.

Especially, push-pull signals tend to be hardly obtainable in the vicinity where the sum $\Delta$ of the phase $\Phi$ due to the groove depth and the phase difference $\delta$ between the crystal and the amorphous mark, becomes ±π, such being undesirable. Inversely, push-pull signals become the maximum in the vicinity where $\Delta$ is π/2. This relation between the phase difference and the push-pull intensity is the same as the push-pull signal intensity with CD utilizing only the phase difference of pits.

To secure compatibility with a drive for exclusive use for retrieving, which utilizes the pit phase difference, it is desirable that the phase difference is between −π/2 and −π (or between π3/2 and 2π) in consideration of the balance of the modulation and the servo signal. Namely, from the viewpoint of compatibility with a drive for exclusive use for retrieving, it is advisable to set $\Delta$ within the following range:

$$-\pi<\Delta<-\pi/2+\pi/8 \quad (11)$$

The term +π/8 means that a fluctuation of π/8 from strict −π/2 can be regarded as being within an allowable range. However, if it exceeds −π, the polarity of the push-pull signal will be inverted, such being undesirable.

On the other hand, within the recording apparatus, it is not desirable that a push-pull signal or a radial contrast value sharply changes between before and after recording, since the tracking servo or seeking performance will be unstable. Namely, if the influence of a is so large, the same effect as a change in the groove geometry (particularly the depth) at the same time as recording, will result, whereby the servo signal tends to substantially change between before and after the recording, thus leading to a problem that the servo tends to be unstable.

In the above description, decrease in the reflectance in the amorphous state has not been taken into consideration. As is different from the case of pits, in the case of a recorded mark, not only the phase difference but also the reflectance in the mark decreases. In the description of FIG. 3, if the reflectance at the mark portion itself is lowered, the contribution of a light ray from that portion decreases, and the interference effect itself will be offset.

When an amorphous mark is recorded, the reflectance of the mark becomes less than a few %, and the interference effect will not really appear so distinctly as expected from the foregoing description. Accordingly, it is usual that the interference effect required for generation of a push-pull signal is weakened, and irrespective of the phase difference, PPa after recording decreases (PPa<PPb).

In such a case, in order to avoid too much decrease of the push-pull signal PPa after recording to avoid that the tracking servo becomes unstable, the phase difference $\Delta$ must be in a direction to enhance the push-pull signal. Namely, it is preferably as follows:

$$-\pi/2-\pi/8<\Delta<-\pi/2+\pi/8 \quad (12)$$

On other hand, in a case where DPP is used as described above, as a method for complementing the decrease in reflectance after recording by the servo circuit side, for example, in the rewritable CD standards, the push-pull change NPPR (normalized push pull ratio) between before and after recording is normalized by means of push-pull values $PPb/I_G$ and $PPa/I_{Ga}$ standardized by the reflectance.

$$\begin{aligned}
NPPR &= (PPb/I_G)/(PPa/I_{Ga}) \quad (13)\\
&= (PPb/PPa)(I_{Ga}/I_G)\\
&= (PPb/PPa)I_{top}(I_{top}-I_{11}/2)/I_G\\
&= (PPb/PPa)(I_{top}/I_G)(I_{top}-I_{11}/2)\\
&= k \cdot I_{top}(PPb/PPa)\{1-(I_{11}/I_{top})/2)\}\\
&= k \cdot I_{top}(PPb/PPa)(1-Mod/2)
\end{aligned}$$

(where $k = I_{top}/I_G$)

In this equation (13), members relating to the phase differences $\delta$ and $\Delta$ are PPa and Mod. As either one increases, NPPR can be made small i.e. the change between before and after recording can be reduced. With CD-RW, NPPR is preferably smaller than about 1.0. With a view to increasing both Mod and PPa, it is preferred that the equation (11) is satisfied, and with a view to increasing PPa preferentially, it is preferred that the equation (12) is satisfied.

Further, in the DPD (differential phase detection) system (below mentioned in detail), the reduction of PPa is stipulated by e.g. the reflectance $I_{Ga}$ or $(I_{La}+I_{Ga})/2$, and with such an effect for reduction, the DPP signal may sometimes becomes large after recording, and it is in some cases desired to optimize it in a direction close to −π within a range of the equation (11).

Further, PPb may beforehand be set at a smaller level, and in such a case, the groove geometry is set to be rather shallow so as to satisfy the following:

$$-\pi/2<\Phi<-\pi/8 \quad (14a)$$

It is preferably as follows:

$$-\pi/4-\pi/8<\Phi<-\pi/8 \quad (14b)$$

Further, in the case of a phase-change medium, there may be a case in which the change in reflectance between before and after recording is minimized, and the modulation is obtained solely by the change in the phase difference i.e. the modulation is obtained primarily based on the $I_{phase}$ component. In such a case, in order to reduce the changes in RC and push-pull signals between before and after recording due to the phase difference change δ by recording, the total phase difference $\Delta$ in the amorphous mark after recording should be in an amount corresponding to the phase difference Φ of the groove only prior to recording and −π/2, i.e. Δ=−π−Φ, whereby the influence of the phase difference will be substantially the same between before and after recording.

Furthermore, if it is close to −π beyond −π/2, modulation by the phase difference can sufficiently be expected. Practically, a deviation at a level of ±π/8 is allowable, the total phase difference is preferably within a range of the following formula (15):

$$(-\pi-\Phi)-\pi/8 < \Delta < (-\pi-\Phi)+\pi/8 \quad (15)$$

When the present invention is applied to CD-RW (recording/retrieving wavelength: 780 nm), it is necessary to take the groove signals of both before recording and after recording, for example, push-pull signals and radial contrast signals of before and after recording into consideration from the viewpoint of compatibility with CD. JP-A-8-212550 shows the groove depth is preferably from 50 to 60 nm, and the groove width is preferably from 0.3 to 0.6 μm.

However, according to the study by the present inventors, in the above-described layer structure, the groove depth is preferably at most 45 nm and at least 20 nm. If the depth is deeper than this, the push-pull value after recording tends to be excessively larger than 0.1, and the radial contrast value after recording tends to be excessively large at a level of at least 0.6, which is excessively large as compared with the value of from 0.1 to 0.2 before recording, thus leading to a problem in the stability of servo.

Taking into consideration the repetitive overwriting durability and the groove depth dependency of the groove signal, the groove depth is more preferably from 30 to 40 nm. If it is deeper than 40 nm, the reflectance in the groove tends to be too low, and it may not reach 15% which is the lower limit stipulated in the standards. Otherwise, the amplitude PPa of push-pull after recording tends to be too large, and with a conventional pit retrieving circuit, the gain of the push-pull detecting circuit is likely to be saturated.

If the groove depth is too shallow, production of the stamper or shaping of the groove geometry by injection molding tends to be difficult. Otherwise, the radical contrast or the push-pull tends to be lower than the lower limit stipulated in the standards. Therefore, the groove depth is preferably deeper than 20 nm and more preferably deeper than 30 nm. Further, such is not desirable also from the viewpoint such that the effect of shielding the recording layer by the groove walls will be small, and deterioration by repetitive overwriting will be promoted, such being undesirable. In such a case, the phase difference Φ due to the groove within a groove depth range of from 20 to 45 nm, is from −0.16π to −0.36π. Accordingly, in order to bring Δ in the formula (7) close to −π to increase the amplitude most in groove recording, the layer structure may be adjusted so that δ is from −0.84π to −0.64π.

Further, in order to bring Δ close to −π/2, δ is set to be from −0.34π to −0.14.

Further, the groove width is preferably at least 0.3 μm from the standardized value such that the absolute value of radial contrast after recording is at least 0.6, and it is at most 0.6 μm from the viewpoint of the overwriting durability relating to the wobble and the groove geometry, especially in the case of application such as phase change type rewritable CD and DVD.

The deterioration accelerating mechanism by the presence of wobble is not necessarily clearly understood, but it is considered that the deterioration may be attributable to the fact that a part of the laser beam for recording becomes to be readily irradiated to side walls of the groove.

Namely, the focused laser beam under tracking servo advances straight along the groove center without following the wobble.

If the groove wall has a wobble, the laser beam tends to readily be irradiated to the groove walls although the amount may be slight.

It is considered that at the groove wall portions or groove corners where adhesion of the thin film is poor, deterioration due to thermal damage is likely to take place during repetitive overwriting because a stress concentration is likely to occur at such portions. Therefore, it is considered that if even a part of the laser beam is applied to such portions, the deterioration will be promoted.

In groove recording of a phase-change medium, there is a tendency that the narrower the groove, the better the durability. However, when a wobble is present, if the groove width is too narrow, the above-mentioned phenomenon for deterioration of the groove wall portions tends to be remarkable, whereby the deterioration will be substantial. Namely, the groove width is restricted from the viewpoint of repetitive overwriting durability, and it is not desirable that a groove width exceeds 0.6 μm as a general phenomenon of the phase-change medium, and that it is narrower than 0.4 μm, since deterioration in the overwriting durability due to the presence of a wobble becomes remarkable. The groove width is more preferably from 0.45 to 0.55 μm in the case of CD-RW.

Needless to say, such a control of the phase difference in the recorded amorphous marks is effective also for a rewritable medium (phase-change medium) of digital video disc (so-called DVD) which is considered to be increasingly important in future.

For example, phase-change DVD is proposed whereby recording/retrieving is carried out with a wavelength of 630 to 660 nm and NA=0.6 to 0.65. To secure compatibility with DVD for exclusive use for retrieving, it is firstly necessary that the modulation is at least 50% like CD.

In high density recording wherein the shortest mark length is 0.4 μm as in DVD, it is common to effectively use the $I_{phase}$ component even at a sacrifice of the amplitude of the push-pull signals, in order to obtain an adequate amplitude of the retrieving signal and good jitter depending thereon.

Namely, it is obliged to adopt deeper pits so that the phase difference of pits becomes closer to ±π than CD. The practical pit depth is substantially the same as current CD, as the retrieving wavelength can be shortened to 650 nm, and it is about 100 nm.

In order to secure stable performance of a tracking servo by a drive for exclusive use for retrieving with small push-pull, it is necessary to obtain a tracking servo signal adequately by a DPD (differential phase detection) system. For this purpose, it is still desired that the phase difference δ in the amorphous marks is within the range defined by formula (8). Here, the DPD system may be defined as the phase difference between the phase of the (B+C) signal and the phase of the (A+D) signal using output of light detectors A, B, C and D disposed in four-divided positions along the beam-advance direction (the pit-formed direction), as shown in FIG. 4. Or, the quantity so-called tangential push pull becomes important. This is defined as a signal of (C+D)−(A+B).

To secure compatibility with such a retrieving system, also in amorphous marks, the $I_{phase}$ component should effectively be utilized by setting Δ of the formula (7) to be close to −π, like in the case of pits. In such a case, Δ should preferably be within the following range:

$-\pi < \Delta < -\frac{3}{4}\pi$ (16)

In order to secure retrieving compatibility with DVD, recording is preferably made in a groove, but as mentioned above, the push-pull signal of the groove itself is required to be rather small. For this purpose, it is necessary to make the groove depth shallow to minimize the phase difference due to the groove depth, like in the case of CD-RW. The wavelength for recording/retrieving is at a level of from 630 to 660 nm relative to 780 nm for CD-RW, and the groove depth should accordingly be slightly shallow, but it is still preferably within a range of from 25 to 40 nm.

Now, how to control the reflectance difference and the phase difference between before and after recording in an actual multilayer structure, will be described with reference to specific layer structure examples.

LAYER STRUCTURE DESIGN EXAMPLE 1

The first preferable layer structure is the medium, wherein the lower protective layer has a thickness of from 70 to 150 nm and a refractive index of from 2.0 to 2.3, the phase-change recording layer has a thickness of from 15 to 25 nm, the upper protective layer has a thickness of from 30 to 60 nm and a refractive index of from 2.0 to 2.3, and the reflective layer has a thickness of from 40 to 300 nm and a volume resistivity of from 20 to 150 nΩ·m, whereby recording, retrieving and erasing are carried out by a laser beam having a wavelength of from 600 to 800 nm.

FIGS. 6 to 10 show examples for calculation of the reflectance and the phase difference δ between crystal and amorphous in various quadri-layer structures having a lower protective layer, a recording layer, an upper protective layer and a reflective layer formed on a substrate. The refractive index of each layer is the value actually measured at 780 nm. In the following Figures, δ being $-\pi \leq \delta \leq 0$ is represented by $\pi \leq \delta \leq 2\pi$ by an addition of $2\pi$. If such substitution is carried out in all of the formulae (8), (11), (12), (14), (15) and (16), all such condition formulae will be valid.

In FIGS. 6 to 10, an example is given wherein the refractive index $n_{sub}$ of the substrate is 1.5, the upper protective layer is $(ZnS)_{80}(SiO_2)_{20}$ having a refractive index of 2.10, the recording layer is $Ag_5In_6Sb_{60}Te_{29}$ with refractive indices of the crystal and the amorphous state being $n_c$=3.7–4.3i, and $n_a$=4.2–2.1i, respectively, and the reflective layer is $Al_{99}Ta_1$ having a refractive index of 2.1–6.0i.

With a recording layer having an additive element added in an amount of up to 20 atomic % to the composition close to the $Sb_{70}Te_{30}$ eutectic point, which is particularly preferred in the present invention, substantially the same optical properties as in FIGS. 6 to 10 are obtainable.

However, the optical influences will be substantial if certain light elements such as N, S, O and Se are added. Accordingly, it is not desirable to add these elements in an amount exceeding 10 atomic %.

Further, so long as the reflective layer is composed mainly of Au, Ag or Al, the absolute value of the reflectance does not substantially depend on the composition of the reflective layer, although it may vary to some extent. For example, with $Ag_5Ge_5Sb_{70}Te_{20}$, $n_c$=2.61–4.43i, and $n_a$=3.63–2.70i, and with $Ge_6Sb_{69}Te_{25}$, $n_c$=2.34–4.06i, and $n_a$=3.54–2.56i.

Firstly, in FIGS. 6 to 9, the dependency on the thickness of the lower protective layer is calculated in a case wherein the reflective layer is constant at 100 nm, the recording layer is 16, 18 or 20 nm, and the upper protective layer is 30, 40, 50 or 60 nm. In the optical calculation, if the thickness of the Al alloy reflective layer is thicker than 60 nm, substantially all lights will be reflected, and there will be no problem if the thickness is constant at 100 nm.

So far as the dependency on the lower protective layer is concerned, the change in the reflectance component $I_{ref}$ of the amplitude is usually small, and the modulation depends largely on denominator $I_{top}$ i.e. the reflectance in the crystal state.

Further, it is advisable to take the reflectance in the amorphous state small in order to take $I_{ref}$ as large as possible. The minimum point of the reflectance in the amorphous state usually comes in a thickness thicker than the minimum point of the reflectance in the crystal state.

Accordingly, $I_{ref}$ is preferably in a thickness thicker than the thickness at which the reflectance in the crystal state takes the minimum point. Further, with respect to the reflectance in the crystal state, there is usually an allowable lower limit determined by the limitation on the drive side or by the standards. Accordingly, it is not desirable that the reflectance in the crystal state is too low. Usually, it is required to be from 10 to 15%, at the lowest.

In the Calculation Examples of FIGS. 6 to 9, the first minimum value of the reflectance in the crystal state is accomplished at $d_1$=60–80 nm, and the second minimum value is accomplished at $d_2$=250–270 nm. In the thickness exceeding this level, the reflectance changes periodically against the thickness of the lower protective layer.

The thickness of the lower protective layer at which the reflectance in the crystal state becomes minimum, is determined substantially solely by the refractive index of the protective layer if the recording layer has a high reflectance.

If $2.1/n$ (where n is the refractive index) is multiplied by $d_1$ or $d_2$, it is possible to obtain the minimum point thickness at each refractive index. Usually, n=2.0–2.3, and thus, $d_1$ is about 85 nm.

If the refractive index of the lower protective layer is smaller than 2.0, the reflectance at the minimum point increases, whereby the modulation substantially lowers to a level of at most 0.5, such being undesirable with a view to securing retrieving compatibility with CD or DVD.

Inversely, if it is larger than 2.3, the reflectance at the minimum point tends to be too low, whereby 10% can not be accomplished, and focus or tracking servo will be difficult, such being undesirable.

Now, an attention will be paid to the dependency on the lower protective layer thickness of the phase difference δ in the vicinity of the first minimum point of reflectance.

Figure 6A:
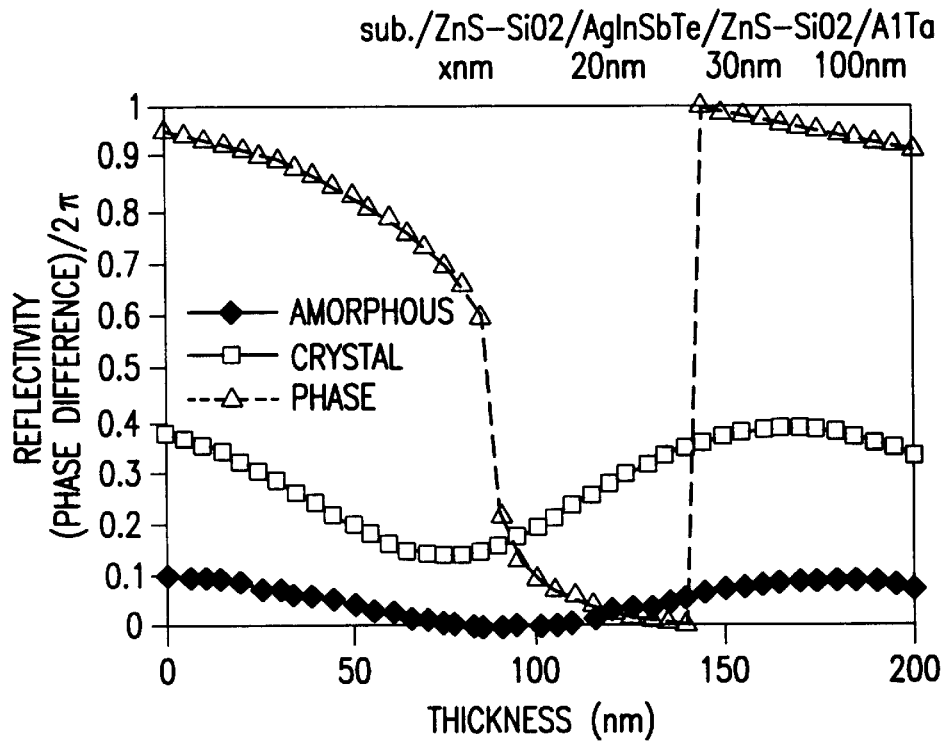
FIG. 6 is a view illustrating the reflectivities of reflected lights and calculation examples of the phase differences.
Figure 6B:
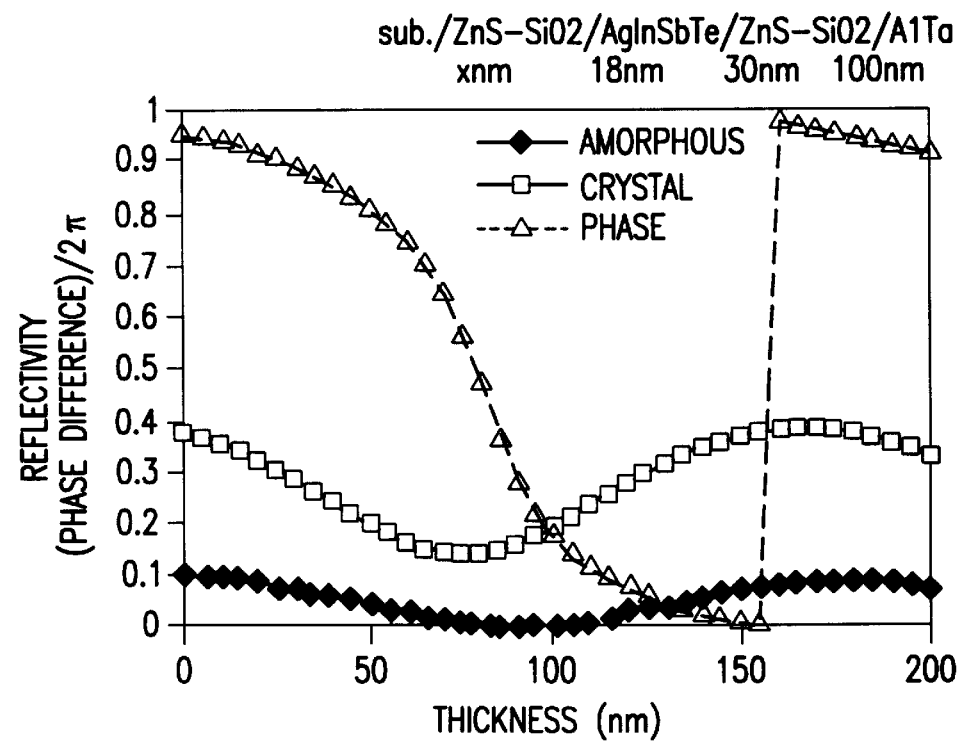
Figure 6C:
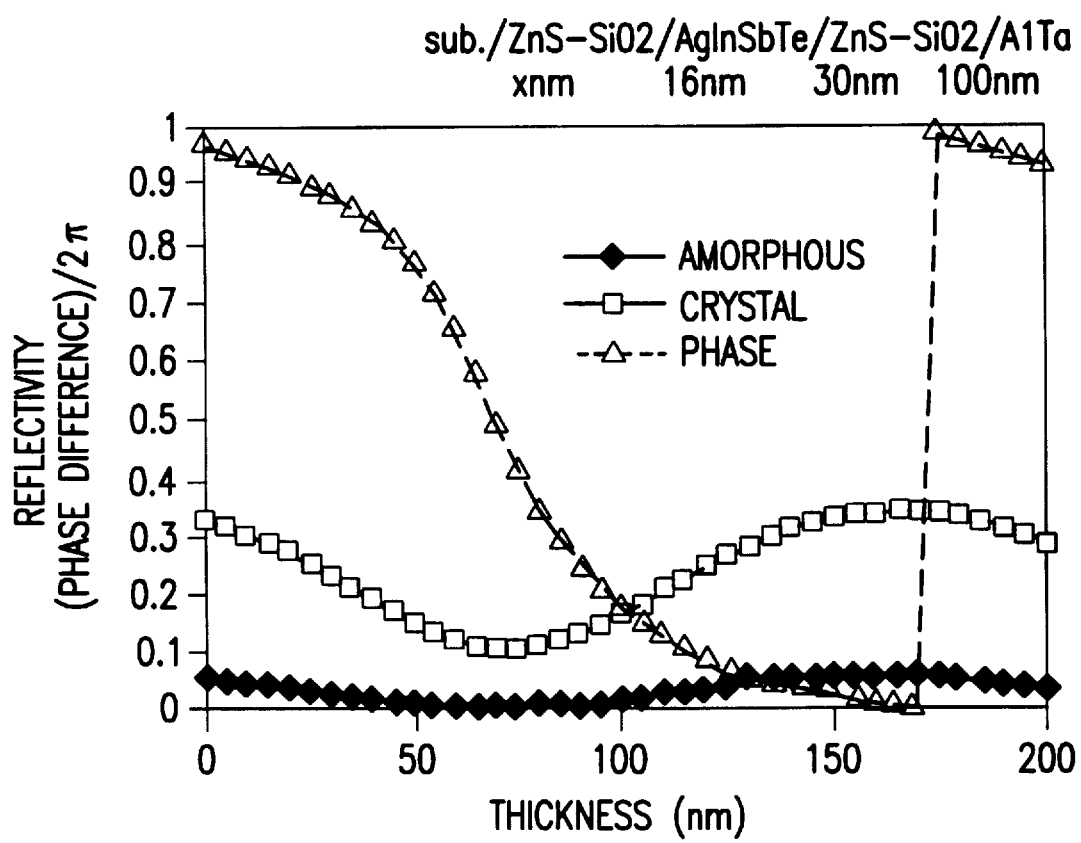
Figure 7A:
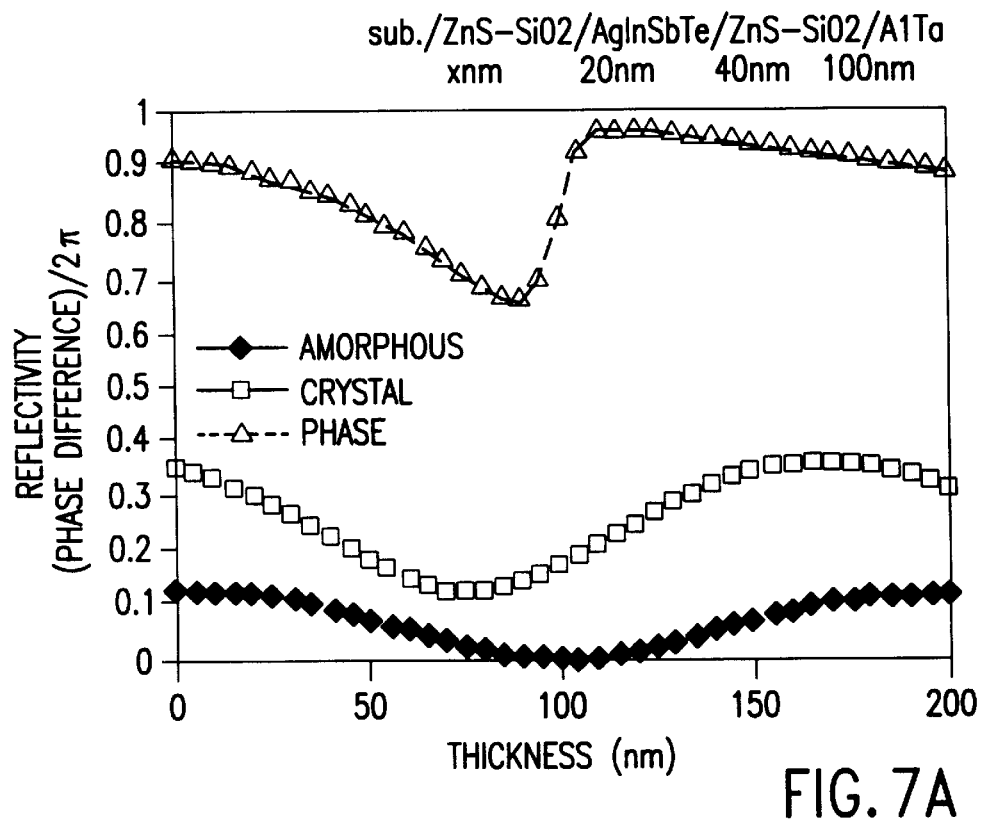
FIG. 7 is a view illustrating the reflectivities of reflected lights and calculation examples of the phase differences.
Figure 7B:
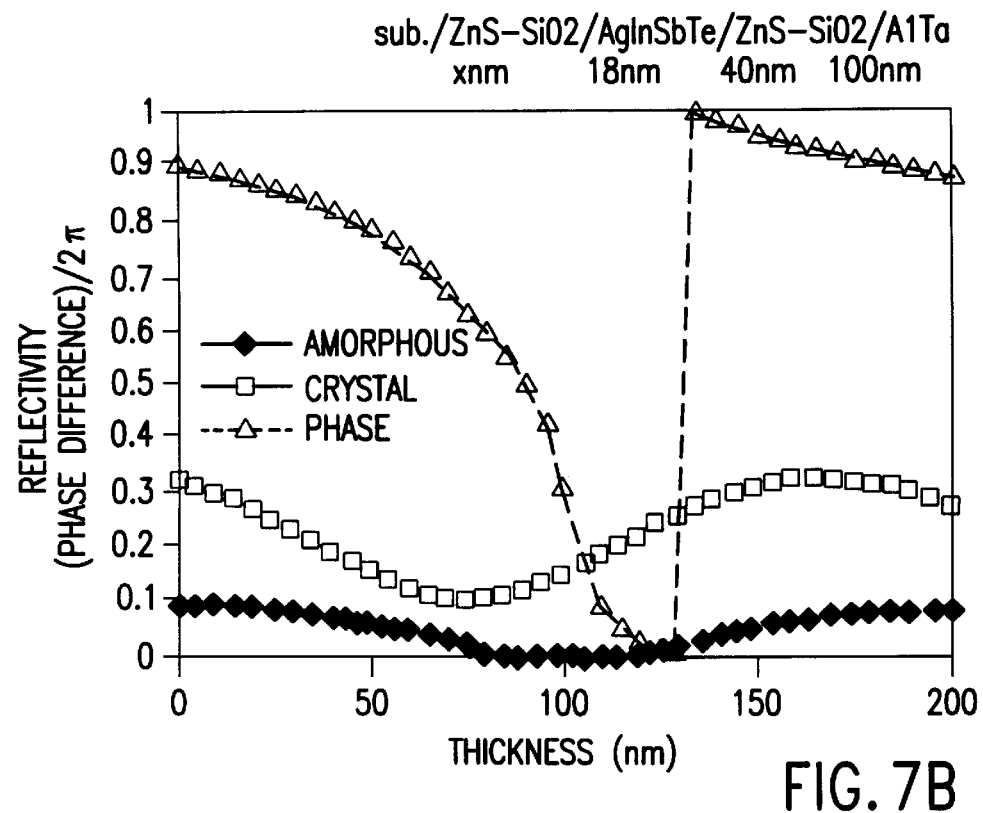
Figure 7C:
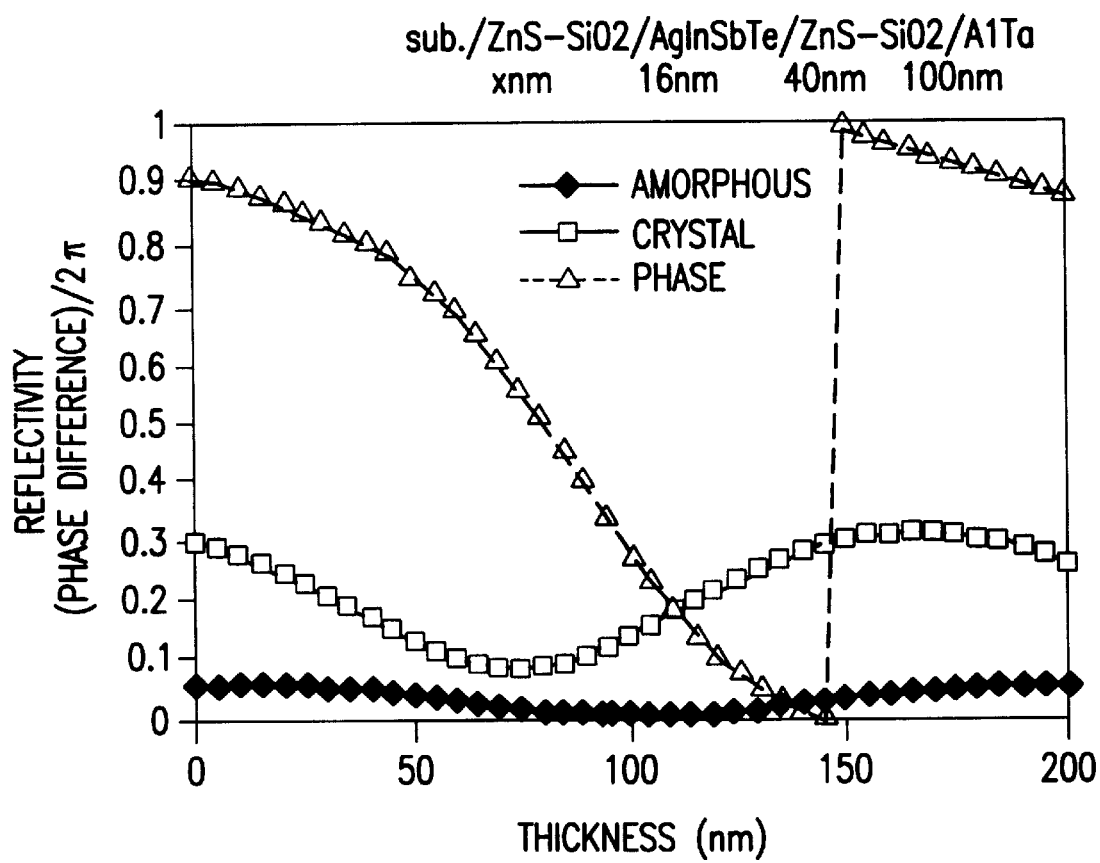

In FIGS. 6 and 7, as the thickness of the lower protective layer increases from 0, the phase differences monotonously decrease from $2\pi(=0)$, and in the vicinity of the minimum point reflectance, all phase differences cross π and rapidly change from phase differences advantageous for groove recording to phase differences advantageous for land recording.

Figure 10:
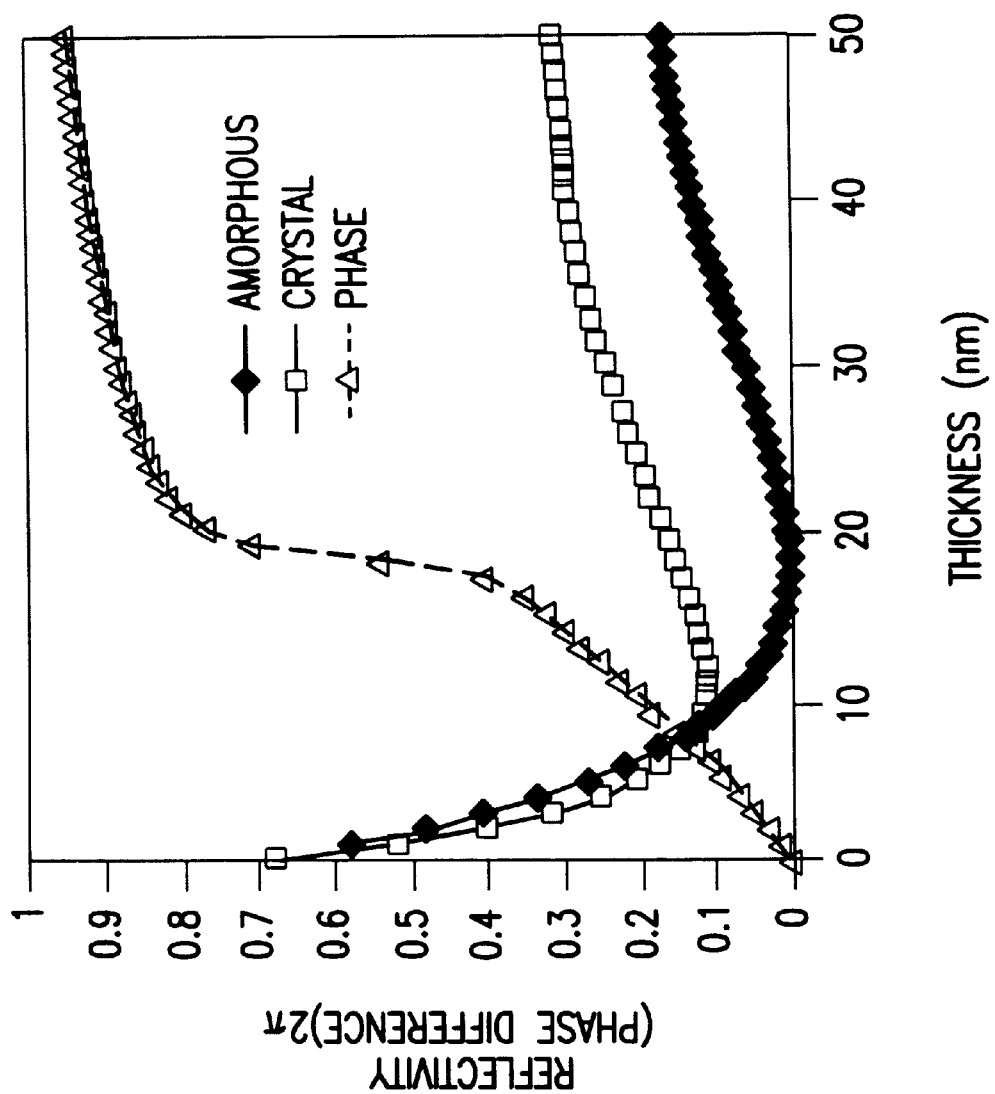
FIG. 10 is a view illustrating the reflectivities of reflected lights and a calculation example of the phase difference.

FIG. 10 shows the dependency on the recording layer thickness in a case where the lower protective layer is 95 nm and the upper protective layer is 40 nm. The phase difference δ rapidly changes around the recording layer thickness being from 10 to 20 nm, thus indicating that to satisfy the condition of the formula (8) (here, $\pi < \delta < 2\pi$), the thickness of the recording layer must be at least about 17 nm.

This rapid change point shifts to a thin lower protective layer thickness as the recording layer thickness is thin, and when the upper protective layer thickness is not more than 30 nm, it becomes difficult to satisfy the formula (8) within a range of the recording layer thickness being at most 25 nm and within a range of the thickness thicker than $d_1$ where $I_{ref}$ becomes large.

Furthermore, if the upper protective layer thickness is not more than 30 nm, such a rapid change of δ is likely within the optimum range of $I_{ref}$ in the recording layer film thickness of from 20 to 25 nm, and depending upon the fluctuation in the production, a fluctuation in the modulation or in the push-pull value after recording will result among individual discs, such being undesirable also from the viewpoint of the production margin.

It is desired at least that δ is stable so that the groove recording is advantageous i.e. π<δ<2π, within ±5%, more preferably ±10%, of the intended lower protective layer thickness.

From the foregoing viewpoint, it is preferred to employ a portion where the dependency on the lower protective layer $D_1$ of the reflectance $R_{top}$ in the crystal state is represented by:

$$\partial R_{top}/\partial D_1 > 0 \tag{17}$$

Further, from the viewpoint of the productivity, the lower protective layer thickness should preferably be at most 150 nm. Because, at present, the film-forming speed of a dielectric protective layer by a sputtering method is 15 nm/sec. at best, and if it takes more than 10 seconds for its film formation, such will increase the cost.

Further, the allowable range in the thickness variation tends to be severe, such being undesirable from the viewpoint of the production. Namely, as is evident from FIG. 8, if the thickness departs by Δd from the desired thickness $d_0$, the reflectance fluctuates all the same irrespective of in the vicinity of the first minimum value $d_1$ or in the vicinity of the second minimum value $d_2$.

On the other hand, from the viewpoint of the production, the thickness distribution is determined by a question of % relative to $d_0$, and usually, $d_0 \pm 2$ to 3% is the limit for uniformity. Accordingly, the thinner $d_0$, the smaller the variation width Δd of the thickness, and more advantageous, since the fluctuation in reflectance in a disc surface or the disc-to-disc variation, can be suppressed.

With an inexpensive sputtering apparatus of a stationary opposing type having no mechanism for planetary rotating the substrate, it is obliged to adopt a thickness in the vicinity of the first minimum value $d_1$ which is mass producible.

Another effect obtainable by limiting the lower protective layer thickness to not more than 150 nm, is suppression of heat generation during film-forming by sputtering.

Deformation of the substrate due to heat generation during film formation by sputtering, is a problem when a phase-change medium is to be formed on a plastic (particularly polycarbonate) substrate having a thickness of 0.6 mm, like DVD.

The thickness of 150 nm is just in the vicinity of the thickness where the reflectance becomes maximum, and to adopt a lower protective layer thicker than this, is not meritorious from the viewpoint of both reflectance and productivity.

Further, the thickness of 150 nm is a thickness corresponding to one wavelength when a lower protective layer having a refractive index of from 2.0 to 2.3 is employed, and is optically the same as a thickness of 0. If optically the same, it is unnecessary to create a production problem by increasing the thickness unnecessarily.

The dependency on the recording layer in FIG. 10 shifts to a slightly thin recording layer side within a range of the upper protective layer being up to 60 nm. The recording layer thickness is preferably at least 20 nm from the viewpoint such that fluctuation of the phase difference is little, and it is advantageous for groove recording. However, according to the study by the present inventors, if the recording layer thickness exceeds 20 nm, the repetitive overwriting durability tends to deteriorate.

When the medium is used as CD-RW, if the recording layer thickness is thicker than 30 nm, the durability of 1,000 times as stipulated for CD-RW is not satisfied by overwriting at a linear velocity of 2.4 m/s. Therefore, it is desired to make the phase difference δ advantageous with the recording layer thickness being not higher than 25 nm, more preferably not higher than 20 nm, if possible.

In the order of FIGS. 6 to 9, increase of the upper protective layer thickness is assumed. As the upper protective layer thickness increases, the steap transfer of phase difference at the point crossing π shifts to a thick lower protective layer thickness, and in the upper protective layer thickness of 40 nm, groove recording always stays to be advantageous with a recording layer of 20 nm. This tendency is remarkable as the upper protective layer thickness increases, and in the thickness of 60 nm, the phase difference is advantageous for groove recording in all lower protective layer thicknesses when the recording layer thickness is at least 16 nm. Thus, it is evident that the upper protective layer as thick as at least 30 nm as one of the requirements in the present invention, is a requirement necessary to effectively use the phase difference δ.

On the other hand, if the upper protective layer thickness exceeds 60 nm, the repetitive overwriting durability tends to deteriorate. This is considered attributable to the fact that if the upper protective layer becomes thick, the volume change of the protective layer itself due to thermal expansion tends to increase, or the heat capacity of the protective layer itself becomes large, whereby the cooling speed tends to be slow, formation of amorphous marks tends to be hindered, and thermal damage due to accumulated heat tends to increase.

Further, if the upper protective layer thickness is thicker than 60 nm, the heat dissipation effect tends to be small even when the reflective layer having a low volume resistivity of the present invention is used.

In the present invention, a Ag type reflective layer having a lowest volume resistivity among metals, has been also studied, but no adequate effect has been obtainable unless the recording layer thickness is reduced to a level of from 10 to 15 nm.

With a recording layer thickness of not higher than 15 nm, it is necessary to pay an attention also to the uniformity of the initial stage of film-formation. Therefore, it is preferred that optimization is made with a recording layer having a thickness of at least 15 nm.

When the overwriting durability is taken into consideration, the recording layer thickness $D_2$ and the upper protective layer thickness $D_3$ are preferably as thin as possible. However, the phase difference δ will not be in the range of the formula (8) if $D_2$ and $D_3$ are simply made thin. From the Calculation Examples of FIGS. 6 to 9, it is apparent that a layer structure design can be made by maintaining δ at a constant value without deteriorating the repetitive overwriting durability, if $D_2$ is made thin when $D_3$ is made thick.

More specifically, it is preferred that the combination of $(D_3, D_2)$ satisfies the relation represented by:

$$-5D_2 + 120 \leq D_3 \leq -5D_2 + 140 \tag{18}$$

under the restrictions of $70 \leq D_1 \leq 150$ nm, $15 \leq D_2 \leq 20$ nm, $30 \leq D_3 \leq 60$ nm and the formula (17), as mentioned above.

And, δ is selected so that it at least satisfies the formula (8) within a range of $70 \leq D_1 \leq 150$ nm.

This layer structure is useful particularly for a recording medium such as CD-RW wherein the reflectance in an unrecorded state i.e. crystal state, is set at a level of from 15 to 20%.

It is a matter of an individual product design to control the phase difference under any one of the conditions of the formulas (8), (11), (12) and (15). However, in order to positively utilize the phase difference δ due to the phase change, it is evidently advisable to set the upper protective layer thickness at a level of at least 30 nm, more preferably 60 nm, in a recording layer thickness of from 10 to 30 nm, as one of the requirements of the present invention.

If the thickness within this range is used, it is possible to avoid the abrupt change in δ from $\pi<\delta<2\pi$ to $0<\delta<\pi$ region in the vicinity of the minimum point of the reflectance in the amorphous and crystal states where $I_{ref}$ becomes maximum and thereby to secure the thickness margin at the time of the production, and a layer structure design becomes possible which is free from a problem with respect to repetitive overwriting durability. The recording layer thickness and the relation between the upper limit of the upper protective layer and the repetitive overwriting durability, will be described in further detail in Examples.

LAYER STRUCTURE DESIGN EXAMPLE 2

Figure 11:
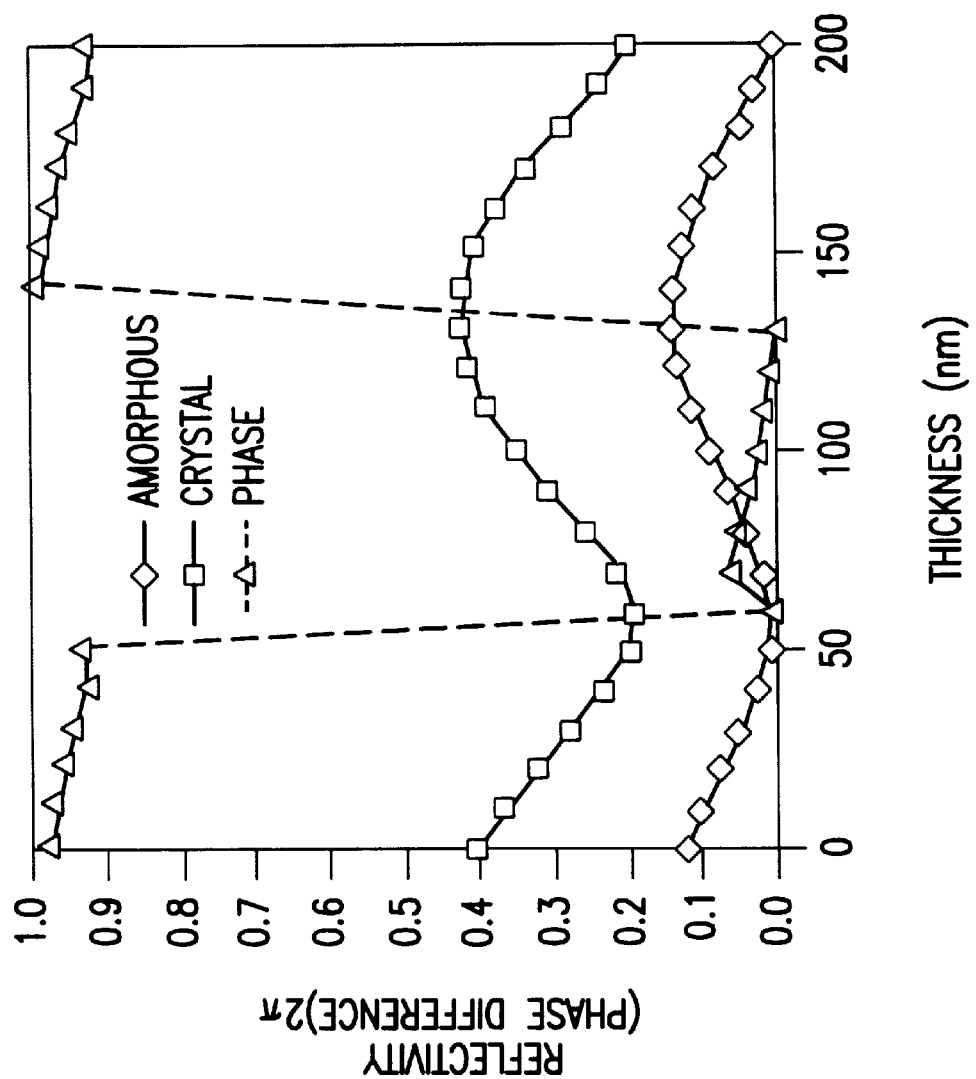
FIG. 11 is a view illustrating the reflectivities of reflected lights and a calculation example of the phase difference.
Figure 12:
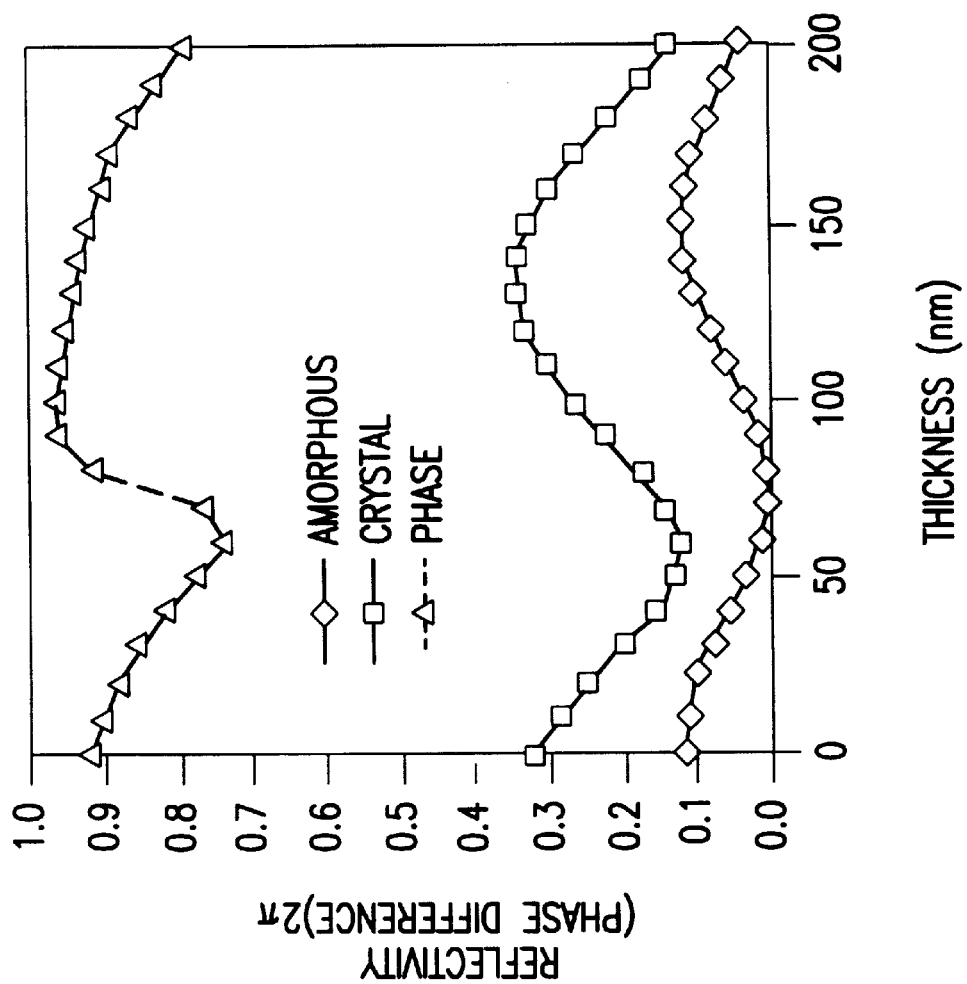
FIG. 12 is a view illustrating the reflectivities of reflected lights and a calculation example of the phase difference.

FIGS. 11 and 12 show Calculation Examples at a wavelength of 650 nm employing the same material as used in Design Example 1. The refractive indices of the respective layers are represented by values measured at a wavelength of 650 nm. The recording layer was constant at 18 nm, the reflective layer was constant at 100 nm.

FIGS. 11 and 12 represent cases wherein the upper protective layers are 20 nm and 40 nm, respectively. It is evident that even at a wavelength corresponding to DVD at a level of 650 nm, δ satisfies the formula (8) when the upper protective layer is thick.

The optical constants used in the Calculation Examples at 650 nm are measured values which are: Al alloy reflective layer 1.69–5.34i, ZnS: $SiO_2$ protective layer 2.12–0i, recording layer (crystal state) $n_c c$=2.8–4.1i, recording layer (amorphous state) 09 $n_a$=3.7–2.4i, substrate $n_{sub}$=1.56–0i.

LAYER STRUCTURE DESIGN EXAMPLE 3

In Design Example 1, it has been determined to be preferred to employ the region of the formula (17) as the lower protective layer thickness from the viewpoint of the repetitive overwriting durability, productivity and phase difference δ. Among them, if the upper protective layer thickness is at least about 40 nm, a lower protective layer thicker than the minimum point of $R_{top}$ is used when the recording layer thickness is thinner than 20 nm. However, when the upper protective layer thickness is thicker than about 40 nm, there exists a recording layer thickness within a range of from 10 to 30 nm whereby δ satisfies the formula (8) in all lower protective layer thicknesses.

Figure 8A:
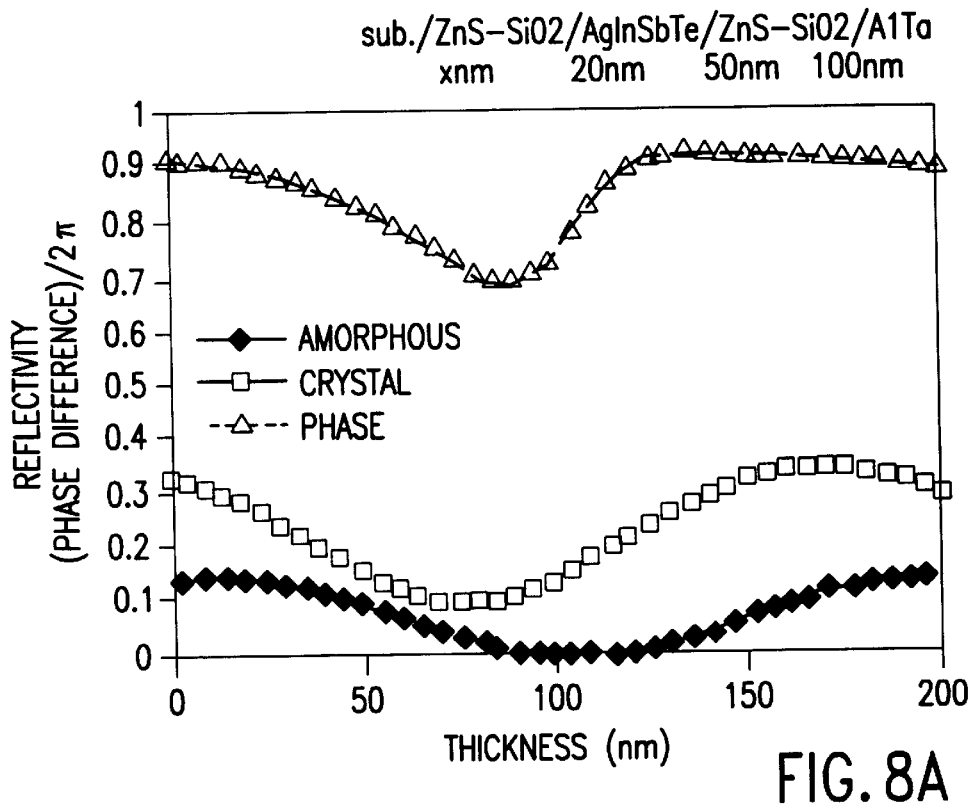
FIG. 8 is a view illustrating the reflectivities of reflected lights and calculation examples of the phase differences.
Figure 8B:
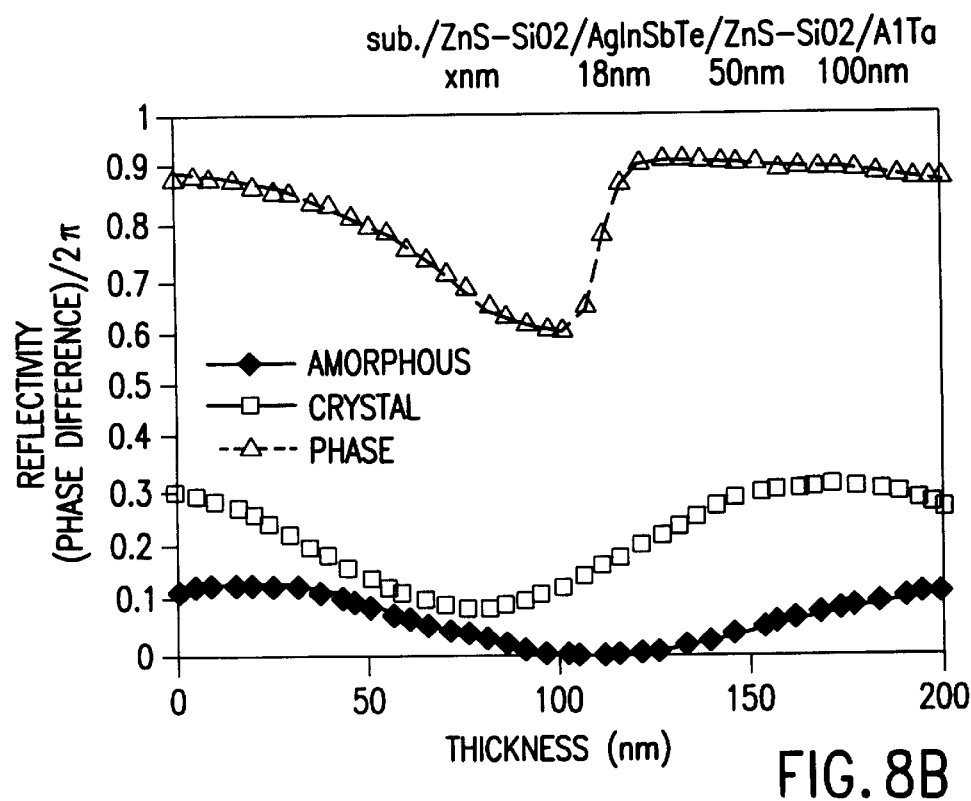
Figure 8C:
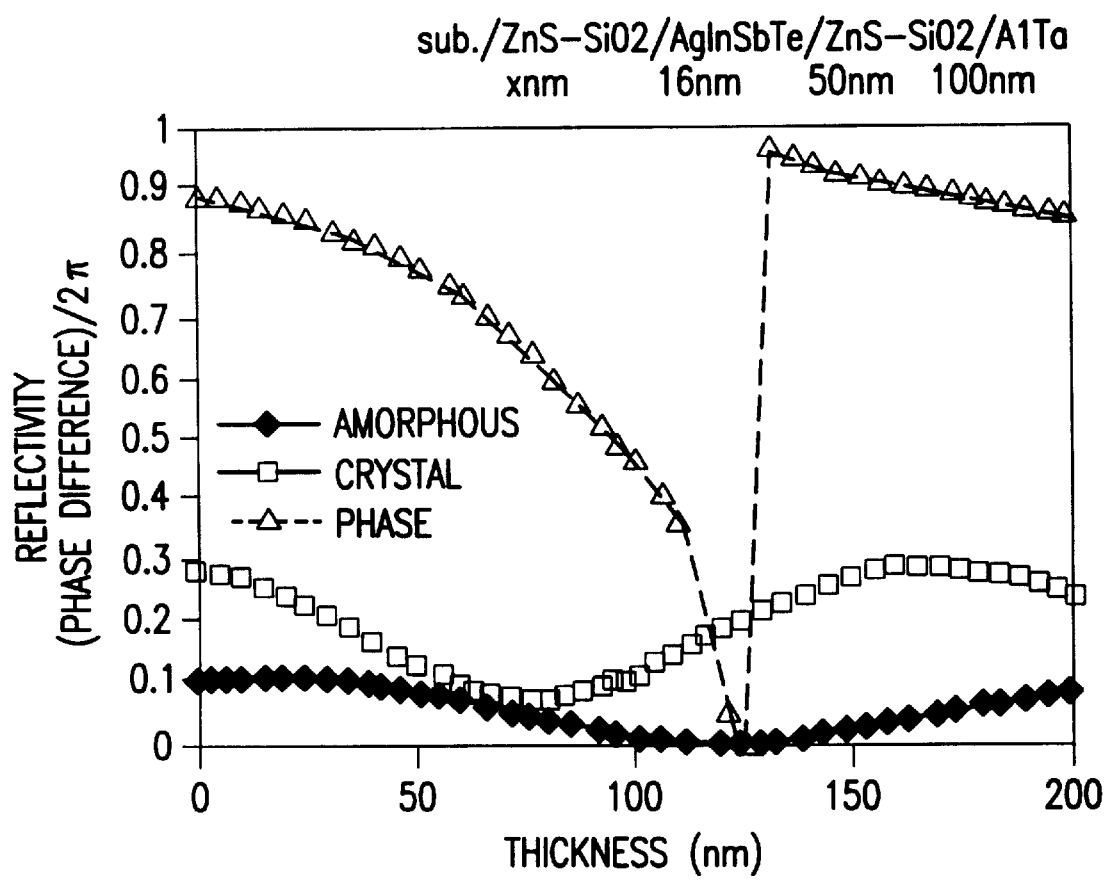
Figure 9A:
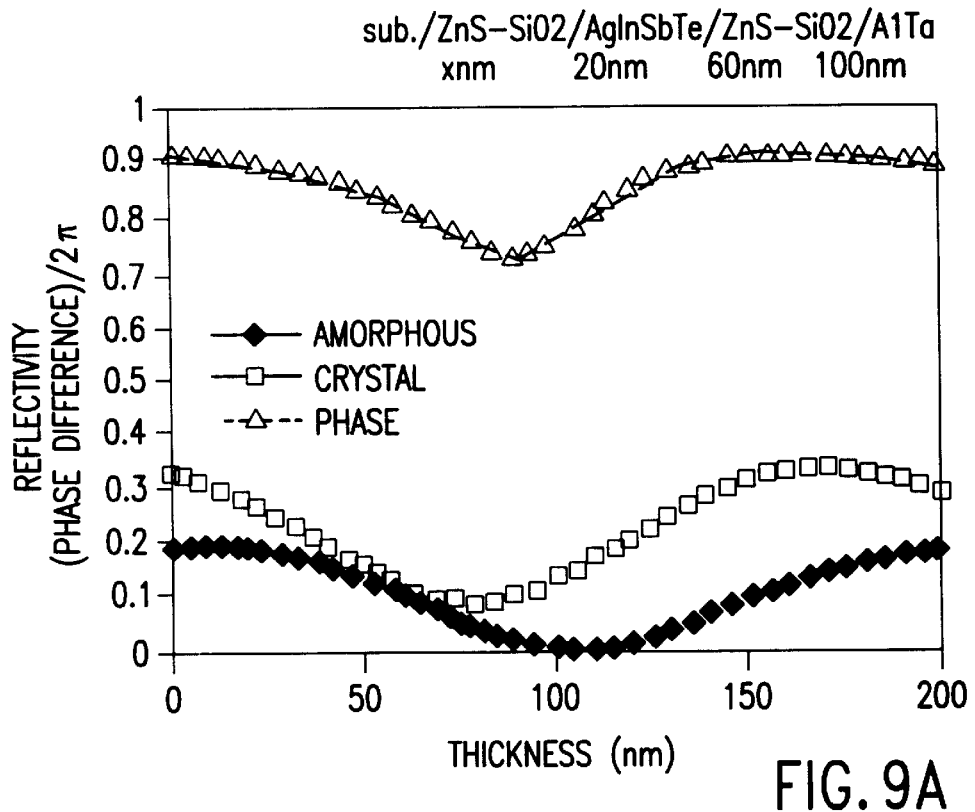
FIG. 9 is a view illustrating the reflectivities of reflected lights and calculation examples of the phase differences.
Figure 9B:
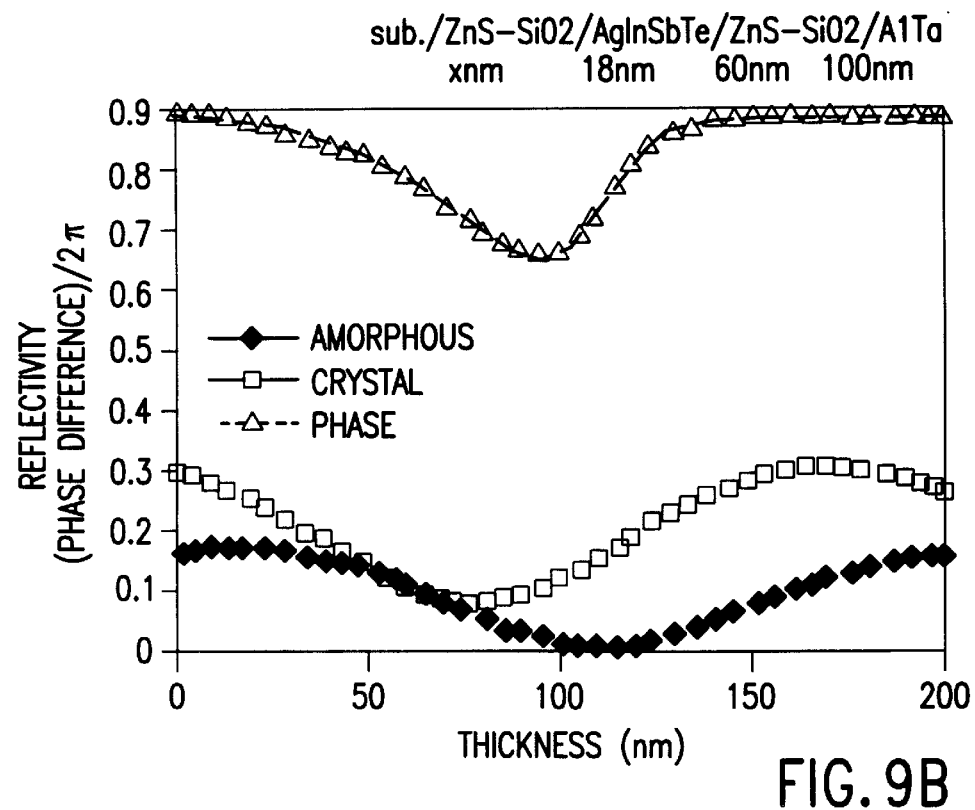
Figure 9C:
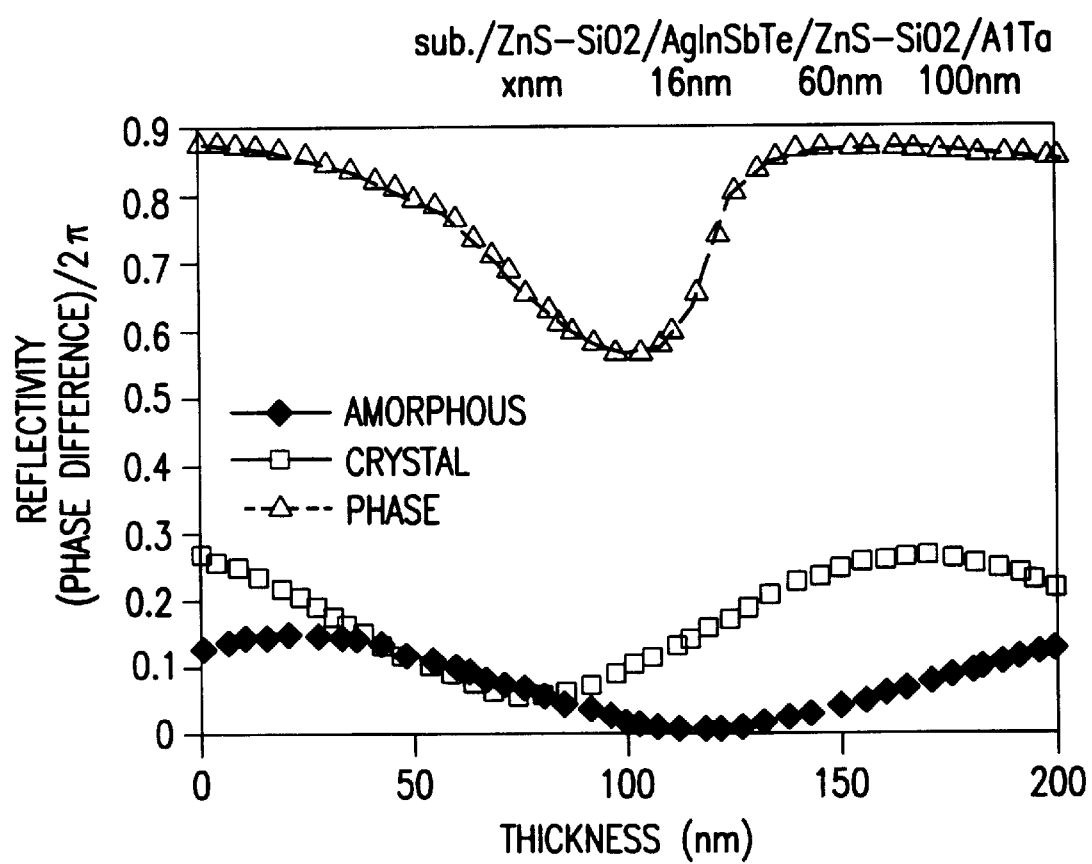

Further, in this case, as is evident from FIGS. 7 to 9, a considerable phase difference δ (here $\pi<\delta<2\pi$) can be constantly obtained at a crystal reflectance of not higher than the minimum point, such being desirable for preventing fluctuation of δ due to the variation in thickness during production. However, as mentioned above, with such a thin lower protective layer, deformation of the substrate due to repetitive overwriting tends to be remarkable, and such is not practically acceptable.

The third preferable layer structure is the medium, wherein the lower protective layer has a double layer structure wherein a first lower protective layer has a thickness of from 20 to 70 nm and a refractive index being within a range of $n_{sub}$±0.1 where $n_{sub}$ is the refractive index of the substrate, and a second lower protective layer has a thickness of at most 70 nm and a refractive index of from 2.0 to 2.3, the phase-change recording layer has a thickness of from 15 to 25 nm, the upper protective layer has a thickness of from 30 to 60 nm and a refractive index of from 2.0 to 2.3, and the reflective layer has a thickness of from 40 to 300 nm and a volume resistivity of from 20 to 150 nΩ·m, whereby recording, retrieving and erasing are carried out by a laser beam having a wavelength of from 600 to 800 nm.

Figure 13:
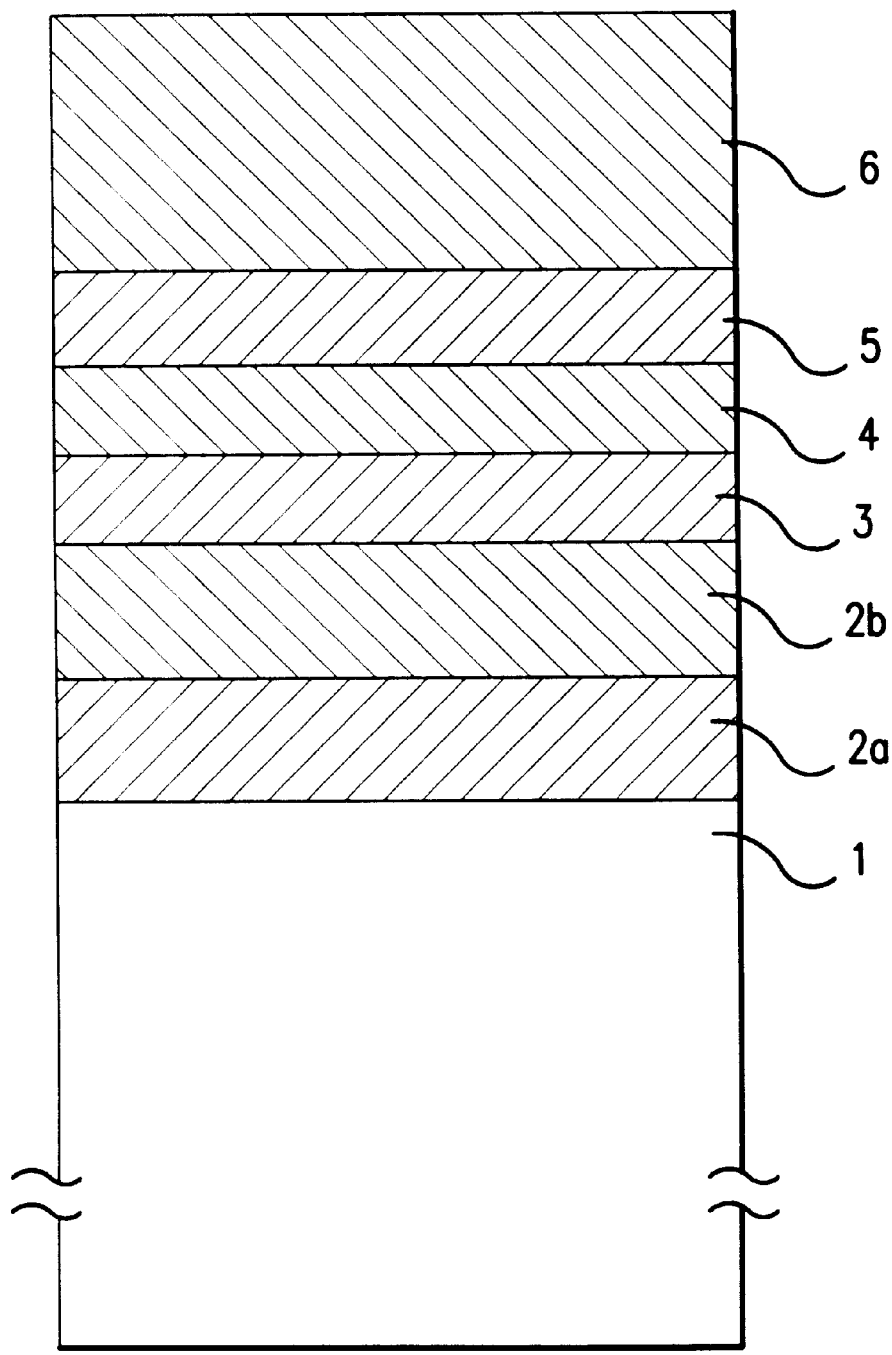
FIG. 13 is a schematic view illustrating the layer structure of the optical information recording medium of the present invention.

Namely, the lower protective layer may have a double layer structure comprising a first lower protective layer 2a (thickness $D_{11}$) and a second lower protective layer 2b (thickness $D_{12}$) as shown in FIG. 13 in order to effectively use the region represented by:

$$\partial R_{top}/\partial D_{12} < 0 \tag{19}$$

Here, the first lower protective layer 2a has substantially the same refractive index as the substrate and merely functions as a mechanical/thermal protective layer to prevent thermal deformation of the substrate, and optically, it can be regarded as the substrate itself.

When the refractive index of the substrate is $n_{sub}$, the refractive index of the first protective layer is preferably within a range of ±0.1, more preferably within a range of ±0.05, of $n_{sub}$.

The second protective layer 2b is regarded as an optical protective layer, and with respect to the dependency on the lower protective layer thickness in FIGS. 6 to 9 and FIGS. 11 and 12, only the second protective layer thickness $D_{12}$ may be taken into account. $D_{12}$ may be selected by paying an attention mainly to the optical properties i.e. the reflectance and the phase difference δ within the range of the formula (19).

With respect to the upper protective layer thickness $D_3$ and the recording layer thickness $D_2$, it is preferred that they satisfy the formula (18) in order to maintain the repetitive overwriting durability.

Further, the thickness of the entire lower protective layer comprising two layers is preferably from 70 to 150 nm from the viewpoint of the repetitive overwriting durability and productivity.

Such a double layer structure of the lower protective layer may be employed by additionally inserting the first lower protective layer in a case where it is desired to further prevent the deformation of a substrate in the layer structure design under the conditions of the formulas (17) and (18).

The refractive index of a glass or plastic substrate which is commonly used, is from about 1.4 to 1.6. As a material for the protective layer which has substantially the same refractive index as the substrate and which is excellent in the mechanical strength, a mixed film of $SiC-SiO_2$, $SiC-SiO_2-MgF_2$ or $ZnS-SiO_2-MgF_2$ may specifically be mentioned. Here, $MgF_2$ which is used to lower the refractive index, may be substituted by $CaF_2$, $LiF_2$ or the like. Further, ZnS may be substituted by ZnSe or a sulfide or selenium compound of a rare earth.

More specifically, as one giving substantially the same refractive index (1.55) as a polycarbonate resin substrate, $(SiC)_{38}(SiO_2)_{57}(Y_2O_3)_5$ (refractive index n=1.57) or $(SiC)_{19}(SiO_2)_5(MgF_2)_{76}$ (n=1.49) may, for example, be mentioned (as represented by mol %).

With such a material, the refractive index may further be finely adjusted by adjusting the blend ratio.

The phase difference δ due to the phase change can be estimated by calculation from the layer structure (thicknesses of the respective layers) and the refractive indices of the respective layers. Otherwise, if the two regions of the crystal state and the amorphous state are in contact with each other with a clear boundary in a plane, the phase difference may also be estimated by a phase difference optical microscope.

Now, a preferred recording method for the medium of the present invention will be described.

By using the following recording method, accurate mark length recording can be carried out in wider ranges of the linear velocity and the writing power, by accurately controlling the cooling rate during resolidification of the recording layer.

With the phase-change medium of the present invention, it is preferred to provide an off-pulse period rather than carrying out modulation at two levels of writing power Pw and an erasing power Pe which used to be employed with a GeTe—$Sb_2Te_3$ pseudo binary alloy system.

Figure 15:
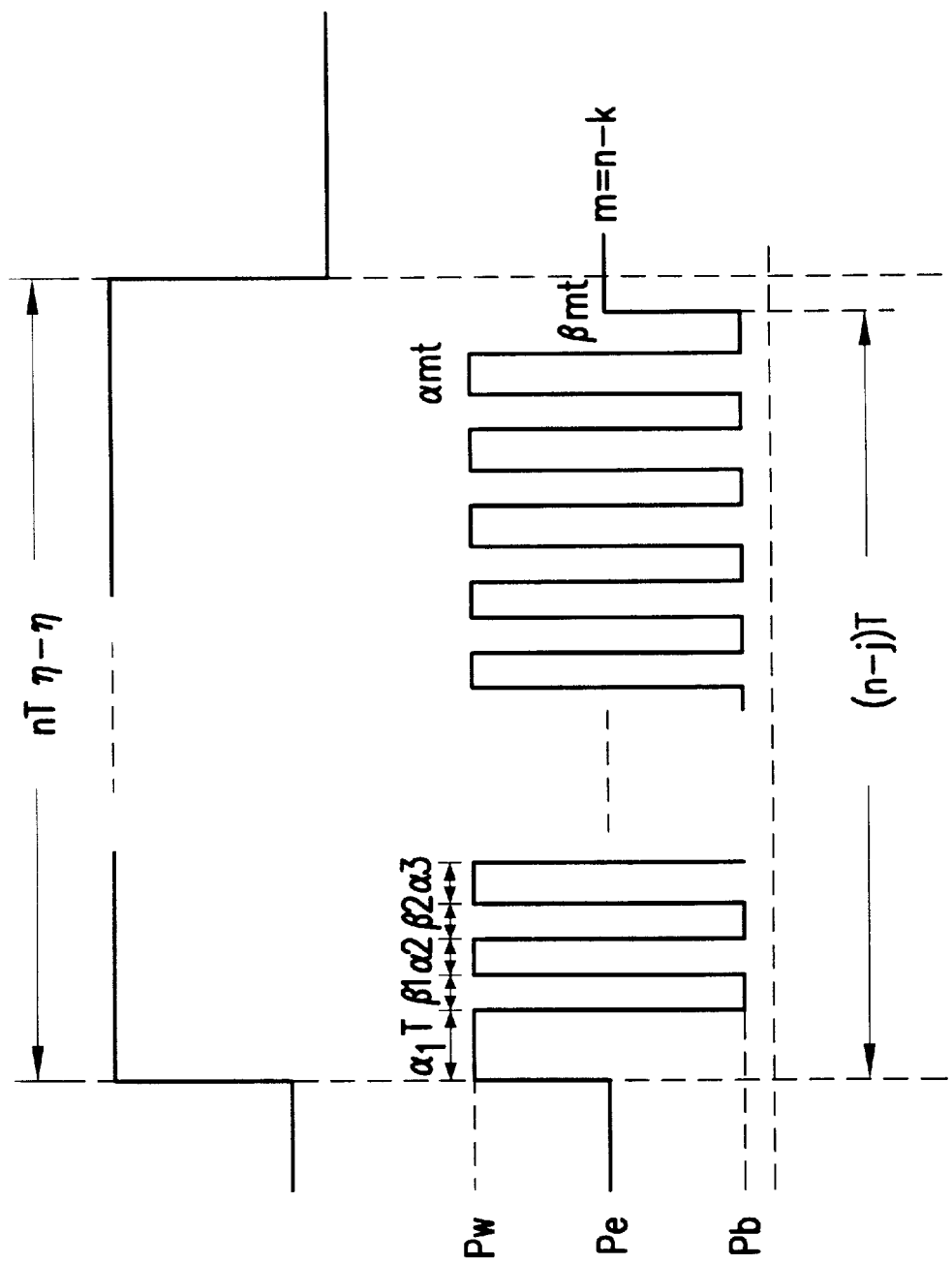
FIG. 15 is a view illustrating an embodiment of an irradiation pattern of a laser power during optical recording on the optical information recording medium of the present invention.

Overwriting by two level modulation is possible, but in the present invention, the power margin and the linear velocity margin during recording can be broadened by employing a three level modulation system as shown in FIG. 15.

When a mark having a length nT (where T is a reference clock period, and n is a natural number) is to be formed, time nT is divided into n–k pulses as follows:

$\alpha_1 T, \beta_1 T, \alpha_2 T, \beta_2 T, \ldots, \alpha_m T, \beta_m T$, (provided $n-j = \alpha_1 + \beta_1 + \ldots + \alpha_m + \beta_m$ ($0 \le j \le 2$), $m = n-k$ ($k=0,1,2$) and $n_{min} - k \ge 1$)

A writing power Pw (>Pe) sufficient to melt the recording layer is applied for a period of $\alpha_1 T$ ($1 \le i \le m$), and a bias power Pb represented by $0 < Pb \le 0.5Pe$ (provided that this can be $0 < Pb \le Pe$ at $\beta_m T$) is applied for a period of $\beta_1 T$ ($1 \le i \le m$), to carry out overwriting.

FIG. 16 schematically illustrates the temperature change of a recording layer in a case where (a) Pb=Pe and a case where (b) Pb=0 (extreme case).

Among three divided pulses, position of the first pulse P1 and the second pulse P2 are assumed.

Figure 17A:
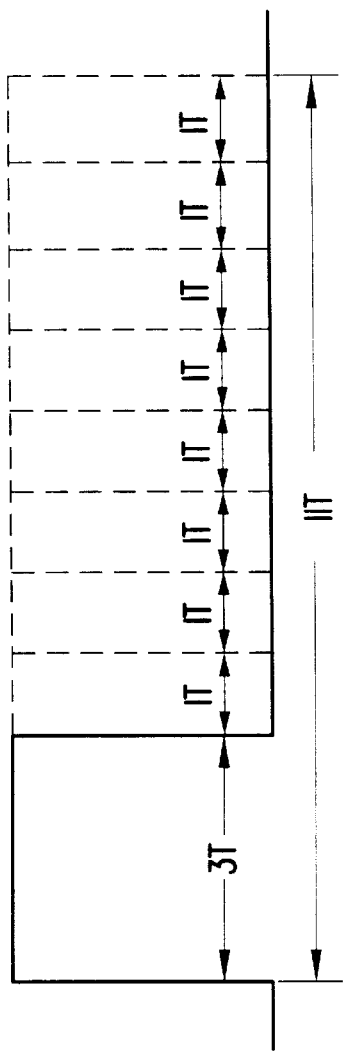
FIG. 17 is a view illustrating the recording pulse.

In the case of FIG. 17(a), the influence of the heating by the subsequent recording pulse extends forwardly, and the cooling rate after irradiation of the first recording pulse is low, and the lowest temperature TL to which the temperature reaches by the temperature drop during the off-pulse period, is still in the vicinity of the melting point, since Pe is applied even during the off-pulse period.

Figure 17B:
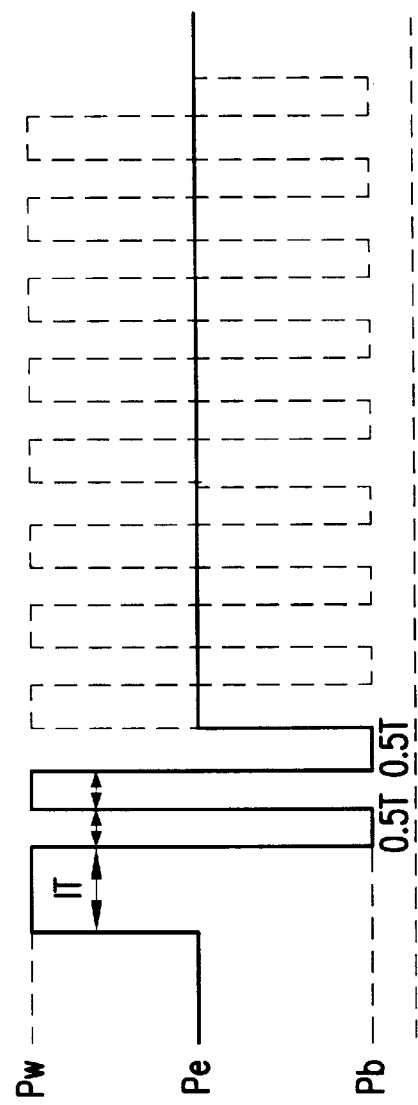

On the other hand, in the case of FIG. 17(b), Pb during the off-pulse period is substantially 0, whereby the lowest temperature TL will be sufficiently lower than the melting point, and the cooling rate is also high.

The amorphous mark is melted during irradiation with the first pulse and then formed by quenching during the subsequent off-pulse period.

It is desirable that-the recording density can be maintained constant by setting only the clock period T to be substantially in reverse proportion to the linear velocity without changing the above pulse strategy defined by m, j, $\alpha_i$ and $\beta_i$ by the linear velocity. It is an additional effect of the present invention that at least twice the minimum value and the maximum value of the linear velocity feasible for recording can be secured by setting the pulse strategy to be constant.

To change Pw, Pe or Pe depending upon the linear velocity is a question separate from the pulse strategy and is carried out as the case requires. Because, the change of the power is carried out irrespective of the divided pulse generating circuit.

With CD-RW as a specific application example of the present invention, as shown in FIG. 17, to record a nT mark (n is an integer of from 3 to 11), the recording time is divided into n–1 recording pulses, wherein the first recording pulse is set to be 1.0T, and all of the subsequent recording pulses are set to be 0.5T.

Further, the periods of time (off pulse periods) for irradiation with the bias power Pb are set to be all 0.5T.

Especially, for the recording layer of the present invention, it is necessary to take the bias Pb during the off-pulse periods sufficiently low so that it becomes $0 < Pb \le 0.5Pc$.

When EFM-modulatled amorphous marks are to be formed at least within a linear velocity range of from 2.4 to 5.6 m/s (a speed of about 2-times velocity in the case of a compact disc), to form inter-mark portions, erasing power Pe capable of recrystallizing amorphous marks is applied, and to form marks having a length nT (n is an integer of from 3 to 11), the above pulse strategy is set to be $m=n-1$, $\alpha_1=0.1$ to 1.5, $\alpha_i=0.1$ to 0.6 ($2 \le i \le m$), $\beta_1=0.4$ to 0.9 ($1 \le i \le m$) and a writing power Pw (>Pe) sufficient to melt the recording layer is applied for a period of $\alpha_i T$ ($1 \le i \le m$), and a bias power Pb represented by $0 < Pb \le 0.5Pe$ is applied for a period of $\beta_i T$ ($1 \le i \le m$), provided that this may be $0 < Pb \le Pe$ for $i=m$ or $0 \le \beta_m 0.5$.

With this pulse strategy, as shown in the Examples given hereinafter, by using the layer structure of the present invention, it is possible to obtain a CD-RW medium having high compatibility, which is overwritable at 2- to 4-times velocity.

Namely, with the same pulse strategy, 2- and 4-times velocity recording can be carried out. Especially at the 4-times velocity, when the above pulse strategy is employed, it is effective to finely adjust only the length of the final off-pulse period $\beta_m T$ by a combination of the respective mark lengths, the subsequent inter-mark lengths or the subsequent mark lengths, so that the mark length of each nT mark period is adjusted more strictly.

This means that in FIG. 15, n–j is finely adjusted depending upon foregoing and/or following inter-mark lengths and/or mark length.

As an extreme case, there may be a case where final $\beta_m=0$.

Now, the present invention will be described in further detail with reference to Examples. However, it should be understood that the present invention is by no means restricted to such specific Examples.

In the following Examples, the groove geometry was obtained by U-groove approximation by using an optical diffraction method. Of course, the groove geometry may be actually measured by a scanning electron microscope or a scanning probe microscope. In such a case, the groove width is a groove width taken at a position of one half in the depth of the groove.

The compositions of the respective layers were confirmed by a combination of e.g. fluorescent X-ray analysis, atomic absorption analysis and X-ray-excited photoelectron spectrometry. The layer thickness was obtained by correcting the fluorescent X-ray intensity by the layer thickness measured by a tracer.

The film density of the protective layer was obtained from the weight change in a case where it was formed in a thickness of as thick as a few hundred nm on a substrate.

The sheet resistivity of the reflective layer was measured by a four probe resistivity meter (Loresta FP, tradename manufactured by Mitsubishi Petrochemical Co., Ltd. (presently Dia Instruments)).

The resistivity of the reflective layer was measured after forming the lower protective layer, the recording layer, the upper protective layer and the reflective layer on a disc substrate. Or a reflective layer was formed on a glass or polycarbonate disc substrate, and its resistivity was measured. The glass, polycarbonate and dielectric protective layer are insulators and thus give no influence on measurement of the resistivity. Further, the disc substrate had a diameter of 120 mm, and in this measurement, it can be regarded substantially as having an infinite area.

From the resistance value R, the sheet resistivity $\rho S$ and the volume resistivity $\rho V$ were calculated by the following formulas.

$$\rho S = F \cdot R \qquad (20)$$

$$\rho V = \rho S \cdot t \qquad (21)$$

Here, t is the layer thickness, and F is a corrective factor determined by the shape of the thin film region and takes a value of from 4.3 to 4.5. Here, F was taken to be 4.4.

The recording layer immediately after the film formation is amorphous, and is initialized by a bulk eraser, namely a laser beam with a wavelength of 830 nm focused to have a long axis of about 70 μm and a short axis of about 1.3 μm, was applied with a power of from 500 to 600 mW at a linear velocity of 3.5 m/s to crystallize the layer over the entire area to obtain the initial state (unrecorded state). With this power, the recording layer is believed to have once melted and then crystallized during resolidification.

For evaluation of recording/retrieving, DDU1000 evaluation machine, manufactured by Pulstek, was used. The wavelength of the optical head was 780 nm, and NA was 0.55. The recording linear velocity was from 1.2 to 4.8 m/s, and the retrieving velocity was 2.4 m/s. Further, 1-time velocity, 2-times velocity, 3-times velocity and 4-times velocity mean 1.2 m/s, 2.4 m/s, 3.6 m/s and 4.8 m/s, respectively.

The pulse strategy shown in FIG. 17 was used for recording. However, at a linear velocity of at least 2.8 m/s, there is a case where Pb=Pe during the off-pulse period $\beta_m T$ at the rear-most end of the mark. Pb was constant at 0.8 mW at all linear velocities.

The clock period at 2-times velocity was 115 nsec. At the time of switching the linear velocity, the clock period T was reversely proportional to the linear velocity.

The retrieving velocity was 2-times velocity, and the allowable value of jitter was 17.5 nsec as stipulated in the CD standards.

Evaluation of the overwriting durability was made by using as an index the number of times of overwriting where jitter of 3T marks was maintained at a level of not higher than 17.5 nsec when repetitive overwriting was carried out at 2-times velocity.

EXAMPLE 1

On the substrate, 100 nm of a lower protective layer $(ZnS)_{80}(SiO_2)_{20}$, 18 nm of a recording layer $Ag_5In_5Sb_{61.5}Te_{28.5}$, 50 nm of an upper protective layer $(ZnS)_{80}(SiO_2)_{20}$ and 200 nm of a reflective layer $Al_{99}Ta_1$ alloy, were formed. All layers were prepared by a sputtering method without releasing vacuum. The substrate was a polycarbonate substrate having a thickness of 1.2 mm and, unless otherwise specified, had a groove having a pitch of 1.6 μm, a width of 0.53 μm and a depth of 32 nm formed by injection molding. Recording was carried out in this groove.

The reflective layer was formed at a film-forming rate of 1.3 nm/sec at a final vacuum degree of not higher than $2 \times 10^{-4}$ Pa under Ar pressure of 0.54 Pa. The volume resistivity was 92 nΩ·m, and the sheet resistivity was 0.46 Ω/□. Impurities such as oxygen, nitrogen, etc. were below the detectable level by X-ray excited photoelectron spectrometry. The sum of all impurities can be regarded as not higher than about 1 atomic %.

The density of the protective layer was 3.50 g/cm³, which was 94% of the theoretical bulk density of 3.72 g/cm³.

With respect to this medium, the recording linear velocity margin and the writing power margin were evaluated. 3T mark jitter was evaluated by changing Pw and the linear velocity while maintaining Pe/Pw=0.5 to be constant. For recording, the pulse strategy shown in FIG. 17 was employed, but Pb=Pe was adopted at $\beta_m T$ at a linear velocity of at least 2.8 m/s.

Further, the medium was preliminarily subjected to overwriting for ten times with EFM random signals and then used for this measurement.

The results are shown in FIG. 18 (hereinafter such a Figure is referred to as a contour map). This indicates that the wider the low jitter area, the wider the linear velocity margin and the writing power margin.

In FIG. 18, it is evident that a wide margin up to a linear velocity of 4.8 m/s was secured with a linear velocity of 2.4 m/s and a writing power of 12 mW at the center. Further, the jitter sharply deteriorated at a linear velocity of 1.2 m/s, but by changing the recording pulse width being 1T, 0.5T, 0.5T, . . . (only the first pulse was 1T, and the second and subsequent pulses were 0.5T) in the pulse strategy to 1T, 0.2T, 0.2T, . . . (provided that in each recording pulse, the forward position was the same), good jitter was obtained.

Then, modulation at 2-times velocity and the writing power dependency of 3T mark jitter were evaluated. In this evaluation, recording was carried out by strictly using the pulse strategy shown in FIG. 17, and measurement was carried out by retrieving at 2-times velocity.

The medium was preliminarily subjected to overwriting for ten times under the prescribed condition and then used for this measurement.

Figure 19A:
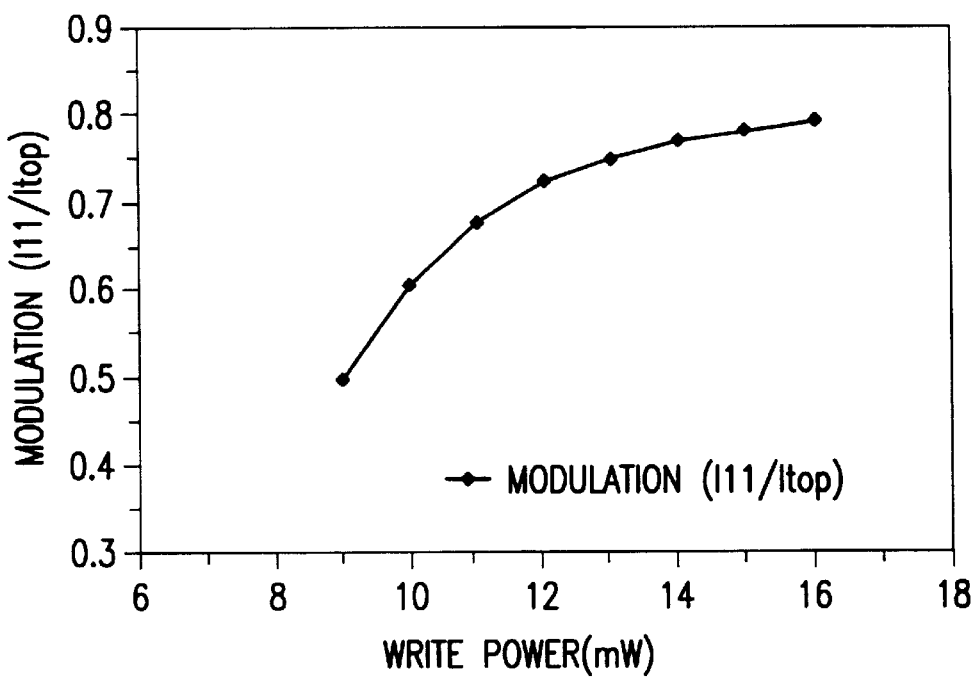
FIG. 19 is a graph showing the writing power dependency and the modulation at 2-times velocity in Example 1.
Figure 19B:
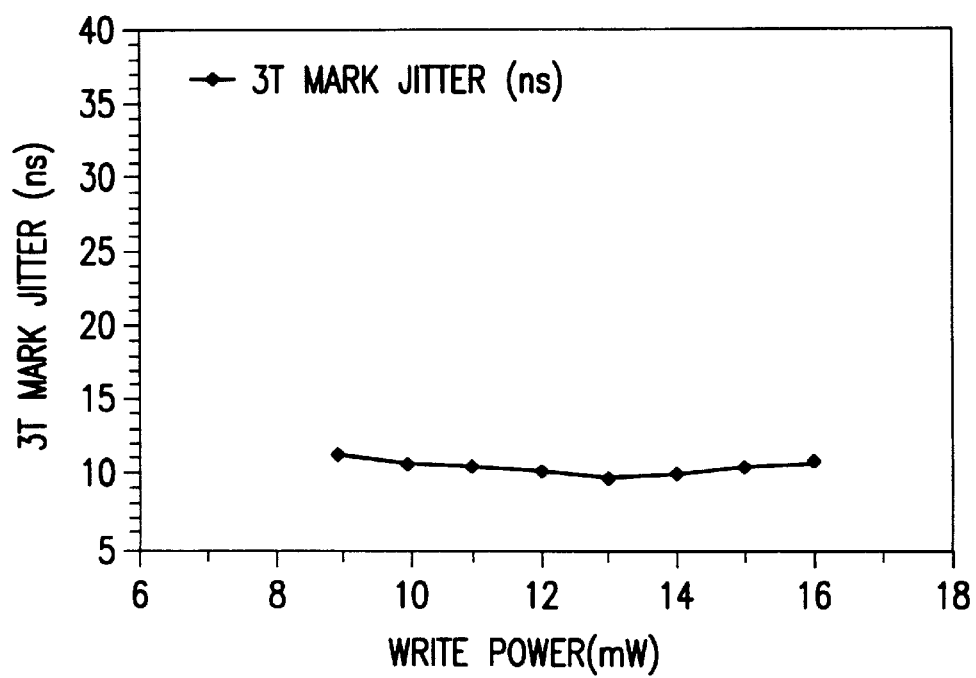
Figure 20A:
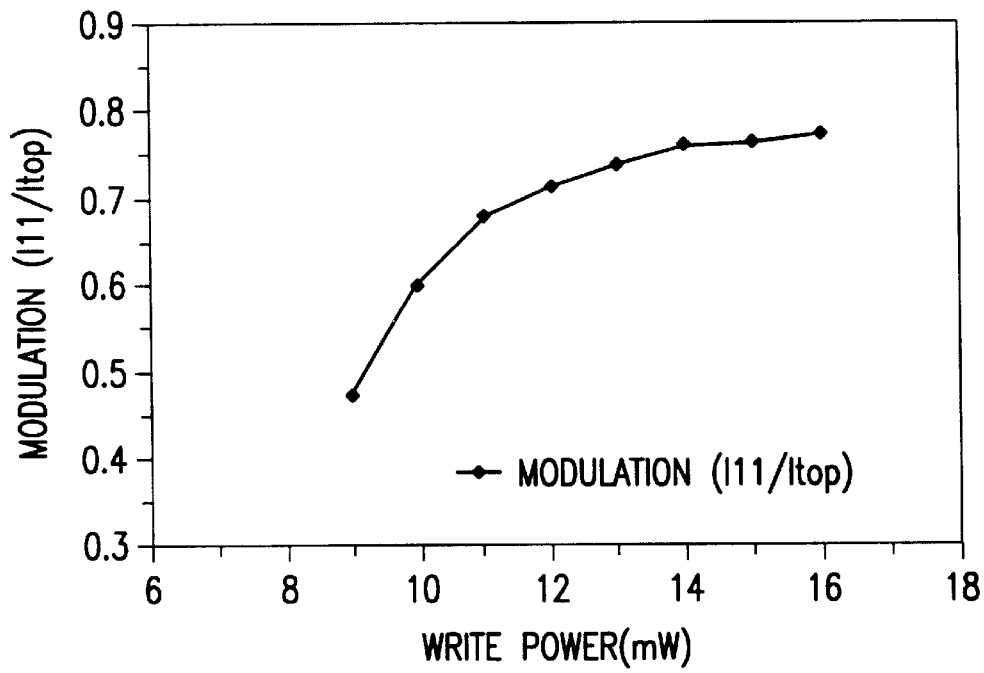
FIG. 20 is a graph showing the writing power dependency and the modulation at 4-times velocity in Example 1.
Figure 20B:
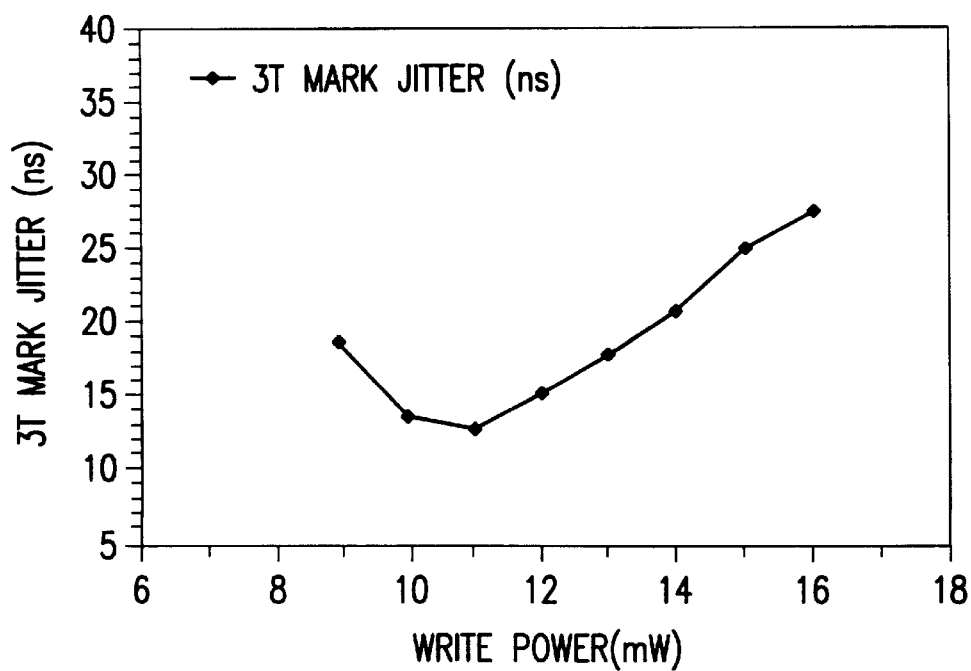

The results of measurement in the case where Pe/Pw=0.5 at 2-times velocity, are shown in FIG. 19, and the results of measurement in a case where Pe was constant at 8 mW at 4-times velocity, are shown in FIG. 20.

Figure 21A:
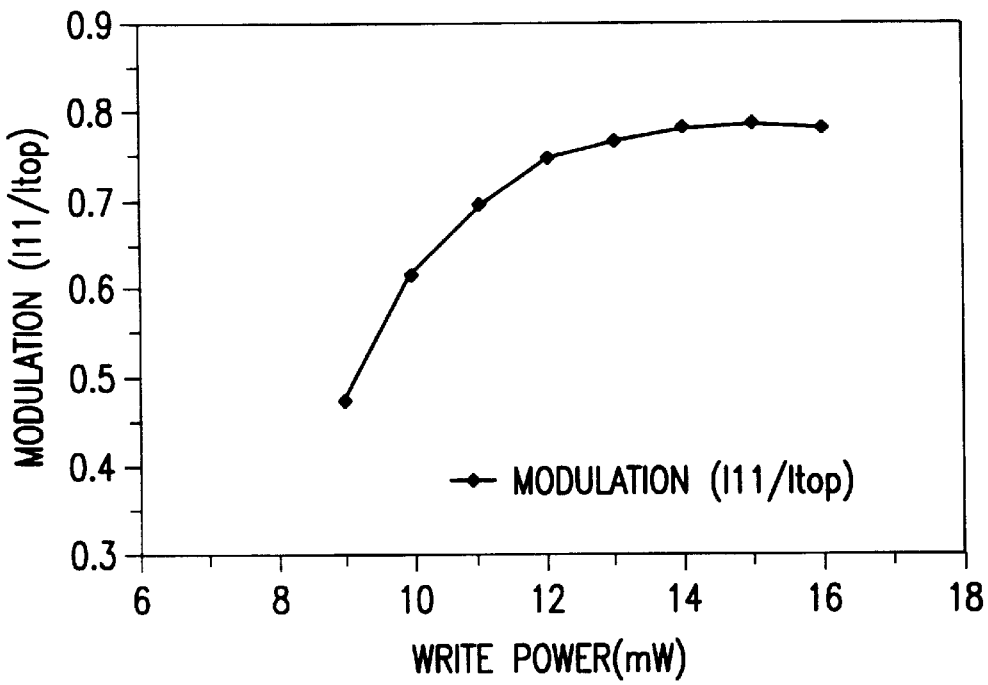
FIG. 21 is a graph showing the writing power dependency and the modulation at 4-times velocity in Example 1.
Figure 21B:
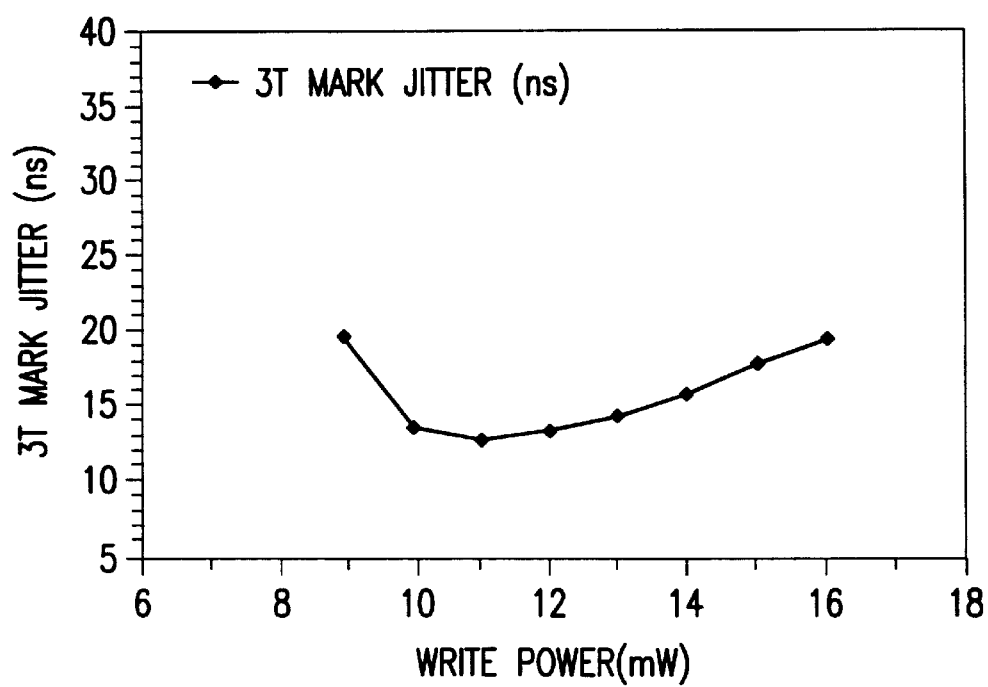

The results of measurement in a case where Pe/Pw=0.5, and $\beta_m=0$, at 4-times velocity, are shown in FIG. 21.

It is evident that at 2-times velocity and 4-times velocity, both modulation and 3T mark jitter have wide writing power margins.

Further, jitter was slightly high at 4-times velocity. However, this represents a poor performance at the frequency number of the FEM signal-generating signal source used by the present inventors, and it has been confirmed that even better jitter of from 3 to 5 nsec is obtainable if such an attribute were eliminated.

EXAMPLE 2

In the substrate and layer structure of Example 1, the recording layer composition was changed to three types of $Ag_5In_5Sb_{61}Te_{29}$, $Ag_5In_5Sb_{61.5}Te_{28.5}$ and $Ag_5In_5Sb_{62}Te_{28}$, and the reflective layer was changed to pure Al (purity: 99.99%) having a thickness of 8.0 nm, to prepare discs in a similar manner.

The reflective layer was formed by sputtering at a final vacuum degree of not higher than $2 \times 10^{-4}$ Pa under Ar pressure of 0.54 Pa at a film-forming rate of 1.4 nm/sec. The volume resistivity was 46 nΩ·m, and the sheet resistivity was 0.58 Ω/□.

Initialization was carried out by a bulk eraser.

With respect to the medium, the recording linear velocity margin and the writing power margin were evaluated.

Figure 22A:
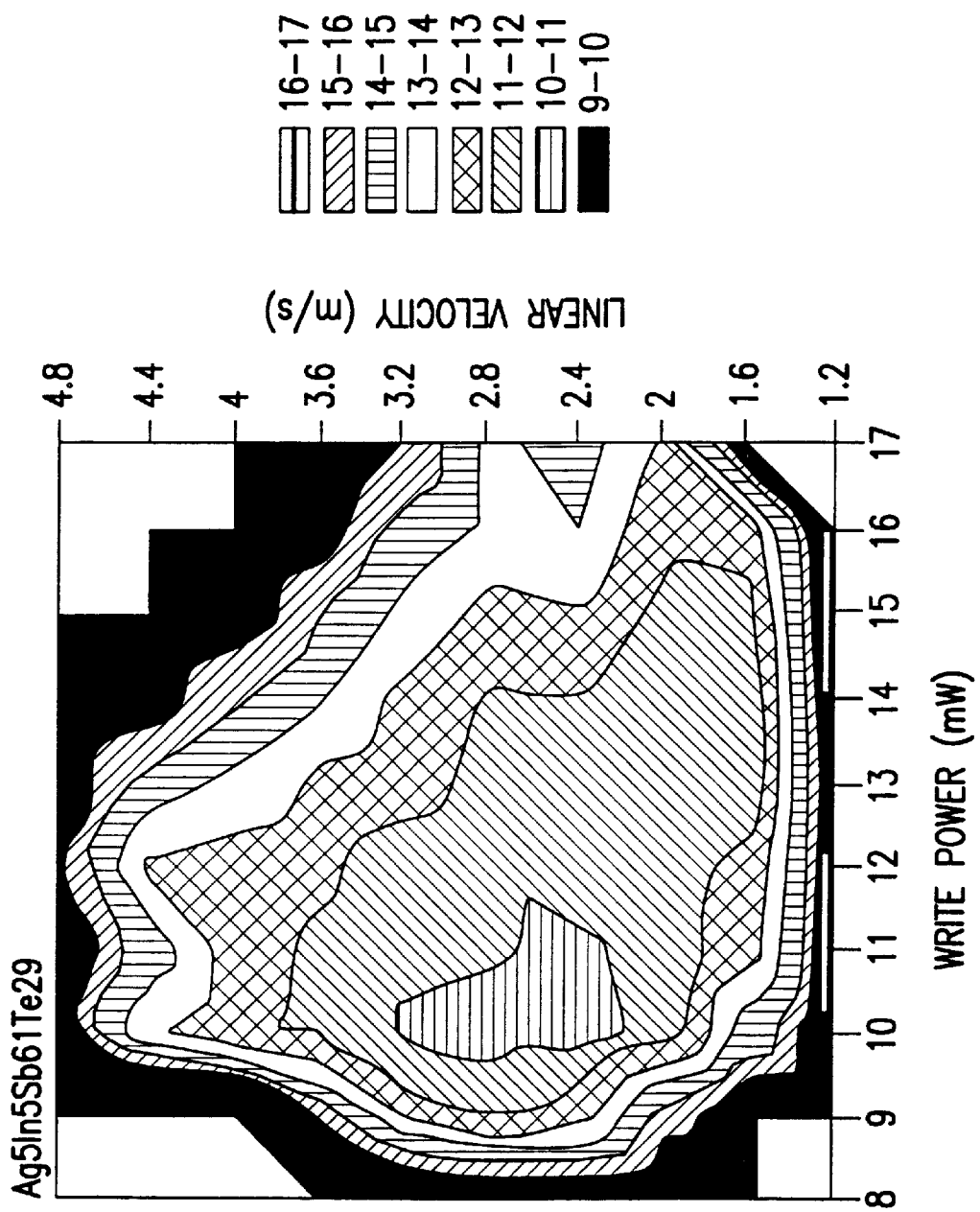
FIG. 22 is a view showing the contour of 3T mark jitter in Example 2.
Figure 22B:
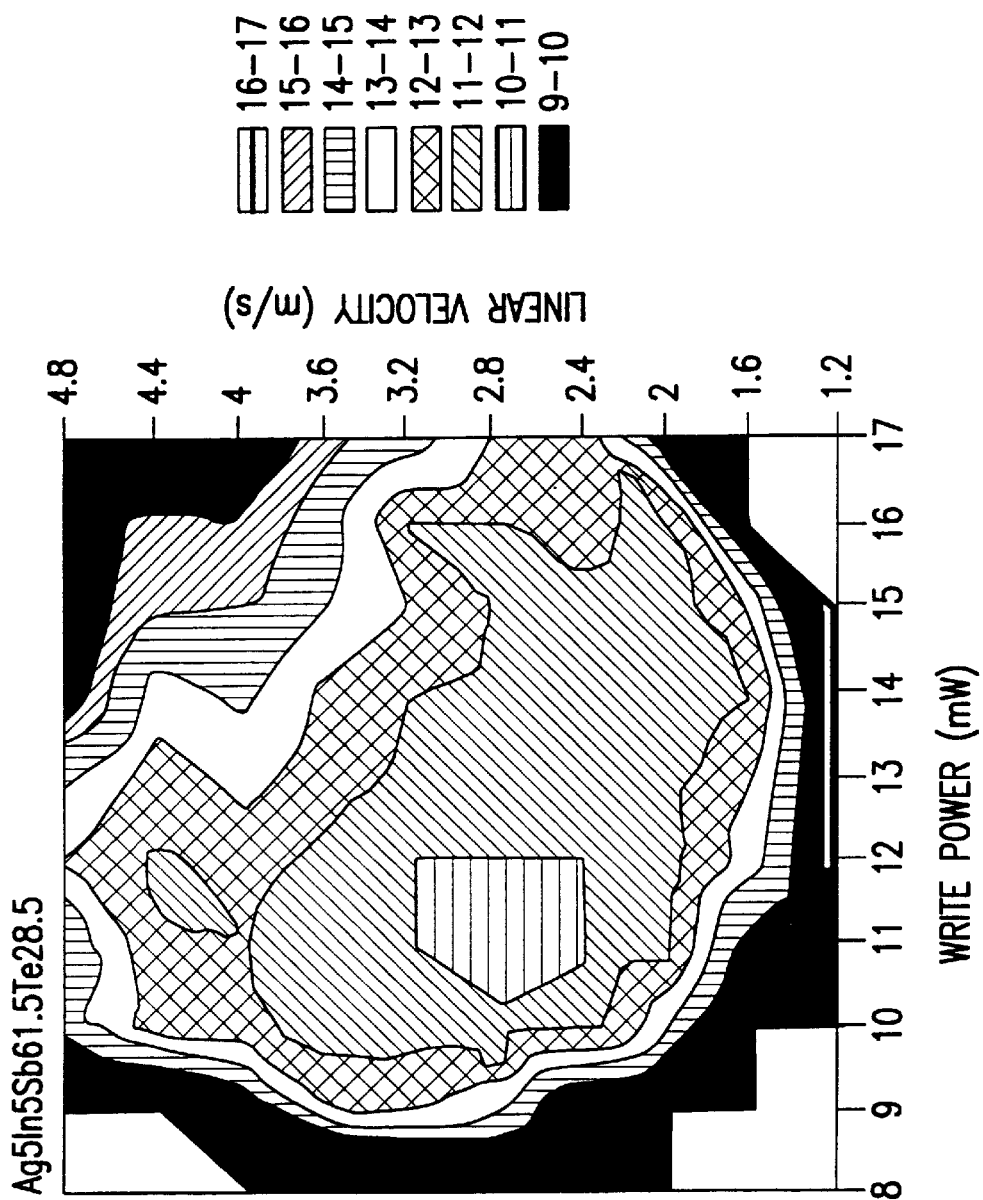

In FIGS. 22(a), (b) and (c), contour maps of 3T mark jitter with the recording layer compositions $Ag_5In_5Sb_{61}Te_{29}$, $Ag_5In_5Sb_{61.5}Te_{28.5}$ and $Ag_5In_5Sb_{62}Te_{28}$, are shown, respectively.

Good jitter was obtained within a wide linear velocity range and a wide writing power range, although the optimum linear velocity at which the minimum jitter was obtained, was shifted to the high linear velocity side as the Sb/Te ratio increased.

This tendency is observed also when the Sb/Te ratio is further increased to be useful for high linear velocity recording at a level of 10 m/s, and a jitter margin with a ratio of maximum linear velocity/minimum linear velocity being at least 2 times is obtainable.

EXAMPLE 3

A disc was prepared in the same manner as in Example 1 except that the reflective layer was changed to pure Ag having a thickness of 80 nm.

The reflective layer was formed by sputtering at a final vacuum degree of not higher than $3 \times 10^{-4}$ Pa under Ar pressure of 1.0 Pa at a film-forming rate of 20 nm/sec. The volume resistivity was 32 $n\Omega \cdot m$, and the sheet resistivity was 0.4 $\Omega/\square$.

Initialization was carried out by a bulk eraser.

With respect to this medium, the recording linear velocity margin and the writing power margin were evaluated.

Figure 23:
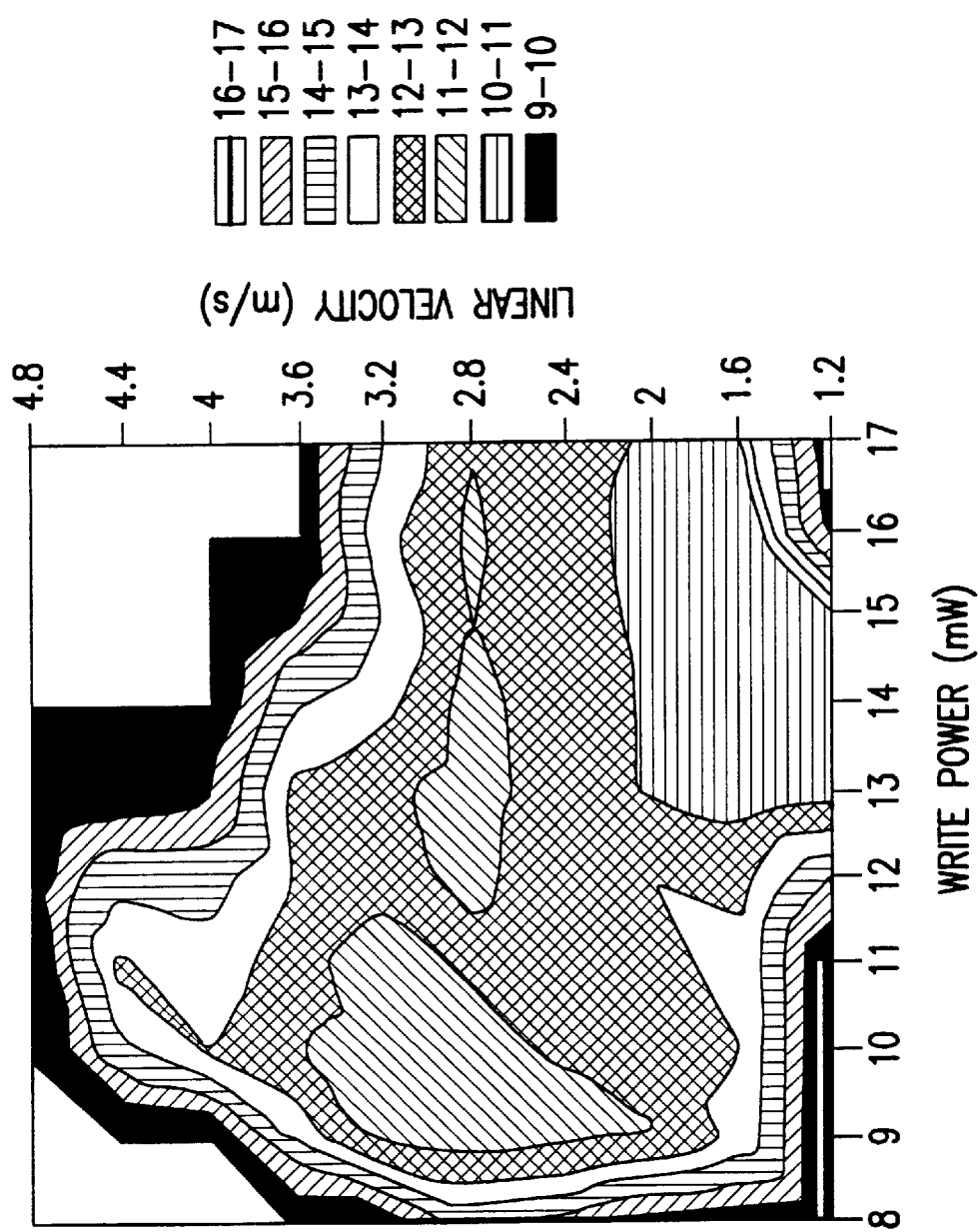
FIG. 23 is a view showing the contour of 3T mark jitter in Example 3.

FIG. 23 shows a contour map of 3T mark jitter.

It is evident that a wide margin is obtainable from 1-time velocity to 3-times velocity, although the center of the jitter margin itself shifted to the low linear velocity side.

EXAMPLE 4

In the substrate and layer structure of Example 1, the reflective layer was changed to double layers of $Al_{99}Ta_1$ and Ag, and the recording layer thickness and the upper protective layer thickness were variously combined to prepare the following four types of layer structures. The film-forming conditions for AlTa and Ag reflective films were the same as in Examples 1 and 3, respectively.

(a) A lower protective layer $(ZnS)_{80}(SiO_2)_{20}$ was 110 nm, a $Ag_5In_5Sb_{61.5}Te_{28.5}$ recording layer was 16 nm, an upper protective layer $(ZnS)_{80}(SiO_2)_{20}$ was 50 nm, and the reflective layer had a double layer structure comprising a $Al_{99}Ta_1$ alloy reflective layer having a thickness of 21 nm and pure Ag having a thickness of 90 nm.

(b) A lower protective layer $(ZnS)_{80}(SiO_2)_{20}$ was 120 nm, a $Ag_5In_5Sb_{61.5}Te_{28.5}$ recording layer was 14 nm, an upper protective layer $(ZnS)_{80}(SiO_2)_{20}$ was 60 nm, and the reflective layer had a double layer structure comprising a $Al_{99}Ta_1$ alloy reflective layer having a thickness of 21 nm and pure Ag having a thickness of 110 nm.

(c) A lower protective layer $(ZnS)_{80}(SiO_2)_{20}$ was 110 nm, a $Ag_5In_5Sb_{61.5}Te_{28.5}$ recording layer was 18 nm, an upper protective layer $(ZnS)_{80}(SiO_2)_{20}$ was 50 nm, and the reflective layer had a double layer structure comprising a $Al_{99}Ta_1$ alloy reflective layer having a thickness of 21 nm and pure Ag having a thickness of 90 nm.

(d) A lower protective layer $(ZnS)_{80}(SiO_2)_{20}$ was 90 nm, a $Ag_5In_5Sb_{61.5}Te_{28.5}$ recording layer was 18 nm, an upper protective layer $(ZnS)_{80}(SiO_2)_{20}$ was 40 nm, and the reflective layer had a double layer structure comprising a $Al_{99}Ta_1$ alloy reflective layer having a thickness of 21 nm and pure Ag having a thickness of 50 nm.

Figure 24A:
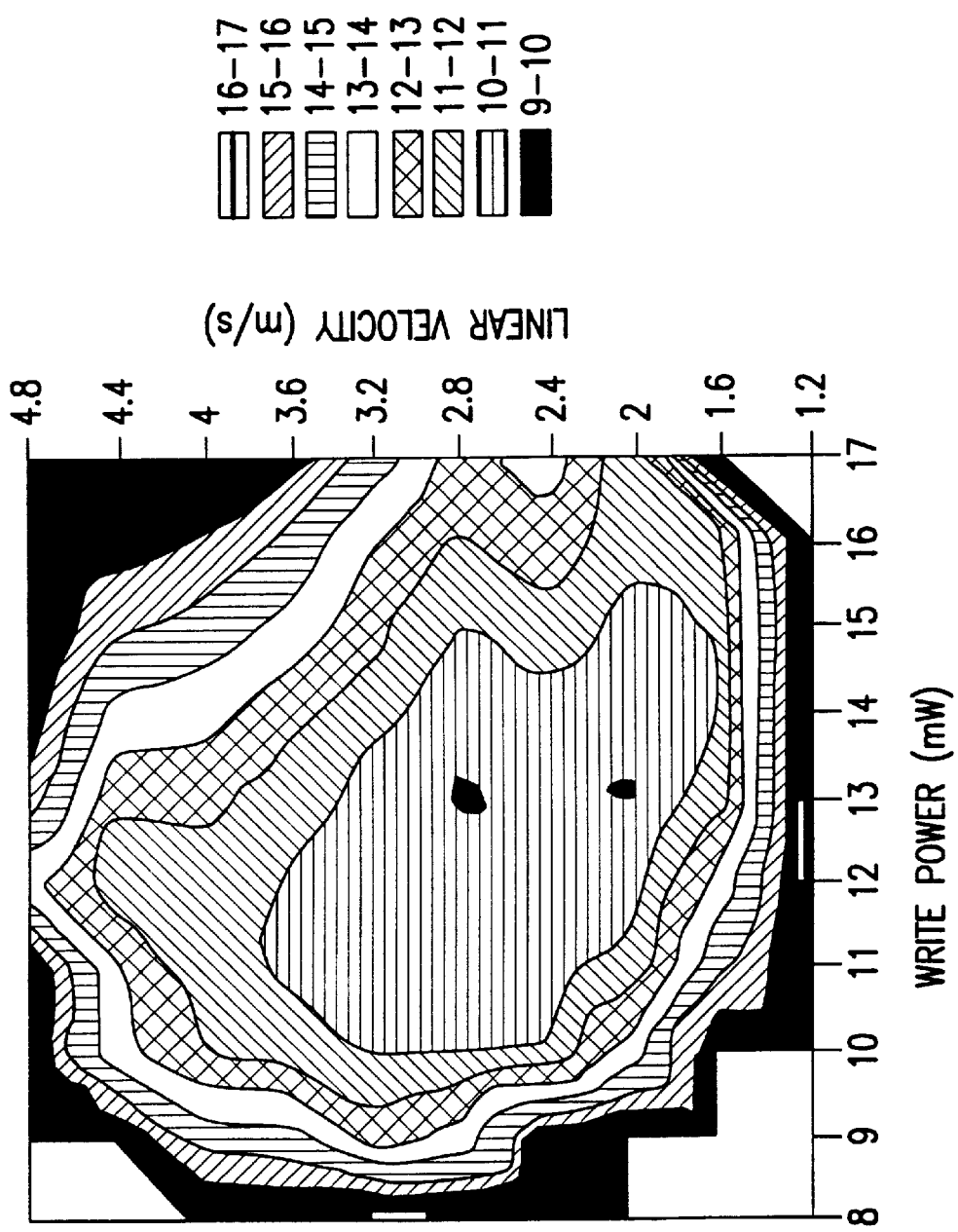
FIG. 24 is a view showing the contour of 3T mark jitter in Example 4.
Figure 24B:
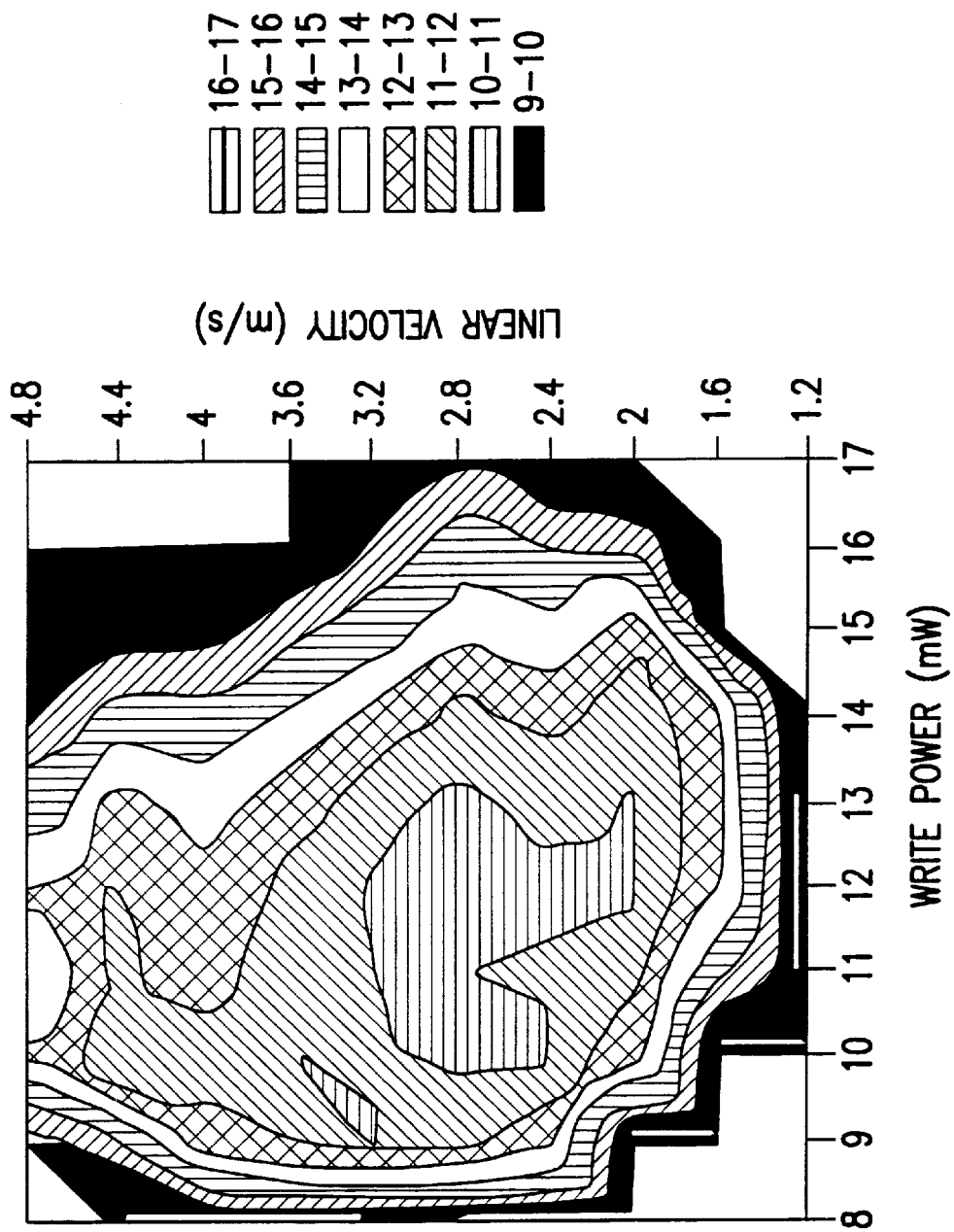
Figure 24C:
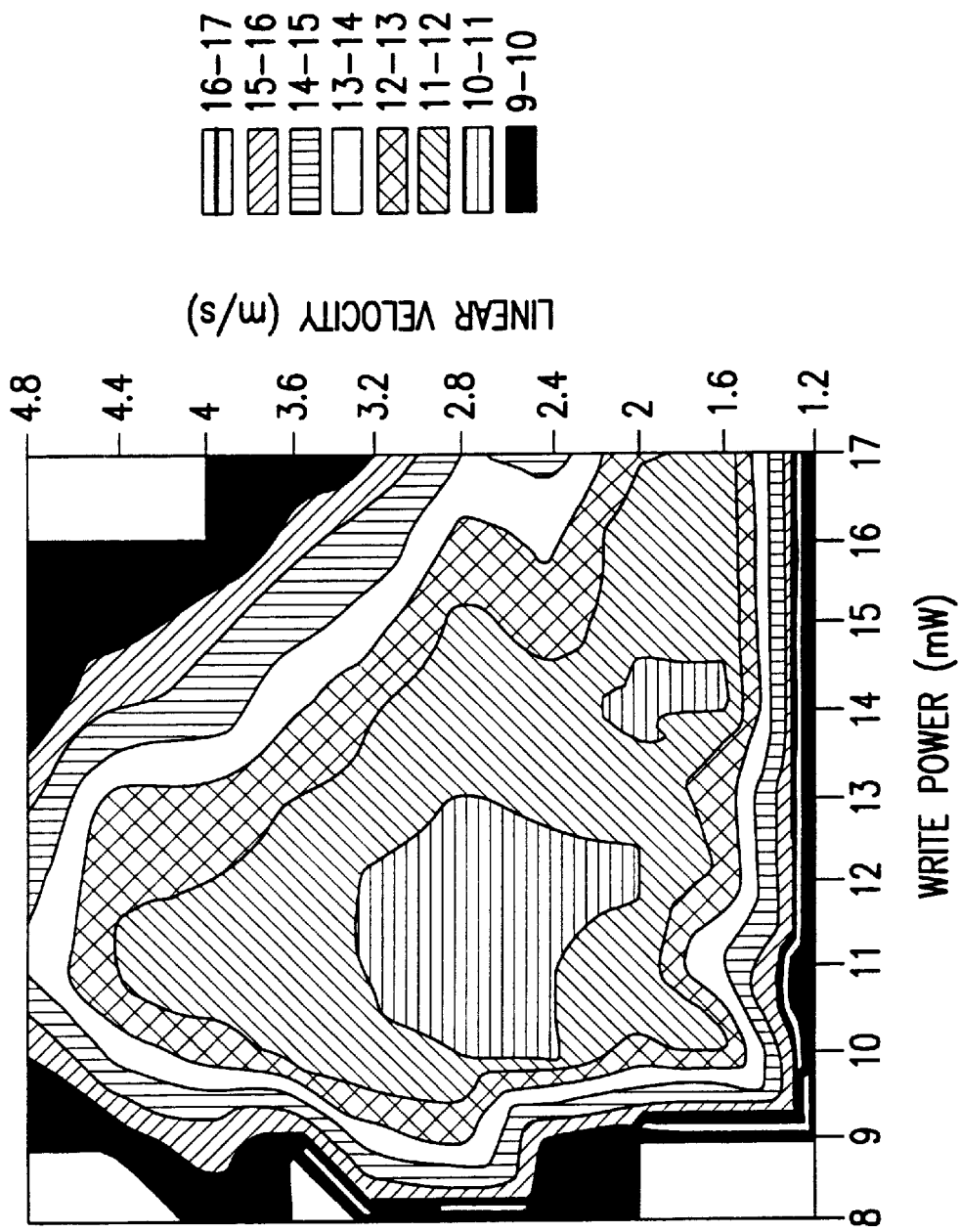
Figure 24D:
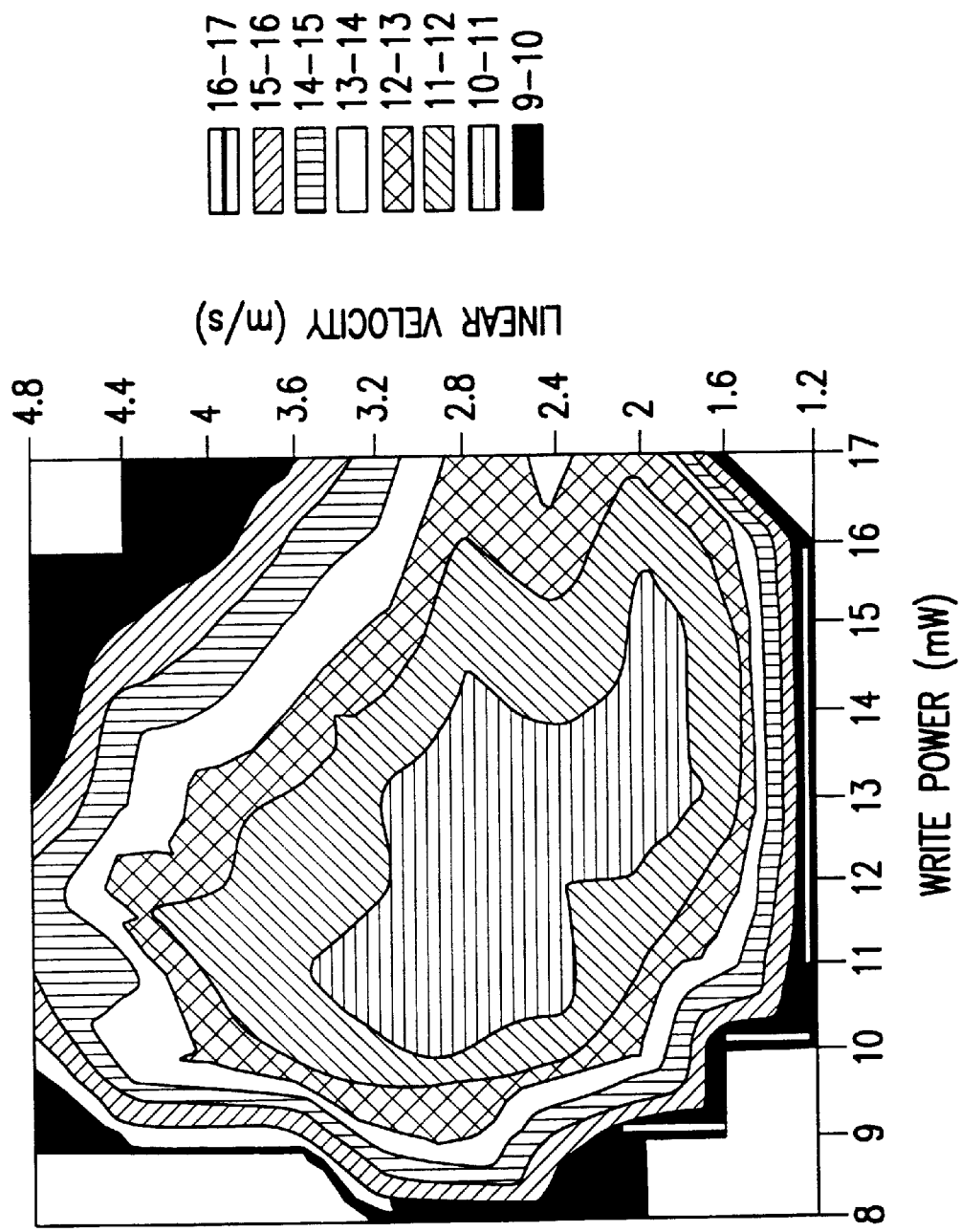

FIGS. 24(a), (b), (c) and (d) show contour maps of 3T mark jitter of Examples 4(a), (b), (c) and (d), respectively.

In each case, wide linear velocity margin and writing power margin were obtained at 2- to 4-times velocity.

With a Ag single layer reflective layer, the repetitive overwriting durability used to be about 1,000 times. Whereas, when these double layer structure reflective layers were used, the repetitive overwriting durability was improved to a level of 5,000 times.

EXAMPLE 5

A disc was prepared in the same manner as in Example 1 except that the reflective layer was changed to an Al alloy containing 0.66 wt % of Si, 0.34 wt % of Cu, 0.9 wt % of Mg and 0.08 wt % of Cr and having a thickness of 180 nm.

The reflective layer was formed by sputtering at a final vacuum degree of not higher than $4 \times 10^{-4}$ Pa under Ar pressure of 1.0 Pa at a film-forming rate of 20 nm/sec. The volume resistivity was 88 $n\Omega \cdot m$, and the sheet resistivity was 0.48 $\Omega/\square$.

Initialization was carried out by a bulk eraser. Also with this medium, the same linear velocity and writing power margins as in Example 1 were secured.

COMPARATIVE EXAMPLES 1, 2 and 3

A disc was prepared in the same manner as in Example 1 except that the reflective layer was changed to $Al_{98}Ta_2$ with a thickness of 400 nm (Comparative Example 1).

With this composition, the volume resistivity was high at a level of at least 150 $n\Omega \cdot m$ under most film-forming conditions.

Especially when the film-forming rate was not higher than 2 nm/sec, an amorphous component was contained in a large amount, and the volume resistivity increased to a level of from 170 to 220 $n\Omega \cdot m$.

The volume resistivity was 190 $n\Omega \cdot m$.

The sheet resistivity was 0.48 $\Omega/\square$, whereby the heat dissipating effect in the plane direction is believed to be sufficient, but the recording sensitivity deteriorated by from 1 to 2 mW, which is believed attributable to the fact that the thermal capacity of the reflective layer per unit area increased too much, so that an extra energy was consumed for its heating.

Further, it takes time until the thick reflective layer is cooled. Accordingly, at a linear velocity of at most about 3 m/s, the cooling became inadequate, whereby recrystallization was remarkable, and good amorphous marks could not be formed, whereby the signal amplitude tended to be small.

Further, jitter was not improved even at a linear velocity of 4.8 m/s.

With the same reflective layer, the thickness was changed to 160 nm (Comparative Example 2), whereby an equal level of recording sensitivity was obtained, and jitter was improved at 4.8 m/s. However, in this case, the sheet resistivity was large, and heat dissipation in the plane direction was inadequate, whereby recrystallization was remarkable at 2.4 m/s, and formation of amorphous marks was inadequate.

Recrystallization at 2.4 m/s was not suppressed even when the layer thickness was made thinner.

Figure 25A:
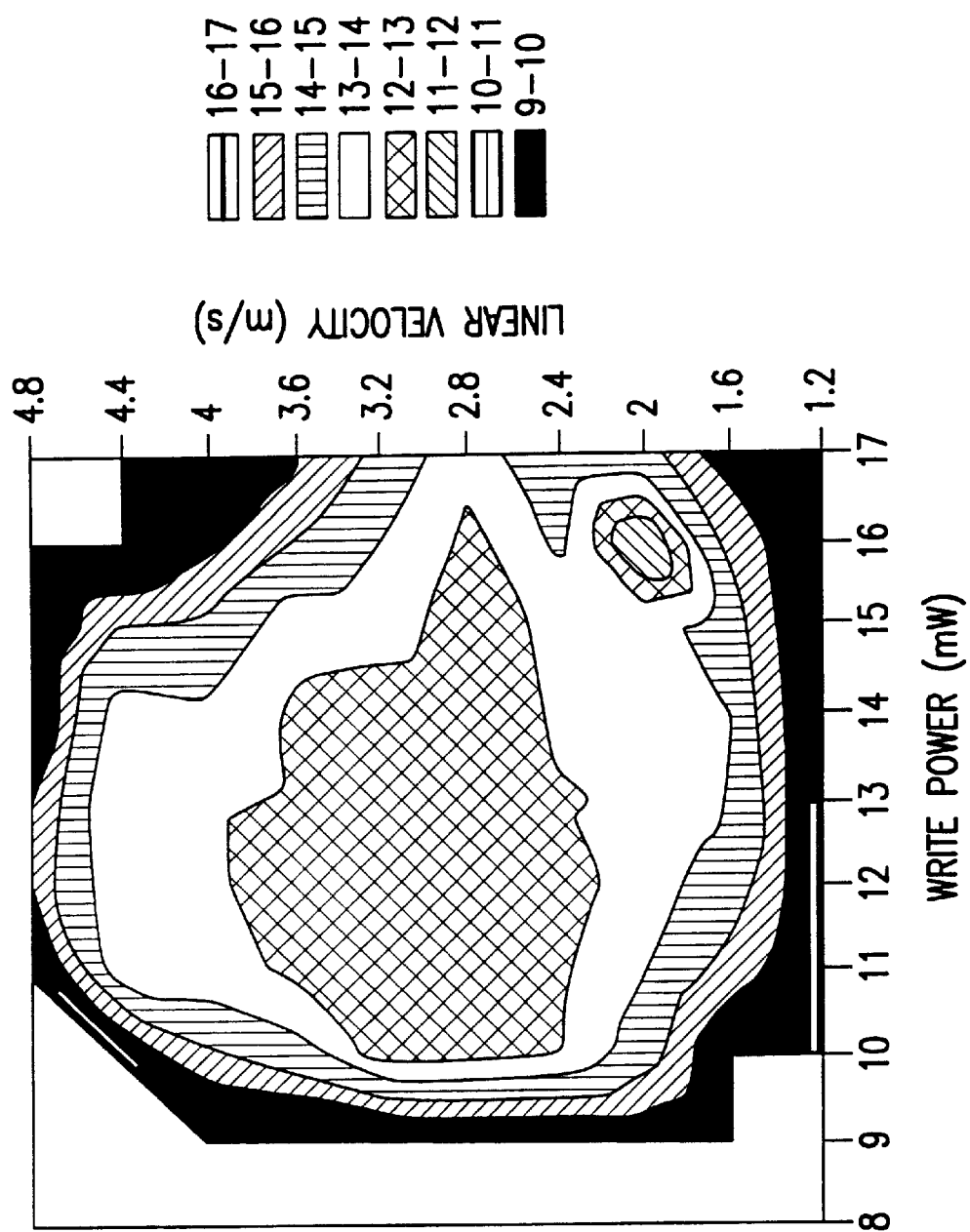
FIG. 25 is a view showing the contour of 3T mark jitter in Comparative Examples 1 and 2.
Figure 25B:
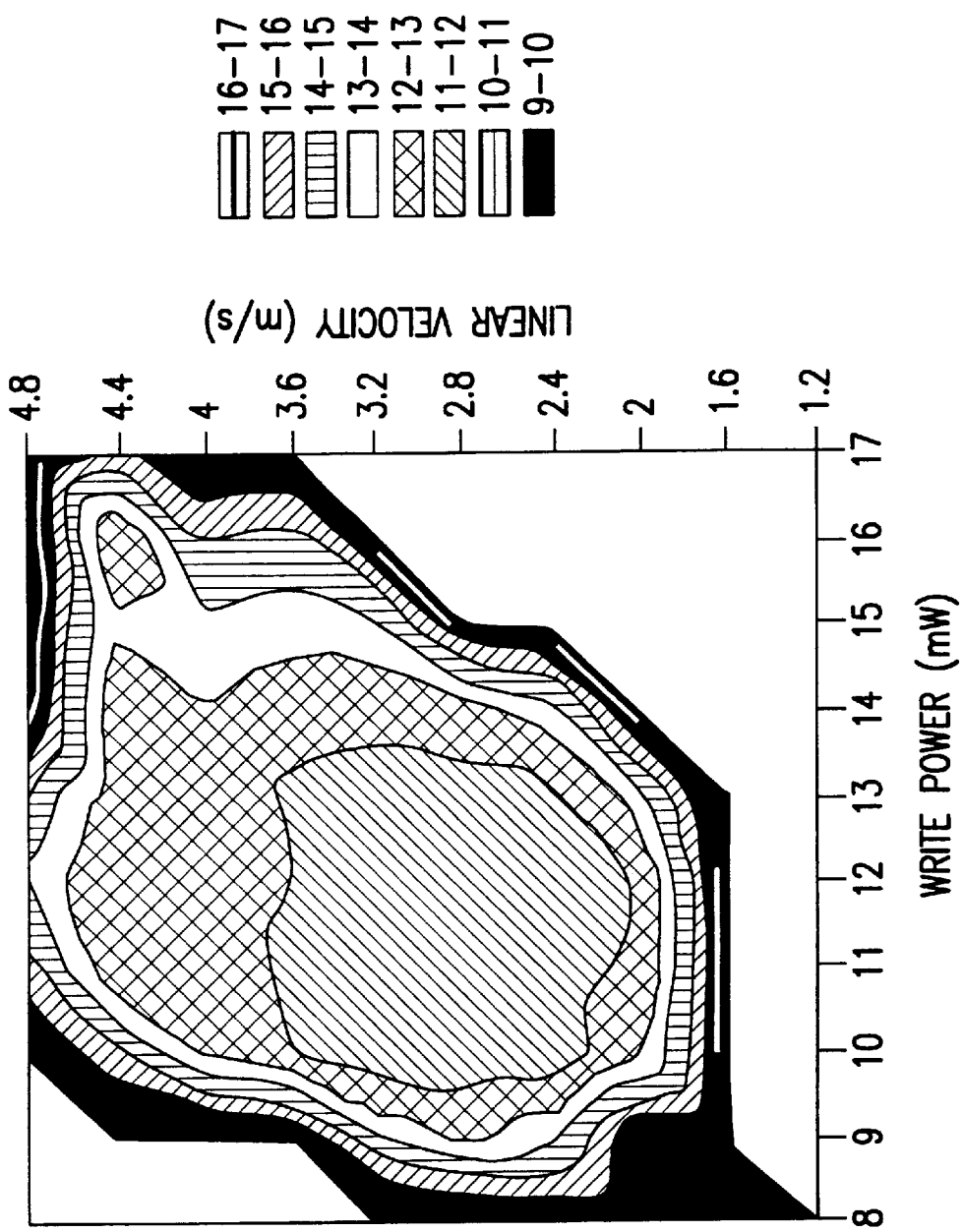

FIGS. 25(a) and (b) show contour maps of 3T jitter in the cases where the reflective layer thickness was 400 nm (Comparative Example 1) and 160 nm (Comparative Example 2), respectively.

In each case, the bottom jitter at 2-times velocity was higher by from 2 to 4 nsec than in Example 1. The reason is that as mentioned above, especially at a low linear velocity, no adequate recording layer cooling rate was obtained, and part of amorphous marks was recrystallized, whereby the signal amplitude decreased or deformed.

Then, in order to obtain amorphous marks at a linear velocity of 2.4 m/s, the recording layer composition in Comparative Example 1 was changed to $Ag_5In_5Sb_{59.5}Te_{30.5}$ to lower the Sb/Te ratio and thereby to obtain a medium having the crystallization speed lowered (Comparative Example 3).

With the reflective layer thickness of 200 nm, good jitter was obtained with a writing power of from 10 to 16 mW at a linear velocity of 2.4 m/s.

However, in this case, erasing was inadequate at a linear velocity of 4.8 m/s, and jitter was at least 17.5 nsec after ten times of overwriting with most recording powers.

COMPARATIVE EXAMPLES 4 and 5

In the layer structure of Example 1, the lower protective layer thickness was changed to 80 nm, the recording layer was changed to $Ag_5In_5Sb_{59.5}Te_{30.5}$ having a thickness of 20 nm, the upper protective layer thickness was changed to 30 nm, and the reflective layer was changed to $Al_{98}Ta_2$ having a thickness of 160 nm (Comparative Example 4), and the linear velocity margin and the writing power margin were evaluated.

The lower protective layer thickness was made slightly thin in order to obtain an optically equal interference structure by setting off the increase in reflectance obtained by making the upper protective layer thin. The difference of this degree in the lower protective layer thickness brings about no substantial thermal change, and the upper protective layer thickness substantially governs heat diffusion.

Figure 26:
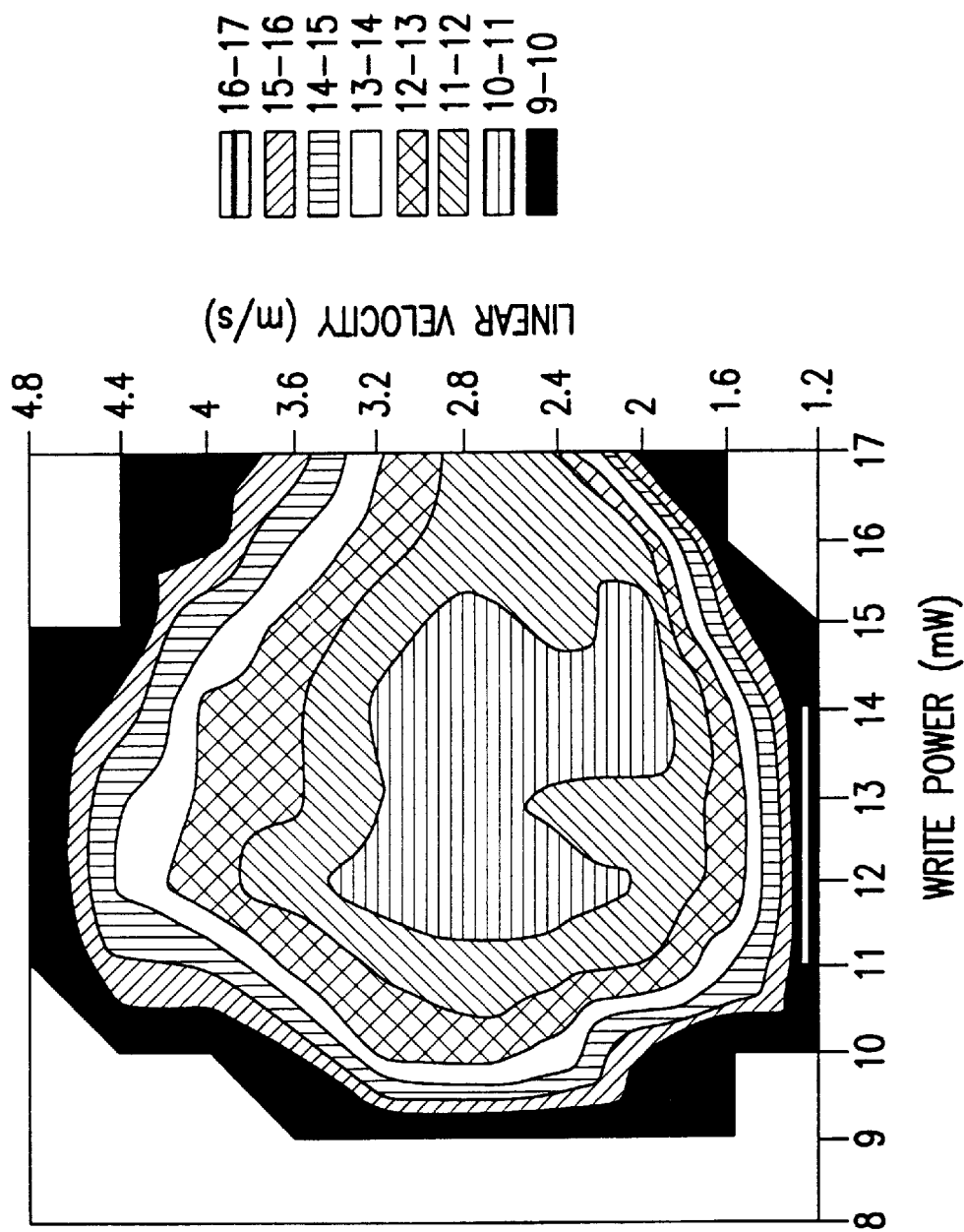
FIG. 26 is a view showing the contour of 3T mark jitter in Comparative Example 4.

FIG. 26 shows a contour map of 3T mark jitter, from which it is evident that no margin is obtainable at 4-times velocity.

Further, in Comparative Example 4, the recording layer composition was changed to $Ag_5In_5Sb_{61.5}Te_{28.5}$ to obtain a medium having the erasing characteristic at 4-times velocity improved (Comparative Example 5), but formation of amorphous marks at 2-times velocity was inadequate due to recrystallization.

EXAMPLE 6

In the layer structure of Example 1, the lower protective layer thickness was changed to 100 nm, the recording layer was changed to $Ag_9Ge_6Sb_{67}Te_{18}$ having a thickness of 18 nm, the upper protective layer thickness was changed to 40 nm, and the reflective layer was changed to $Al_{99}Ta_1$ having a thickness of 250 nm, to obtain a disc. The film-forming conditions of the respective layers were the same as in Example 1.

Figure 27:
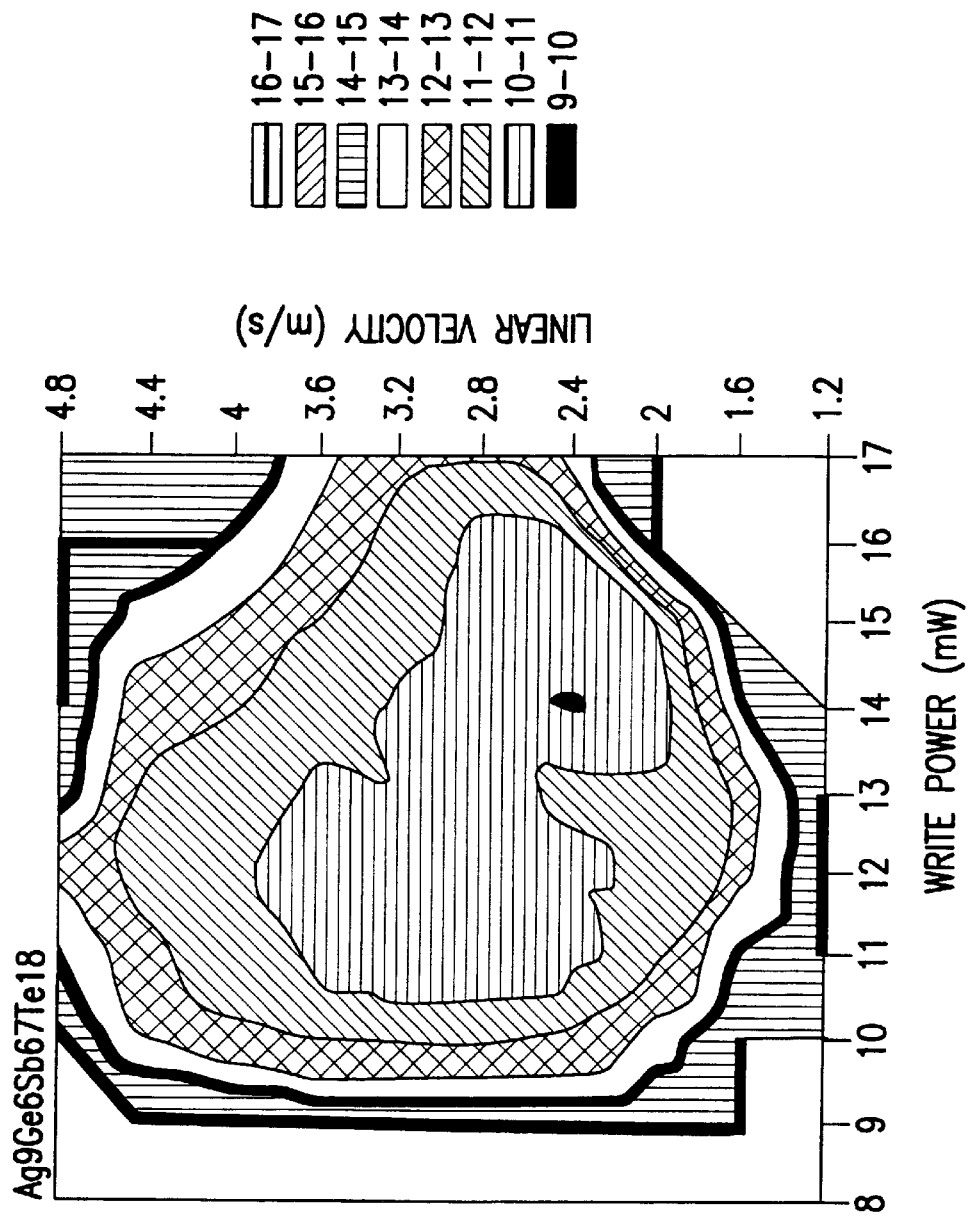
FIG. 27 is a view showing the contour of 3T mark jitter in Example 6.

FIG. 27 shows a contour map of 3T mark jitter. Substantially the same wide linear velocity and writing power margins as in Example 1 were obtained.

EXAMPLE 7

A disc was prepared in the same layer structure as in Example 6 except that the recording layer was changed to $Ag_5Sn_6Sb_{66}Te_{23}$ having a thickness of 18 nm, and the reflective layer was changed to $Al_{99.5}Ta_{0.5}$. The volume resistivity of the reflective layer was 55 nΩ·m.

Figure 28:
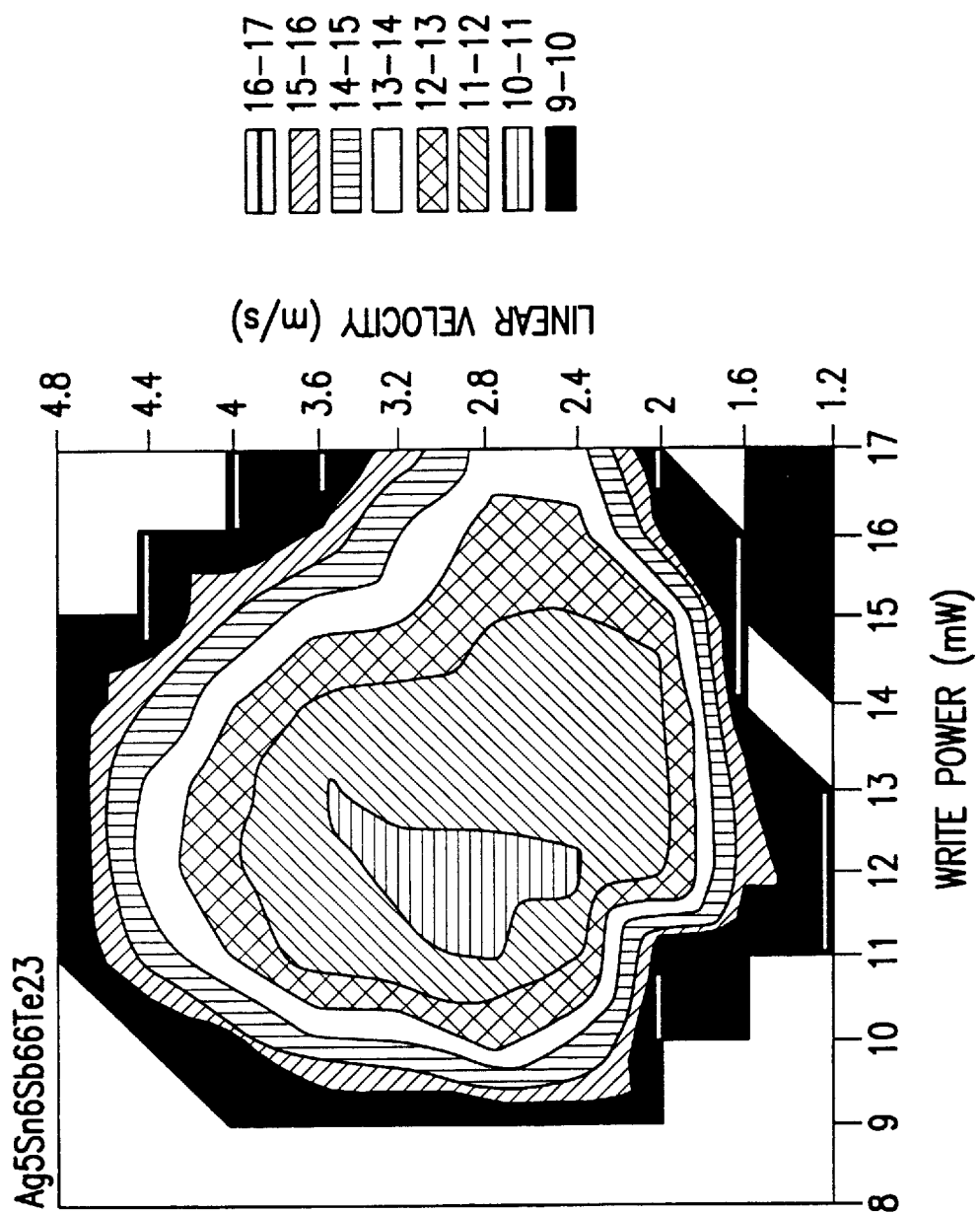
FIG. 28 is a view showing the contour of 3T mark jitter in Example 7.

FIG. 28 shows a contour map of 3T mark jitter. Wide linear velocity and writing power margins were obtained from 1- to 4-times velocity.

EXAMPLE 8

(a) In the layer structure of Example 1, the lower protective layer thickness was changed to 100 nm, the recording layer was changed to $Ag_5In_3Ge_2Sb_{68}Te_{28}$ having a thickness of 20 nm, the upper protective layer thickness was changed to 30 nm, and the reflective layer was changed to $Al_{99}Ta_1$ having a thickness of 160 nm, to obtain a disc. The film-forming conditions of the respective layers were the same as in Example 1.

(b) In the layer structure of Example 1, the lower protective layer thickness was changed to 103 nm, the recording layer was changed to $Ag_5In_3Ge_2Sb_{64}Te_{26}$ having a thickness of 16 nm, the upper protective layer thickness was changed to 42 nm, and the reflective layer was changed to $Al_{99.5}Ta_{0.5}$ having a thickness of 200 nm, to obtain a disc. The film-forming conditions of the respective layers were the same as in Example 1.

Figure 29A:
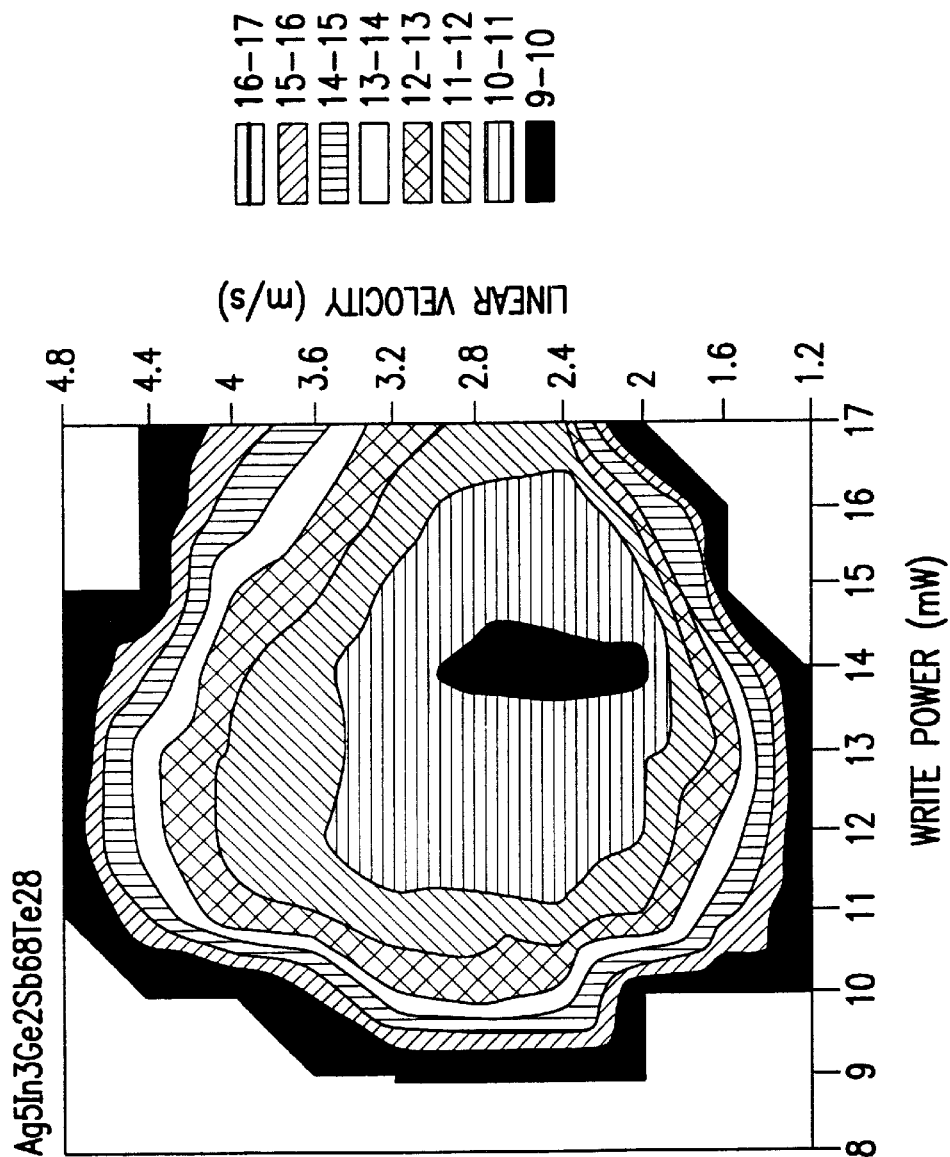
FIG. 29 is a view showing the contour of 3T mark jitter in Example 8.
Figure 29B:
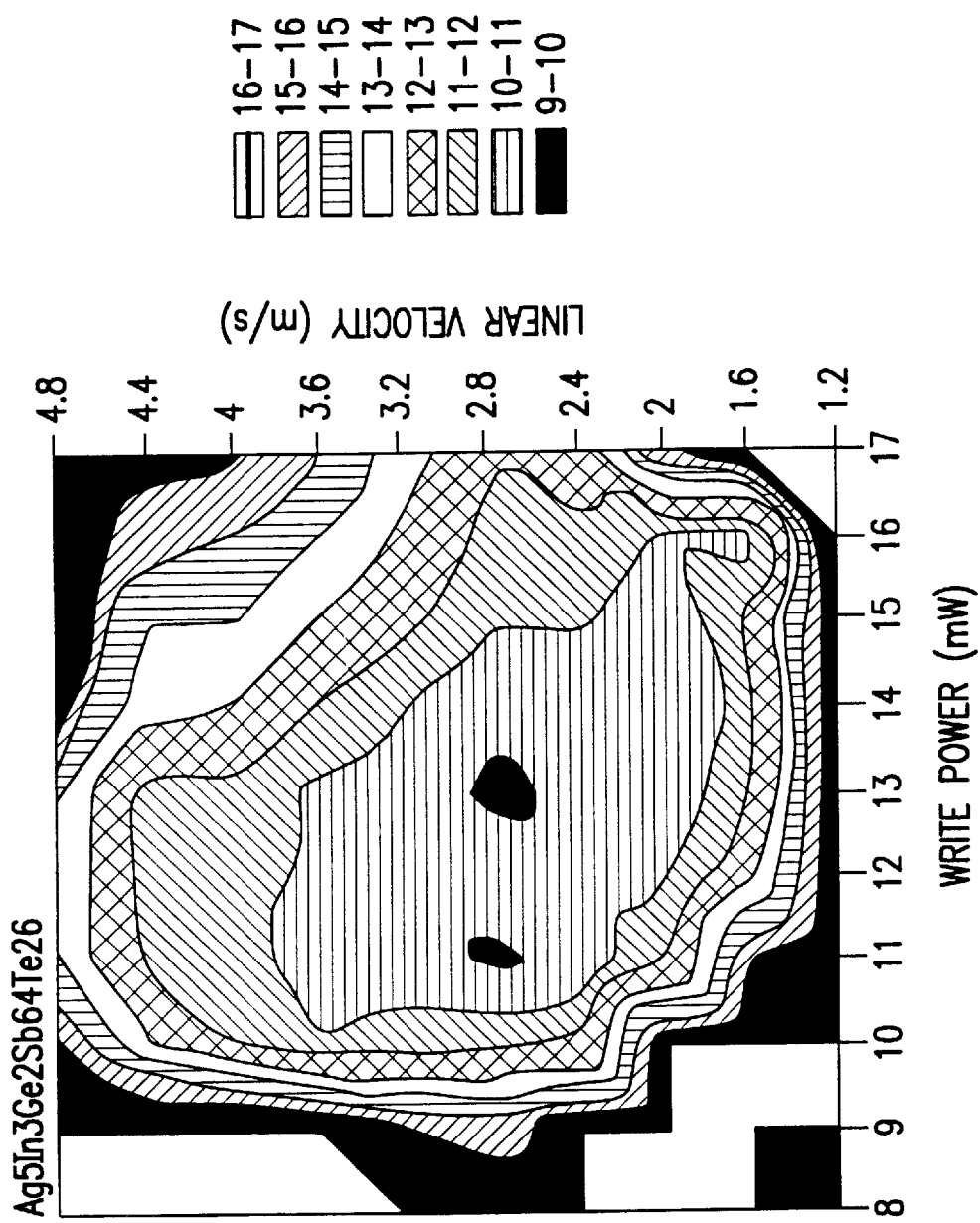

FIGS. 29(a) and (b) show contour maps of 3T mark jitter. Wide linear velocity and writing power margins were obtained from 1- to 4-times velocity.

A wider linear velocity margin was obtained with a thicker protective layer thickness (b) than (a).

EXAMPLE 9

A disc having the layer structure as shown in Table 1 was prepared. The substrate was the same as used in Example 1. The reflective layer was $Al_{99}Ta_1$ with a thickness of 160 nm. As a reference, a case wherein the upper protective layer was 38 nm, was also presented.

TABLE 1

| Film stack $D_1/D_2/D_3$ | $I_{top}$ (mV) | $MOd_G$ | PPb/PPa | NPPR | Calculated $\delta$ ($\pi$) | DOW cyclability |
|---|---|---|---|---|---|---|
| 95/17/38 | 454 | 0.67 | 1.56 | 0.985 | 0.82 | ○ |
| 95/19/38 | 488 | 0.68 | 1.40 | 0.901 | 1.42 | Δ |
| 95/21/38 | 534 | 0.65 | 1.28 | 0.855 | 1.60 | Δ |
| 95/23/38 | 534 | 0.64 | 1.22 | 0.792 | 1.66 | Δ |
| 95/25/38 | 598 | 0.58 | 1.12 | 0.852 | 1.70 | ▲ |
| 95/30/38 |  | 0.46 | — | — | 1.76 | × |
| 95/35/38 |  | 0.4 | — | — | 1.80 | × |
| 95/16/30 | 450 | 0.66 | 1.99 | 0.900 | 0.35 | ○ |
| 95/17/30 | 464 | 0.66 | 1.87 | 0.905 | 0.42 | ○ |
| 95/18/30 | 491 | 0.67 | 1.74 | 1.008 | 0.42 | ○ |
| 95/19/30 | 495 | 0.67 | 1.67 | 1.05 | 0.34 | ○ |
| 75/19/30 | 470 | 0.73 | 1.50 | 0.868 | 1.35 | ▲ |
| 80/19/30 | 452 | 0.74 | 1.82 | 1.05 | 1.10 | Δ |
| 85/19/30 | 487 | 0.7 | 1.53 | 0.931 | 0.84 | Δ |
| 90/19/30 | 492 | 0.68 | 1.69 | 1.025 | 0.50 | ○ |
| 95/19/30 | 529 | 0.66 | 1.72 | 1.10 | 0.34 | ○ |

In the same manner as in Example 1, recording was carried out at 2.4 m/s with the recording pulse strategy of FIG. 17.

The modulation becomes substantially constant against a writing power of at least a certain power level (see FIG. 19). Therefore, the modulation was compared at a writing power (the optimum writing power) where jitter becomes minimum while the modulation becomes substantially constant in the writing power dependency.

The modulation, $I_{top}$, PPb/PPa, NPPR and the calculated phase difference δ are shown in the same Table. Further, repetitive overwriting durability was measured at the optimum writing power at 2.4 m/s in Table 1.

In accordance with the CD standards, a case wherein jitter after 1,000 times is less than 15 nsec was designated by ○, a case of from 15 to 18 nsec was designated by Δ, a case of higher than 18 nsec was designated by ▲, and a case where jitter becomes higher than 20 nm after less than 500 times, was designated by X.

In the case where the upper protective layer was 30 nm, with a lower protective layer thickness of at least 80 nm which is advantageous to repetitive overwriting durability, the change in push-pull due to recording was substantial, PPb/PPa>1.6, or NPPR>1.0, and the servo characteristic after recording was instable. Because, as shown in FIG. 6, δ sharply changes to a region of 0>δ>π, as the thickness of the lower protection layer increases from 75 to 95 nm.

When the upper protective layer is 38 nm, deterioration of the repetitive overwriting characteristics is relatively quick particularly when the recording layer thickness is thicker than 25 nm, and with a recording layer thickness of 35 nm, the respective overwriting characteristic remarkably deteriorated at a level of less than 500 times.

EXAMPLE 10

To provide compatibility with CD, a groove is formed in the medium of the present invention with a track pitch of about 1.6 μm, a groove width of from 0.4 to 0.5 μm and a land width of from 1.2 to 1.1 μm, and recording is carried out in this groove.

In such a case, the width of an amorphous mark on the land portion tends to be slightly wide, and apparent modulation due to the reflectance may increase. An amorphous mark will have a phase difference δ advantageous for groove recording, as this asymmetry is canceled out and as the modulation in groove recording becomes larger than the modulation in land recording.

Namely, when modulation of a retrieving signal is stipulated as the formula (2), and the following formula (22):

$$Mod_G - Mod_L > 0 \tag{22a}$$

$$Mod_G > 0.5 \tag{22b}$$

where $Mod_G$ and $Mod_L$ are modulations in groove recording and land recording, respectively, is satisfied, δ is considered to satisfy the formula (8) even without calculation.

Here, the modulation is a value measured at a writing power (the optimum writing power) where jitter becomes minimum and the modulation is saturated against the writing power and becomes substantially constant, as in Example 6.

The difference in the optimum writing power between the groove and land recordings is extremely small, and therefore, comparison is made with the same writing power.

Further, irrespective of the track pitch, in a case where the groove geometry is substantially groove width≦ and width, if modulation in groove recording is larger than the modulation in land recording, the phase difference δ is judged to be advantageous for groove recording.

Further, the absolute value of modulation itself depends on the reflectance difference component $I_{ref}$ of the amplitude and the retrieving system, but if the normalization is made based on the difference in modulation:

$$Mod_R = (Mod_G - Mod_L)/(Mod_G + Mod_L) \tag{23}$$

the influence of the phase difference can be grasped without depending upon the retrieving system or the reflectance difference.

In the following, an experiment was carried out by changing the various layer thicknesses in the medium of the present invention variously as shown in Table 2 and changing the phase difference δ within a range calculated in FIGS. 6 to 9.

The groove width was 0.5 μm, and the groove depth was 35 nm. The phase difference Φ due to the groove was 0.28π.

TABLE 2

| Film stack $D_1/D_2/D_3$ | Land $I_{top}$ (mV) | Mod | Groove $I_{top}$ (mV) | Mod | $MOd_R$*100 | PPb (mV) | PPa (mV) | PPb/PPa | PPa/$I_{top}$ | NPPR | Calculated δ (π) | DOW cyclability |
|---|---|---|---|---|---|---|---|---|---|---|---|---|
| 85/17/38 | 464 | 0.7 | 419 | 0.72 | 2.86 | 279 | 183 | 1.52 | 0.083 | 0.915 | 0.74 | ○ |
| 95/17/38 | 495 | 0.7 | 447 | 0.68 | 1.49 | 303 | 196 | 1.55 | 0.084 | 0.963 | 0.80 | ○ |
| 105/17/38 | 535 | 0.6 | 490 | 0.63 | 0.79 | 332 | 205 | 1.62 | 0.083 | 1.040 | 0.54 | ○ |
| 85/18/38 | 492 | 0.7 | 439 | 0.71 | 3.37 | 299 | 208 | 1.44 | 0.090 | 0.873 | 0.90 | ○ |
| 95/18/38 | 491 | 0.7 | 439 | 0.69 | 0.00 | 299 | 184 | 1.63 | 0.080 | 1.008 | 0.76 | ○ |
| 105/18/38 | 582 | 0.6 | 538 | 0.60 | 0.84 | 371 | 261 | 1.42 | 0.093 | 0.957 | 0.48 | ○ |
| 85/19/38 | 523 | 0.6 | 474 | 0.68 | 5.72 | 337 | 248 | 1.36 | 0.100 | 0.862 | 0.98 | Δ |
| 95/19/38 | 530 | 0.6 | 486 | 0.68 | 3.60 | 336 | 240 | 1.40 | 0.094 | 0.873 | 1.40 | Δ |
| 105/19/38 | 582 | 0.6 | 536 | 0.63 | 1.69 | 363 | 254 | 1.43 | 0.091 | 0.949 | 1.60 | Δ |
| 85/20/38 | 542 | 0.6 | 486 | 0.69 | 6.37 | 334 | 252 | 1.33 | 0.099 | 0.842 | 1.34 | ▲ |
| 95/20/38 | 553 | 0.6 | 510 | 0.67 | 4.91 | 358 | 254 | 1.41 | 0.095 | 0.900 | 1.48 | Δ |
| 105/20/38 | 591 | 0.60 | 541 | 0.64 | 3.07 | 373 | 270 | 1.38 | 0.095 | 0.905 | 1.75 | Δ |
| 95/15/50 | 384 | 0.8 | 370 | 0.75 | 0.00 | 232 | 130 | 1.78 | — | 1.008 | 0.85 | ○ |
| 105/15/50 | 428 | 0.7 | 388 | 0.72 | −1.09 | 269 | 156 | 1.72 | 0.077 | 1.015 | 0.78 | ○ |
| 115/15/50 | 509 | 0.7 | 466 | 0.66 | −1.27 | 325 | 200 | 1.63 | 0.084 | 1.008 | 0.72 | ○ |
| 95/16/50 | 424 | 0.7 | 385 | 0.75 | 2.61 | 259 | 165 | 1.57 | 0.082 | 0.929 | 0.94 | ○ |
| 105/16/50 | 457 | 0.70 | 418 | 0.73 | 1.89 | 285 | 179 | 1.59 | 0.082 | 0.949 | 0.86 | ○ |
| 115/16/50 | 525 | 0.7 | 486 | 0.70 | 1.45 | 335 | 218 | 1.54 | 0.086 | 0.963 | 0.76 | ○ |
| 95/17/50 | 443 | 0.7 | 397 | 0.76 | 5.62 | 276 | 187 | 1.48 | 0.090 | 0.860 | 1.05 | ○ |
| 105/17/50 | 497 | 0.7 | 449 | 0.73 | 3.61 | 305 | 209 | 1.46 | 0.098 | 0.872 | 1.00 | ○ |
| 115/17/50 | 564 | 0.6 | 507 | 0.68 | 3.60 | 350 | 244 | 1.43 | 0.092 | 0.923 | 1.00 | ○ |
| 95/18/50 | 469 | 0.7 | 422 | 0.75 | 6.12 | 283 | 202 | 1.40 | 0.091 | 0.821 | 1.20 | Δ |
| 105/18/50 | 494 | 0.6 | 465 | 0.71 | 6.77 | 329 | 239 | 1.38 | 0.089 | 0.848 | 1.26 | ▲ |
| 115/18/50 | 580 | 0.6 | 524 | 0.68 | 4.04 | 363 | 257 | 1.41 | 0.094 | 0.905 | 1.44 | Δ |
| 115/14.5/60 | 456 | 0.7 | 408 | 0.75 | 1.35 | 286 | 181 | 158 | 0.085 | 0.963 | — | ▲ |
| 125/14.5/60 | 529 | 0.7 | 464 | 0.71 | 2.69 | 319 | 210 | 1.52 | 0.086 | 0.949 | — | ▲ |

For recording/retrieving, DDU1000 manufactured by Pulstek Co. was used with a system of NA=0.5 and a wavelength of 780 nm. With the pulse strategy of FIG. 17, recording of EFM random pattern was carried out at a linear velocity of 2.4 m/s in a ratio of Pw/Pe=13 mW/6.5 mW.

In this Example, the upper and lower protective layers were $(ZnS)_{80}(SiO_2)_{20}$, the recording layer was $Ag_5In_5Sb_{60}Te_{30}$, and the reflective layer had a double layer structure of $Al_{99}Ta_1$ (40 nm)/pure Ag (60 nm). The film-forming conditions of the respective layers were the same as in Example 4.

Thermally, this Example was substantially the same as in Example 4, and in each case, wide linear velocity and writing power margins corresponding to FIG. 18 were obtained.

Only the thicknesses of the lower protective layer ($D_1$), the recording layer ($D_2$) and the upper protective layer ($D_3$) were variously changed, and these thicknesses are shown in Table 2.

In this Example, a layer structure whereby the $I_{ref}$ component of the formula (3) can effectively be used, is utilized by using the vicinity where the reflectance in an amorphous state becomes lowest. Accordingly, in Layer Structure Design Example 1, a region of $\partial R_{top}/\partial D_2 > 0$ is utilized.

Furthermore, as the contribution of the reflected light from amorphous marks is little, a layer structure design is intended whereby a large push-pull signal can be taken in the vicinity of $\Delta$ being in the vicinity of $\pm \pi/2$, taking into consideration the servo signal after recording.

Figure 30:
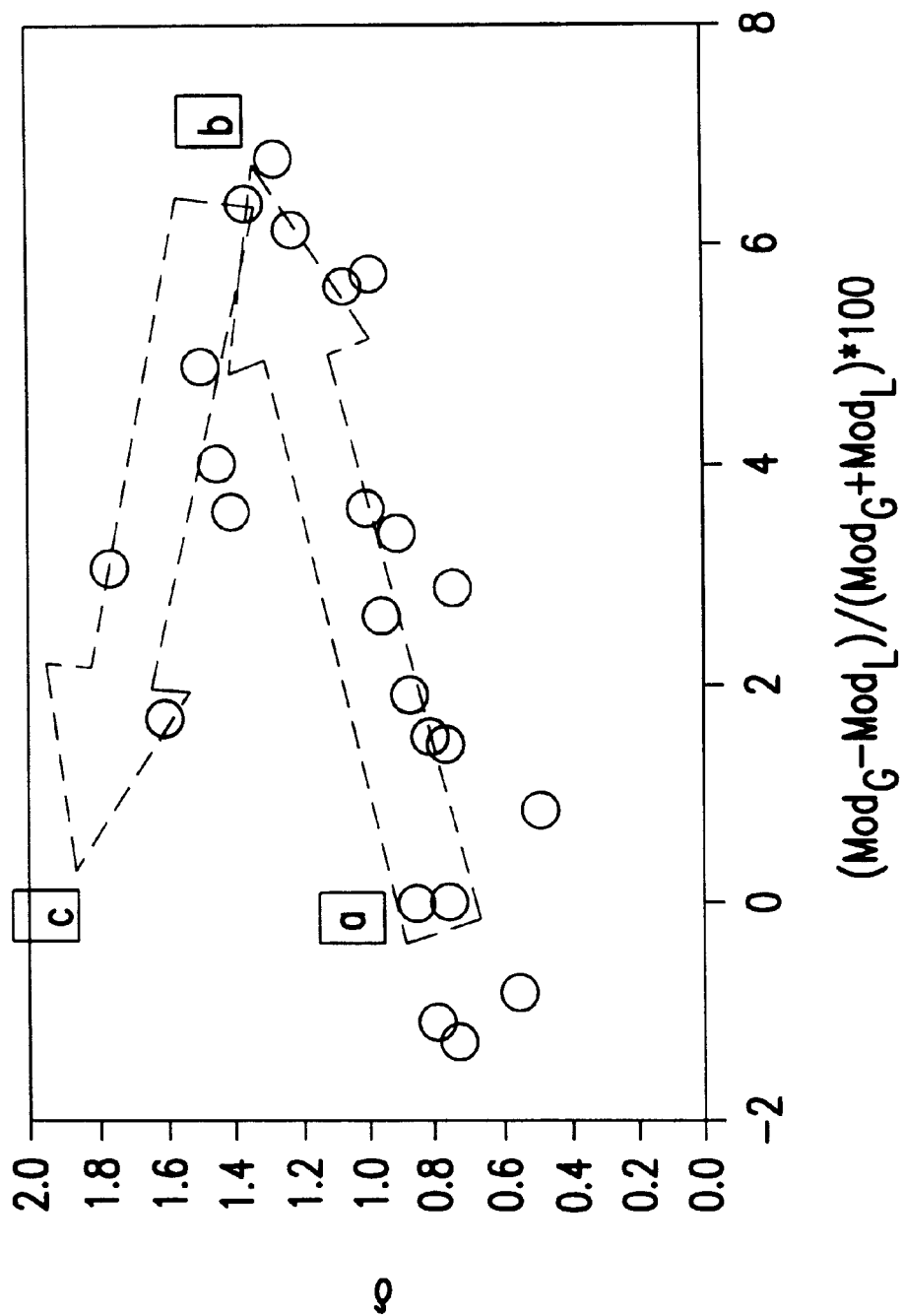
FIG. 30 shows the correlation between the measured value of $Mod_R$ and calculated $\Delta$ in the layer structure in Example 10.

FIG. 30 shows an correlation between calculated $\delta$ (the range of Calculation Examples of FIGS. 6 to 10) and the normalized modulation difference of $Mod_R$. As $\delta$ increases from the vicinity of $\pi$ (the arrow from point "a" to point "b" in the Figure), $Mod_R$ increases and reaches the maximum value in the vicinity of $3\pi/2$. As $\delta$ further increases (the arrow from point "b" to point "c" in the Figure), $Mod_R$ decreases again. Strictly speaking, the point at which $Mod_R$ is 0 i.e. $\delta=\pi$ or $2\pi$ (point "a" or "c" in the Figure) and the point where $Mod_R$ becomes maximum i.e. $\delta=3\pi/2$ (point "b" in the Figure) are slightly deviated.

However, the difference between the calculated and measured values i.e. the calculation in the Calculation Examples, is approximate to a plane wave and is considered to be in fairly good correspondence in consideration of the facts that a certain deviation will result in values measured by a focused beam, and fluctuation in the measured values is about 2 nm in the case of the recording layer and from 3 to 5 nm in the case of the protective layer.

The same table also shows the push-pull ratio PPb/PPa as between before and after recording, and the standardized push-pull ratio NPPR. A stable servo signal can be obtained before and after recording, if PPb/PPa$\leq$1.6 or NPPR$\leq$1.0. Namely, when PPb/PPa>1.6 or NPPR>1.0, the servo tends to be unstable during recording.

Figure 31A:
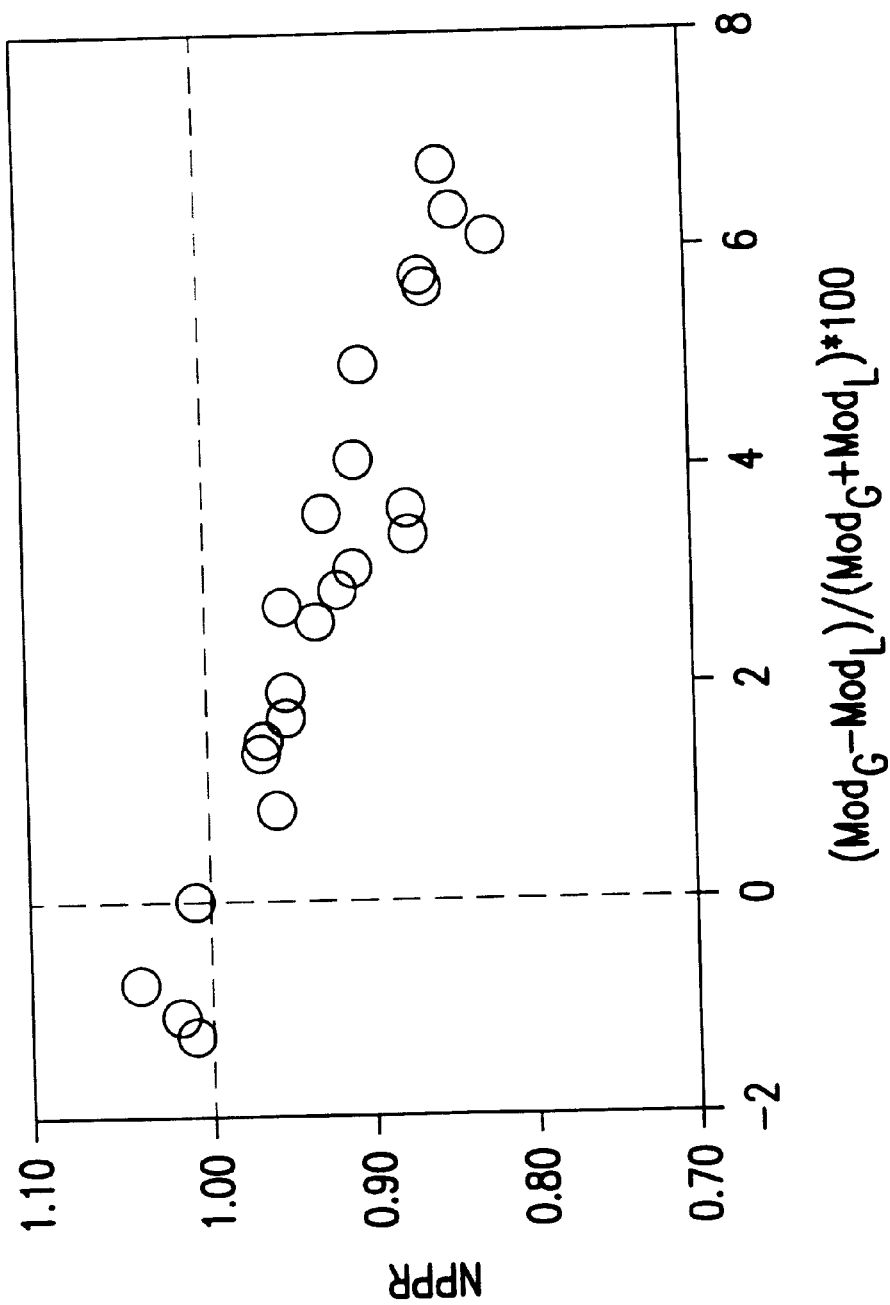
FIG. 31 shows the correlations between $Mod_R$ and NPPR, PPb/PPa and $PPa/I_{top}$ in the layer structure in Example 10.
Figure 31B:
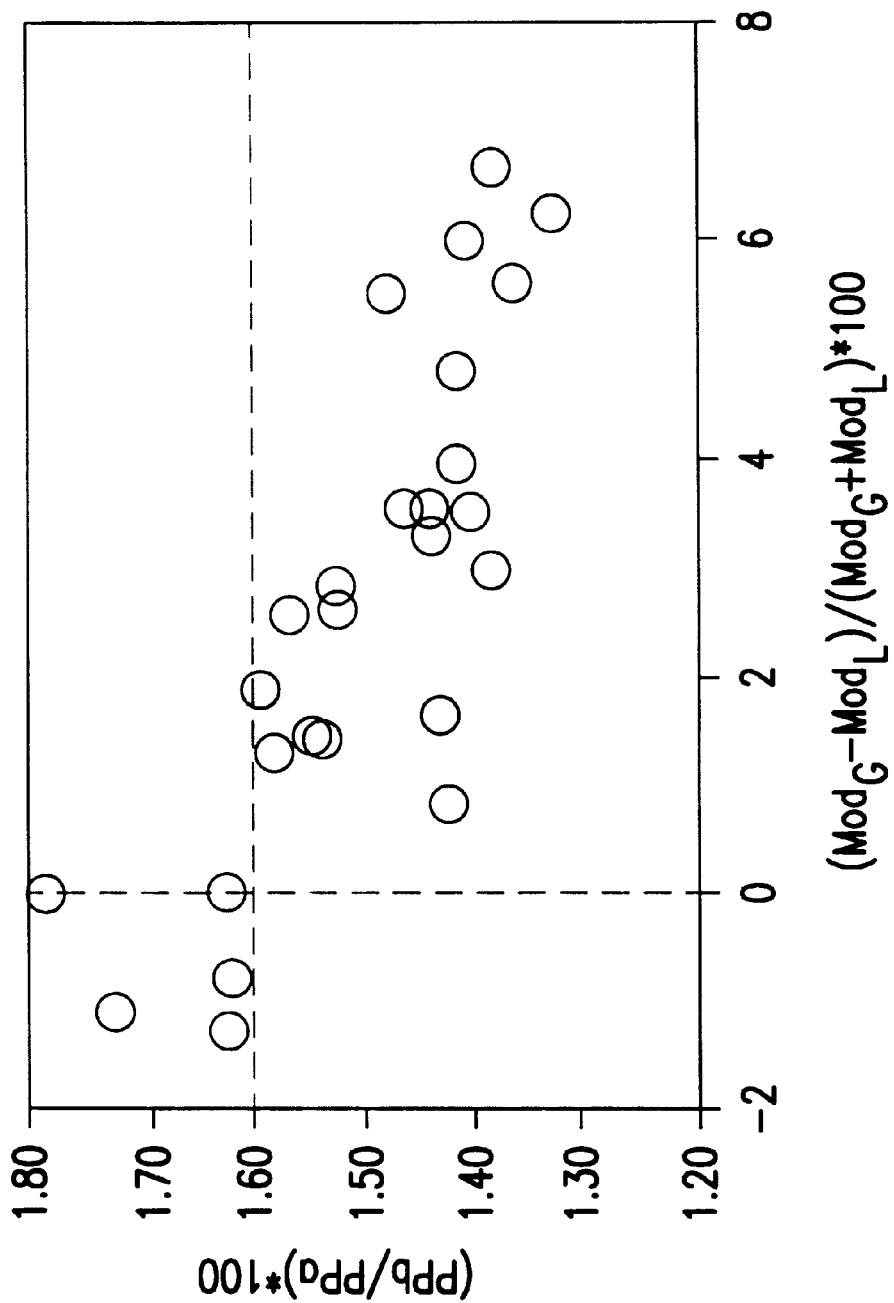
Figure 31C:
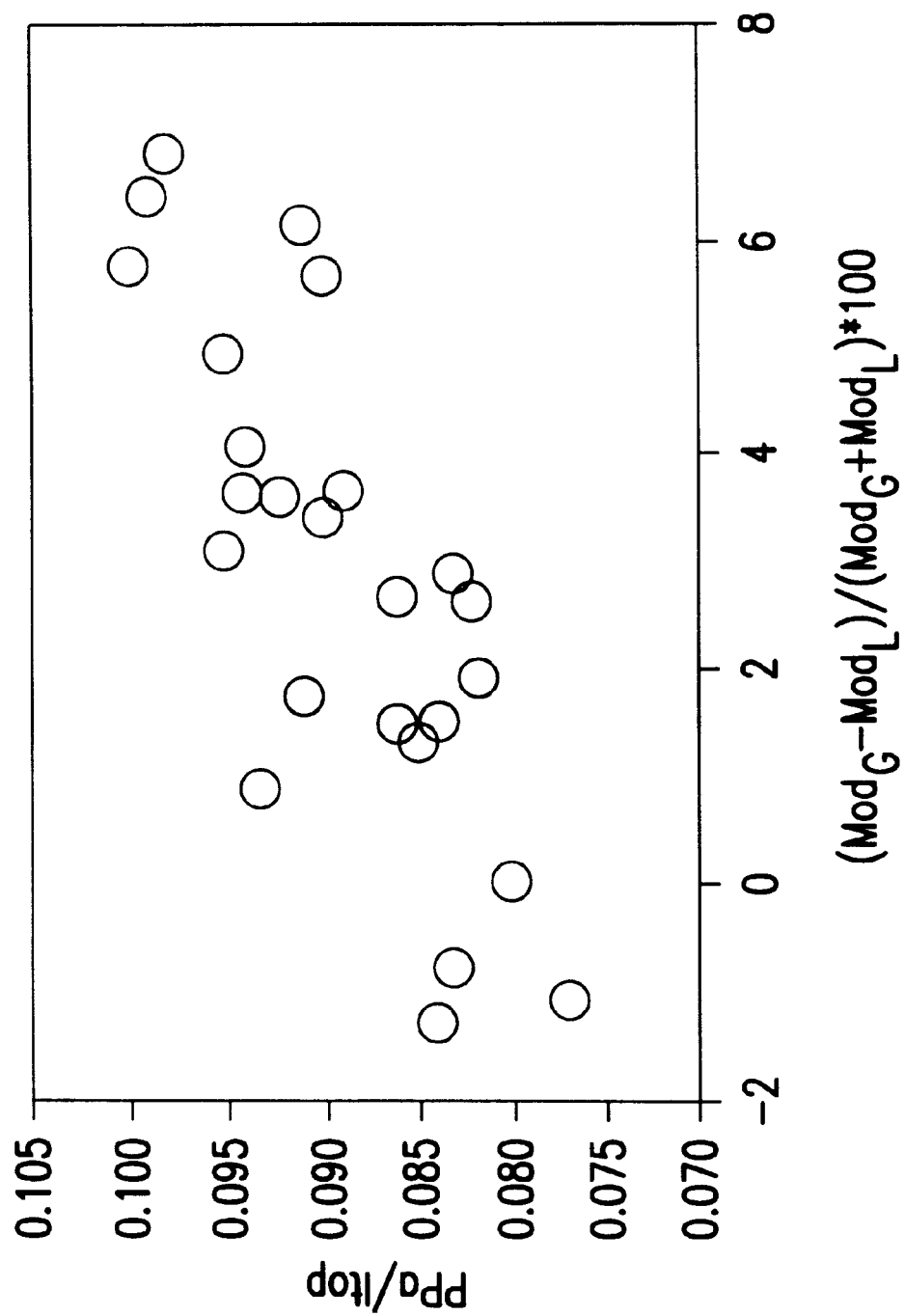

FIG. 31 shows relations of $Mod_R$ with the phase difference $\delta$ and NPPR value most influential by the phase difference $\delta$ (accordingly $\Delta$) as is evident from the formula (13) (FIG. 31(a)), PPb/PPa (FIG. 31(b)) or PPa/$I_{top}$ (FIG. 31(c)). It is evident that the quantity such as NPPR or PPa which is strongly dependent on the phase difference $\delta$, shows an extremely good positive or negative interrelation with $Mod_R$. $Mod_R$ being large, i.e. $\delta=\pi3/2$, is advantageous for a recording system in that the change in servo signal before and after recording is little and also advantageous for an exclusively retrieving system in that the push-pull signal PPa/$I_{top}$ after recording is large.

Thus, $Mod_R$ is a useful index when a layer structure wherein a phase difference is effectively used, is studied by experiment, as it is useful instead of the phase difference $\Delta$ or $\delta$ which is hardly directly measurable. With the same groove geometry, it is of course desirable that $Mod_R>0$, and it is preferred to select it so that it takes a value larger than 0.03.

On the other hand, the repetitive overwriting test with the optimum writing power was carried out at a linear velocity of 2.4 m/s, and in Table 2, in accordance with the CD standards, a case wherein jitter after 1,000 times was less than 15 nsec, was designated by ○, a case of from 15 to 18 nsec was designated by Δ, a case of higher than 18 nsec was designated by ▲, and a case where jitter was at least 20 nsec after not more than 500 times, was designated as X. It is evident that to accomplish the durability of ○ or Δ, when the upper protective layer is made thick at a level of 50 nm, the recording layer must be thin within a range of the formula (18).

More specifically, when a layer structure of 105/15/50 ($Mod_R*100=-1.09$) and a layer structure of 105/18/50 ($Mod_R*100=6.77$) whereby the same modulation of from 0.71 to 0.72 is obtainable, are compared, the layer structure of 105/18/50 wherein $Mod_R$ is large, and the contribution of the phase difference is believed to be large, has a high modulation despite high $I_{top}$, the change in the servo signal before and after recording (PPb/PPa or NPPR) is small, and the push-pull signal after recording is also large. From the aspect of the initial characteristic, the layer structure of 105/18/50 is preferred.

However, from the viewpoint of the repetitive overwriting durability, the layer structure 105/15/50 is preferred. Which should be adopted is a matter for those skilled in the art to chose. However, if the balance of both is taken into consideration, the layer structure of 105/17/50 ($Mod_R*100=3.60$) will be selected.

EXAMPLE 11

In Comparative Example 4, the reflective layer was changed to $Al_{99}Ta_1$ having a thickness of 200 nm.

Improvement was observed in recrystallization on the low power side at 2-times velocity, but no improvement was observed in recrystallization on the high power side. Further, the recording sensitivity deteriorated by from 1 to 2 mW.

EXAMPLE 12

A disc was prepared in the same manner as in Example 1 except that the upper protective layer thickness was changed to 65 nm, and the reflective layer was changed to $Al_{99}Ta_1$ having a thickness of 200 nm.

The initial characteristic at 2-times velocity was substantially the same as in Example 1. However, when repetitive overwriting was carried out at 2-times velocity, 3T jitter after 1,000 times increased to a level of from 20 to 25 nsec with a writing power of from 10 to 15 mW. The jitter was less than 17.5 nsec only when the repetitive overwriting was less than 500 times.

Further, the overwriting durability tended to deteriorate when the upper protective layer was thicker than 60 nm.

According to the present invention, by adjusting the volume resistively of the reflective layer in the phase-change medium to be within a certain specific range, it is possible to control the cooling rate of the recording layer and to substantially improve the recording linear velocity and writing power margins. This is particularly effective for a recording layer using a composition in the vicinity of a $Sb_{70}Te_{30}$ eutectic point as the base.

Further, by adjusting the change in the phase difference due to the phase change to a proper level, it is possible to present a phase-change medium having high retrieving compatibility with CD-ROM, DVD-ROM or the like.

What is claimed is:

1. An optical information recording medium for recording, retrieving and erasing mark length-modulated amorphous marks, which comprises a substrate, and a lower protective layer, a phase-change recording layer, an upper protective layer and a reflective layer having a thickness of from 40 to 300 nm and a volume resistivity of from 20 to 150 nΩ·m, formed in this sequence on the substrate, wherein the phase-change recording layer is a thin film of an alloy of $M_w(Sb_zTe_{1-z})_{1-w}$, where $0 \leq w \leq 0.2$, $0.5 \leq z \leq 0.9$, and M is at least one member selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and rare earth elements.

2. The optical information recording medium according to claim 1, wherein the thickness of the phase-change recording layer is from 10 to 30 nm.

3. The optical information recording medium according to claim 1, wherein the thickness of the upper protective layer is from 30 to 60 nm.

4. The optical information recording medium according to claim 1, wherein the thickness of the upper protective layer is from 40 to 60 nm.

5. The optical information recording medium according to claim 1, wherein $0.6 \leq z \leq 0.8$.

6. The optical information recording medium according to claim 1, wherein the reflective layer is made of an alloy of Al (inclusive of pure Al) having an impurity content of not more than 2 atomic % or an alloy of Au or Ag (inclusive of pure Au or Ag) having an impurity content of not more than 5 atomic %.

7. The optical information recording medium according to claim 6, wherein the reflective layer is an Al alloy containing from 0.2 to 2 atomic % of at least one member selected from the group consisting of Ta, Ti, Co, Cr, Si, Sc, Hf, Pd, Pt, Mg, Zr, Mo and Mn.

8. The optical information recording medium according to claim 6, wherein the reflective layer is made of a Ag alloy containing from 0.2 to 5 atomic % of at least one member selected from the group consisting of Ti, V, Ta, Nb, W, Co, Cr, Si, Ge, Sn, Sc, Hf, Pd, Rh, Au, Pt, Mg, Zr, Mo and Mn.

9. The optical information recording medium according to claim 1, wherein the reflective layer has a multilayer structure wherein at least 50% of the total thickness of the reflective layer is constituted by at least one layer of a thin metal film having a volume resistivity of from 20 to 150 nΩ·m.

10. The optical information recording medium according to claim 1, wherein the reflective layer has a volume resistivity of from 20 to 100 nΩ·m and a sheet resistivity of 0.2 to 0.9 Ω/□.

11. The optical information recording medium according to claim 1, wherein the upper protective layer is made of a mixture comprising from 20 to 90 mol % of at least one member selected from the group consisting of ZnS, ZnO, $TaS_2$ and a rare earth sulfide, and a heat resistant compound having a melting point or decomposition point of at least 1,000° C.

12. The optical information recording medium according to claim 1, which is an optical information recording medium of the type wherein a groove is formed on the substrate so that information recording is carried out by applying a laser beam to the groove and information retrieving is carried out by applying a laser beam from the rear side of the substrate and reading a reflected light, and $-\pi<\delta<0$, where $\delta$=(phase of reflected light passed through crystal region)−(phase of reflected light passed through amorphous region).

13. The optical information recording medium according to claim 12, wherein $-\pi/2<\Phi<-\pi/8$, and $-\pi<\Delta<-\pi/2+\pi/8$, wherein $\Phi$ and $\Delta$ are as follows:

$\Phi$ = (phase of reflected light from land) − (phase of reflected light from groove)

$= -4\pi nd/\lambda$ $\Delta = \delta + \Phi$ where $\lambda$ is the wavelength of the retrieving laser beam, n is the refractive index of the substrate at the wavelength $\lambda$, and d is the depth of the groove on the substrate.

14. The optical information recording medium according to claim 13, wherein $-\pi/2-\pi/8<\Delta<-\pi/2+\pi/8$.

15. The optical information recording medium according to claim 12, wherein the groove is wobbling, the groove depth is from 20 to 45 nm, and the groove width is from 0.3 to 0.6 μm.

16. The optical information recording medium according to claim 12, which is a medium for recording user data in the groove only, wherein the groove width is substantially equal to or narrower than the land width, and when recording is carried out with a recording power which is substantially equal and at which the recording power dependency of modulation of a recording signal substantially saturates, at each of the groove and the land, $Mod_G - Mod_L > 0$, and $Mod_G > 0.5$ where the modulation Mod of the recording signal is represented by:

Mod=(amplitude of envelope of DC retrieving signal)/(top value of envelope of DC retrieving signal), and $Mod_G$ is the modulation in groove recording and $Mod_L$ is the modulation in land recording.

17. The optical information recording medium according to claim 16, wherein $Mod_R=(Mod_G-Mod_L)/(Mod_G+Mod_L)>0.03$.

18. The optical information recording medium according to claim 1, wherein the lower protective layer has a thickness of from 70 to 150 nm and a refractive index of from 2.0 to 2.3, the phase-change recording layer has a thickness of from 15 to 25 nm, and the upper protective layer has a thickness of from 30 to 60 nm and a refractive index of from 2.0 to 2.3, whereby recording, retrieving and erasing are carried out by a laser beam having a wavelength of from 600 to 800 nm.

19. The optical information recording medium according to claim 18, wherein $\partial R_{top}/\partial D_1 > 0$, $15 \leq D_2 \leq 20$, $30 \leq D_3 \leq 60$, and $-5D_2+120 \leq D_3 \leq -5D_2+140$ wherein $D_1$ is the thickness (nm) of the lower protective layer, $D_2$ is the thickness (nm) of the recording layer, $D_3$ is the thickness (nm) of the upper protective layer, and $\partial R_{top}/\partial D_1$ is the $D_1$ dependency of the reflected light $R_{top}$ from the crystal region.

20. The optical information recording medium according to claim 1, wherein the lower protective layer has a double layer structure wherein a first lower protective layer has a thickness of from 20 to 70 nm and a refractive index being within a range of $n_{sub} \pm 0.1$ where $n_{sub}$ is the refractive index of the substrate, and a second lower protective layer has a thickness of at most 70 nm and a refractive index of from 2.0 to 2.3, the phase-change recording layer has a thickness of from 15 to 25 nm, and the upper protective layer has a thickness of from 30 to 60 nm and a refractive index of from 2.0 to 2.3, whereby recording, retrieving and erasing are carried out by a laser beam having a wavelength of from 600 to 800 nm.

21. The optical information recording medium according to claim 20, wherein the total thickness of the lower protective layer is from 70 to 150 nm, and $\partial R_{top}/\partial D_{12} < 0$, $15 \leq D_2 \leq 20$, $30 \leq D_3 \leq 60$, and $-5D_2 + 120 \leq D_3 \leq -5D_2 + 140$ wherein $D_{12}$ is the thickness (nm) of the second lower protective layer, $D_2$ is the thickness (nm) of the recording layer, $D_3$ is the thickness (nm) of the upper protective layer, and $\partial R_{top}/\partial D_{12}$ is the $D_{12}$ dependency of the reflected light $R_{top}$ from the crystal region.

22. The optical information recording medium according to claim 5, wherein the phase-change recording layer is a thin film of an alloy of $Mb_v Mc_y (Sb_x Te_{1-x})_{1-y-v}$, where Mb is at least one member selected from the group consisting of Ag and Zn, Mc is Ge or Sn, $0.6 \leq x \leq 0.8$, $0.01 \leq y \leq 0.15$, $0.01 \leq v \leq 0.15$, and $0.025 \leq y+v \leq 0.2$.

23. An optical information recording medium for recording, retrieving and erasing mark length-modulated amorphous marks, which comprises a substrate, and a lower protective layer, a phase-change recording layer, an upper protective layer and a reflective layer having a thickness of from 40 to 300 nm and a volume resistivity of from 20 to 150 nΩ·m, formed in this sequence on the substrate, wherein the reflective layer is an Al alloy containing from 0.2 to 2 atomic % of at least one member selected from the group consisting of Ta, Ti, Co, Cr, Si, Sc, Hf, Pd, Pt, Mg, Zr, Mo and Mn, or wherein the reflective layer is made of a Ag alloy containing from 0.2 to 5 atomic % of at least one member selected from the group consisting of Ti, V, Ta, Nb, W, Co, Cr, Si, Ge, Sn, Sc, Hf, Pd, Rh, Au, Pt, Mg, Zr, Mo and Mn.

24. The optical information recording medium according to claim 23, wherein the phase-change recording layer is a thin film of an alloy of $M_w (Sb_z Te_{1-z})_{1-w}$, where $0 \leq w \leq 0.2$, $0.5 \leq z \leq 0.9$, and M is at least one member selected from the group consisting of In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and rare earth elements.

25. The optical information recording medium according to claim 24, wherein $0.6 \leq z \leq 0.8$.

26. The optical information recording medium according to claim 25, wherein the phase-change recording layer is a thin film of an alloy of $Mb_y (Sb_x Te_{1-w})_{1-y-v}$, where Mb is at least one member selected from the group consisting of Ag and Zn, Mc is Ge or Sn, $0.6 \leq x \leq 0.8$, $0.1 \leq y \leq 0.15$, $0.01 \leq v \leq 0.15$, and $0.02 \leq y+v \leq 0.2$.

27. The optical information recording medium according to claim 23, wherein the thickness of the phase-change recording layer is from 10 to 30 nm.

28. The optical information recording medium according to claim 23, wherein the thickness of the upper protective layer is from 30 to 60 nm.

29. The optical information recording medium according to claim 23, wherein the thickness of the upper protective layer is from 40 to 60 nm.

30. The optical information recording medium according to claim 23, wherein the reflective layer has a multilayer structure wherein at least 50% of the total thickness of the reflective layer is constituted by at least one layer of a thin metal film having a volume resistivity of from 20 to 150 nΩ·m.

31. The optical information recording medium according to claim 23, wherein the reflective layer has a volume resistivity of from 20 to 100 nΩ·m and a sheet resistivity of 0.2 to 0.9 Ω/□.

32. The optical information recording medium according to claim 23, wherein the upper protective layer is made of a mixture comprising from 20 to 90 mol % of at least one member selected from the group consisting of ZnS, ZnO, $TaS_2$ and a rare earth sulfide, and a heat resistant compound having a melting point or decomposition point of at least 1,000° C.

33. The optical information recording medium according to claim 23, which is an optical information recording medium of the type wherein a groove is formed on the substrate so that information recording is carried out by applying a laser beam to the groove and information retrieving is carried out by applying a laser beam from the rear side of the substrate and reading a reflected light, and $-\pi < \delta < 0$, where $\delta$=(phase of reflected light passed through crystal region)−(phase of reflected light passed through amorphous region).

34. The optical information recording medium according to claim 33, wherein $-\pi < 2 < \Phi < -\pi/8$, and $-\pi < \Delta < -\pi/2 + \pi/8$, wherein $\Phi$ and $\Delta$ are as follows:

$\Phi$ = (phase of reflected light from land) − (phase of reflected light from groove)

$= -4\pi n d / \lambda$ $\Delta = \delta + \Phi$ wherein $\lambda$ is the wavelength of the retrieving laser beam, n is the refractive index of the substrate at the wavelength $\lambda$, and d is the depth of the groove on the substrate.

35. The optical information recording medium according to claim 34, wherein $-\pi/2 - \pi/8 < \Delta < -\pi/2 + -\pi/8$.

36. The optical information recording medium according to claim 33, wherein the groove is wobbling, the groove depth is from 20 to 45 nm, and the groove width is from 0.3 to 0.6 μm.

37. The optical information recording medium according to claim 33, which is a medium for recording user data in the groove only, wherein the groove width is substantially equal to or narrower than the land width, and when recording is carried out with a recording power which is substantially equal and at which the recording power dependency of modulation of a recording signal substantially saturates, at each of the groove and the land, $Mod_G - Mod_L$, and $$Mod_G > 0.5$$

where the modulation Mod of the recording signal is represented by:

Mod=(amplitude of envelope of DC retrieving signal)/(top value of envelope of DC retrieving signal), and $Mod_G$ is the modulation in groove recording and $Mod_L$ is the modulation in land recording.

38. The optical information recording medium according to claim 37, wherein $Mod_R=(Mod_G-Mod_L)/(Mod_G+Mod_L) >0.03$.

39. The optical information recording medium according to claim 23, wherein the lower protective layer has a thickness of from 70 to 150 nm and a refractive index of from 2.0 to 2.3, the phase-change recording layer has a thickness of from 15 to 25 nm, and the upper protective layer has a thickness of from 30 to 60 nm and a refractive index of from 2.0 to 2.3, whereby recording, retrieving and erasing are carried out by a laser beam having a wavelength of from 600 to 800 nm.

40. The optical information recording medium according to claim 39, wherein $$\partial R_{top}/\partial D_1 > 0,$$

$$15 \leq D_2 \leq 20,$$

$$30 \leq D_3 \leq 60, \text{ and}$$

$$-5D_2+120 \leq D_3 \leq -5D_2+140$$

wherein $D_1$ is the thickness (nm) of the lower protective layer, $D_2$ is the thickness (nm) of the recording layer, $D_3$ is the thickness (nm) of the upper protective layer, and $\partial R_{top}/\partial D_1$ is the $D_1$ dependency of the reflected light from $R_{top}$ from the crystal region.

41. The optical information recording medium according to claim 23, wherein the lower protective layer has a double layer structure wherein a first lower protective layer has a thickness of from 20 to 70 nm and a refractive index being within a range of $n_{sub} \pm 0.1$ where $n_{sub}$ is the refractive index of the substrate, and a second lower protective layer has a thickness of at most 70 nm and a refractive index of from 2.0 to 2.3, the phase-change recording layer has a thickness of from 15 to 25 nm, and the upper protective layer has a thickness of from 30 to 60 nm and a refractive index of from 2.0 to 2.3, whereby recording, retrieving and erasing are carried out by a laser beam having a wavelength of from 600 to 800 nm.

42. The optical information recording medium according to claim 41, wherein the total thickness of the lower protective layer is from 70 to 150 mn, and $$\partial R_{top}/\partial D_{12} > 0,$$

$$15 \leq D_2 \leq 20,$$

$$30 \leq D_3 \leq 60, \text{ and}$$

$$-5D_2+120 \leq D_3 \leq -5D_2+140$$

wherein $D_1$ is the thickness (nm) of the second lower protective layer, $D_2$ is the thickness (nm) of the recording layer, $D_3$ is the thickness (nm) of the upper protective layer, and $\partial R_{top}/\partial D_{12}$ is the $D_{12}$ dependency of the reflected light from $R_{top}$ from the crystal region.

* * * * *